US011167263B2

(12) United States Patent
Chalker et al.

(10) Patent No.: US 11,167,263 B2
(45) Date of Patent: Nov. 9, 2021

(54) METAL ADSORBENT MATERIAL AND USES THEREOF

(71) Applicant: Clean Earth Technology Pty Ltd, Singapore (SG)

(72) Inventors: Justin Mark Chalker, South Australia (AU); Max John Haldane Worthington, Forestville (AU)

(73) Assignee: CLEAN EARTH TECHNOLOGY PTY LTD, East Perth (AU)

( * ) Notice: Subject to any disclaimer, the term of this patent is extended or adjusted under 35 U.S.C. 154(b) by 374 days.

(21) Appl. No.: 16/094,544

(22) PCT Filed: Apr. 20, 2017

(86) PCT No.: PCT/AU2017/000094
§ 371 (c)(1),
(2) Date: Oct. 18, 2018

(87) PCT Pub. No.: WO2017/181217
PCT Pub. Date: Oct. 26, 2017

(65) Prior Publication Data
US 2019/0282999 A1    Sep. 19, 2019

(30) Foreign Application Priority Data

Apr. 20, 2016  (AU) .............................. 2016901470

(51) Int. Cl.
| | | |
|---|---|---|
| *B01J 20/00* | (2006.01) | |
| *B01J 20/26* | (2006.01) | |
| *B01D 53/02* | (2006.01) | |
| *B01J 20/34* | (2006.01) | |
| *B09C 1/08* | (2006.01) | |
| *C08G 75/16* | (2006.01) | |
| *A62D 3/33* | (2007.01) | |
| *A62D 101/24* | (2007.01) | |
| *B01D 15/00* | (2006.01) | |
| *A62D 101/43* | (2007.01) | |

(52) U.S. Cl.
CPC .............. *B01J 20/262* (2013.01); *A62D 3/33* (2013.01); *B01D 53/02* (2013.01); *B01J 20/3425* (2013.01); *B01J 20/3475* (2013.01); *B09C 1/08* (2013.01); *C08G 75/16* (2013.01); *A62D 2101/24* (2013.01); *A62D 2101/43* (2013.01); *B01D 15/00* (2013.01); *B01D 2253/202* (2013.01); *B01D 2253/25* (2013.01); *B01D 2257/60* (2013.01); *B01D 2257/602* (2013.01); *B01D 2258/06* (2013.01)

(58) Field of Classification Search
CPC .. B01J 20/262; B01J 20/3425; B01J 20/3475; A62D 3/33; B01D 53/02–145; B09C 1/08; C08G 75/16
See application file for complete search history.

(56) References Cited

U.S. PATENT DOCUMENTS

| | | | | |
|---|---|---|---|---|
| 2,278,127 | A | * 3/1942 | Patrick ..................... | C08L 9/00 525/189 |
| 2,553,206 | A | * 5/1951 | Patrick .................. | C08G 75/16 528/265 |
| 2,685,574 | A | * 8/1954 | Signaigo ................ | C08G 75/16 528/388 |
| 2,958,663 | A | 11/1960 | Westcott et al. | |
| 2,986,540 | A | * 5/1961 | Posnansky ............. | C08G 18/36 525/444.5 |
| 3,951,790 | A | * 4/1976 | Fujisawa .................. | A62D 3/33 210/688 |
| 4,425,236 | A | * 1/1984 | Neunhoeffer ............. | C22B 3/24 210/638 |
| 2010/0279216 | A1 | 11/2010 | Wu | |

FOREIGN PATENT DOCUMENTS

| | | | |
|---|---|---|---|
| GB | 453921 | A | 9/1936 |
| GB | 455779 | A | 10/1936 |
| GB | 1145999 | * | 3/1969 |
| WO | 2014089428 | A1 | 6/2014 |
| WO | 2008136661 | A1 | 11/2018 |

OTHER PUBLICATIONS

Simmonds et al, "Inverse Vulcanization of . . . Li—S Batteries" ACS Macro Letters, Feb. 2014, 3, pp. 229-232. (Year: 2014).*
Kobayashi et al, Polymer Letters Edition, vol. 15, pp. 137-140. (Year: 1977).*
Murray, R.E., et al. "Thioether-Functionalized Vegetable Oils: Metal-Absorbing Biobased Ligands", ACS Sustainable Chemistry & Engineering, 2013, 1, pp. 562-565, dx.doi.org/10.1021/sc3000164y.
Rudnick, L.R., "Lubricant Additives" Chemistry and Application, Second Edition, CRC Press, Taylor & Francis Group, ISBN 978-1-4200-5964-9 (alk. paper), pp. 251-279, Dec. 2009.
Kammann, Jr., K.P. et al., Sulfurized vegetable oil products as lubricant additives, JAOCS, J. Am. Oil. Chem. Soc., vol. 62, No. 1985, pp. 917-923.
Dollwet, H.H.A., et al., Chromatographic Separation of Vitamins D2 and D3 and Related Compounds, Analytical Biochemistry 25, 1968, pp. 297-306.

* cited by examiner

*Primary Examiner* — Steven J Bos
(74) *Attorney, Agent, or Firm* — Walter Haverfield LLP; Sean F. Mellino

(57) ABSTRACT

A polymeric polysulfide is disclosed. The polymeric polysulfide is formed by reacting a fatty acid composition comprising at least one unsaturated fatty acid or derivative thereof with sulfur, at a weight ratio between 9:1 and 1:9, under inverse vulcanisation conditions to produce a polymeric polysulfide wherein at least 50% of the fatty acids or derivatives thereof in the fatty acid composition are unsaturated.

19 Claims, 25 Drawing Sheets

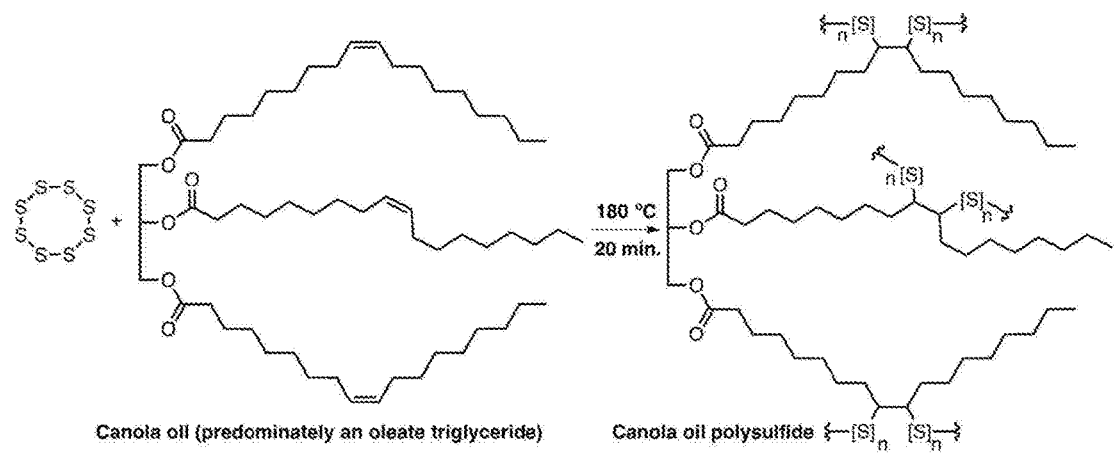
FIGURE 1
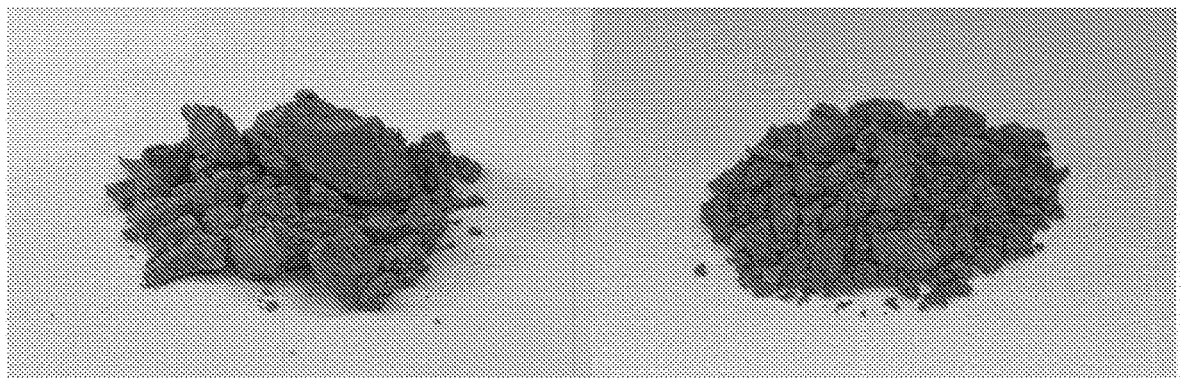
FIGURE 2      FIGURE 3

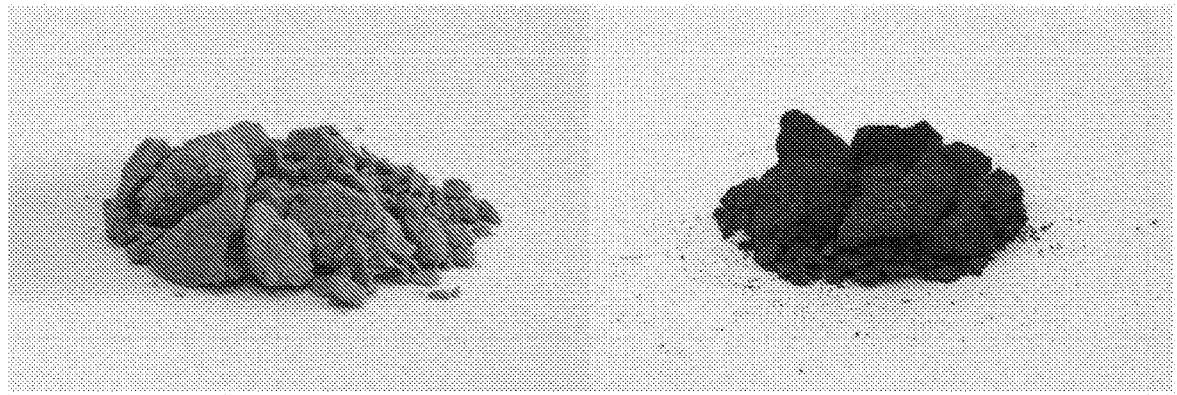
FIGURE 4　　　　FIGURE 5
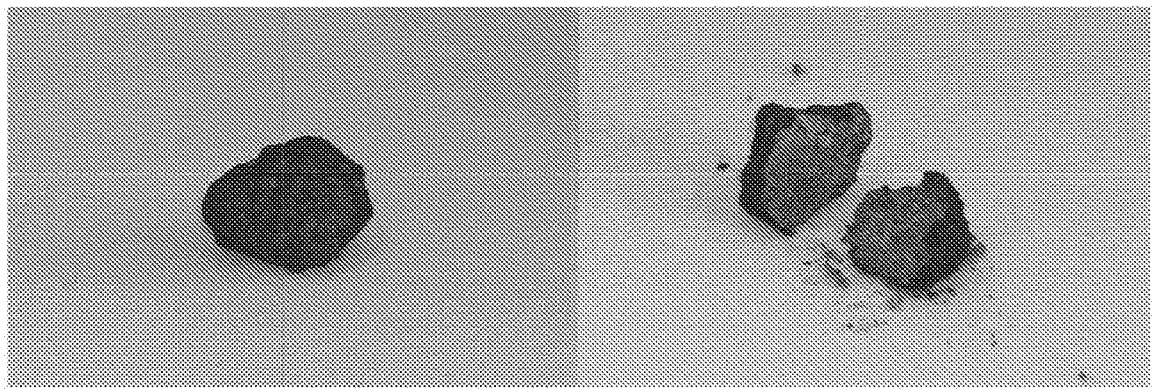
FIGURE 6　　　　FIGURE 7

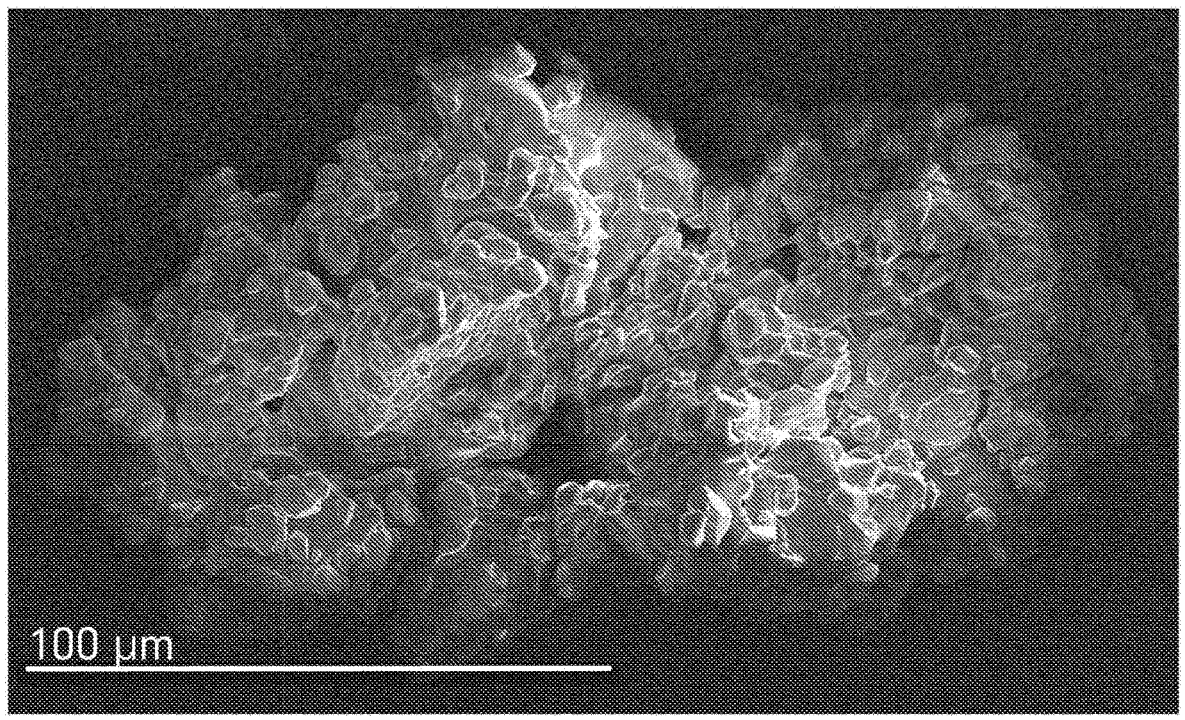
FIGURE 8
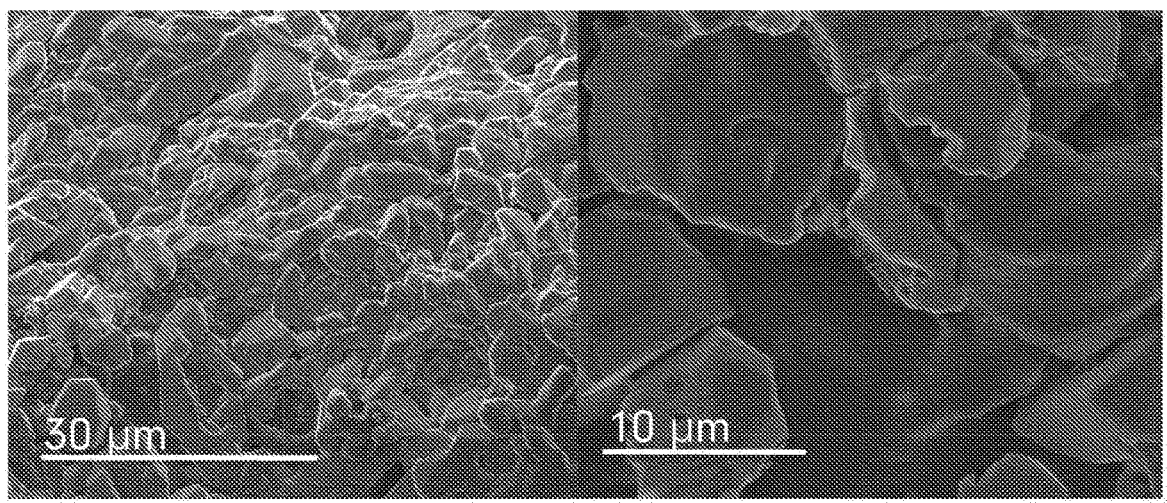
FIGURE 9      FIGURE 10

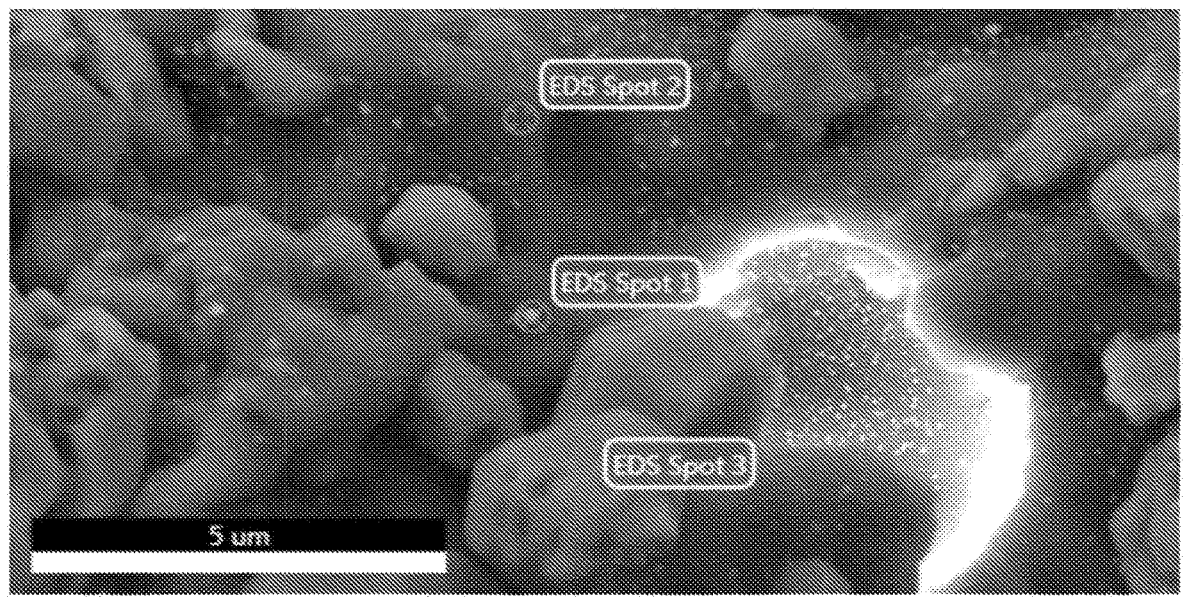
*FIGURE 14*
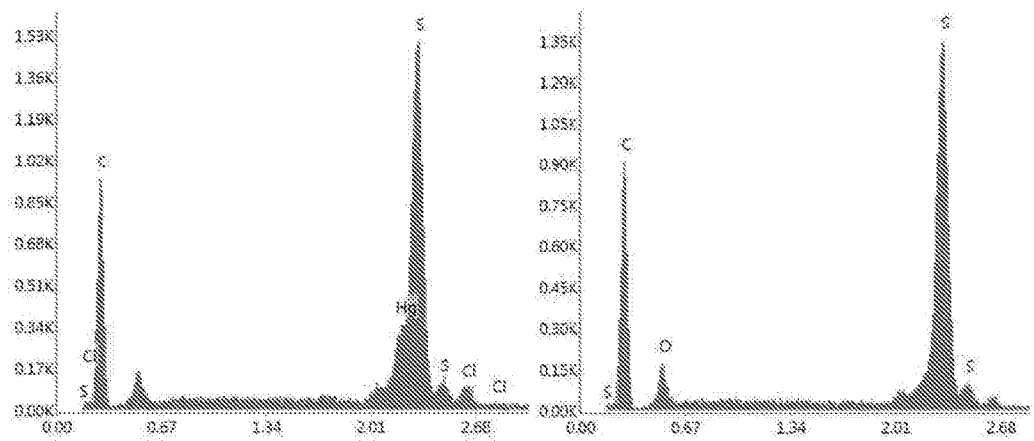
*FIGURE 15*  *FIGURE 16*

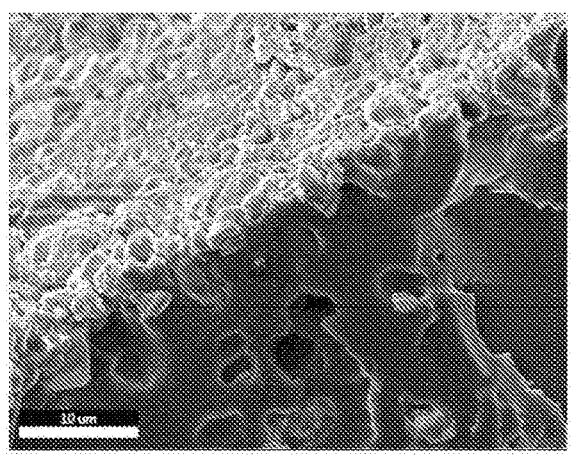
FIGURE 19
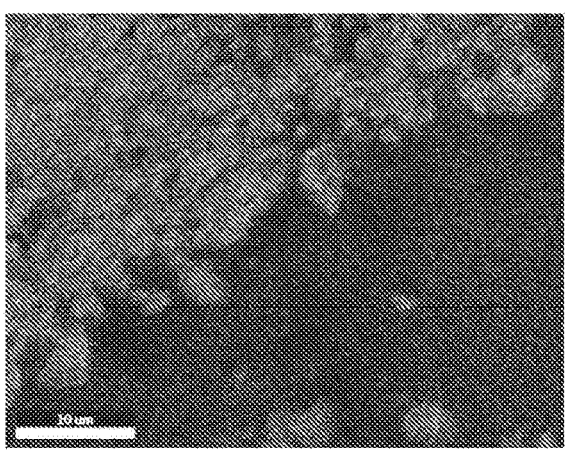
FIGURE 20
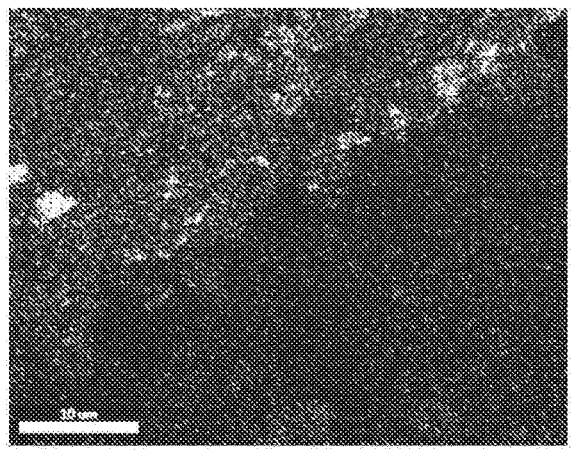
FIGURE 21
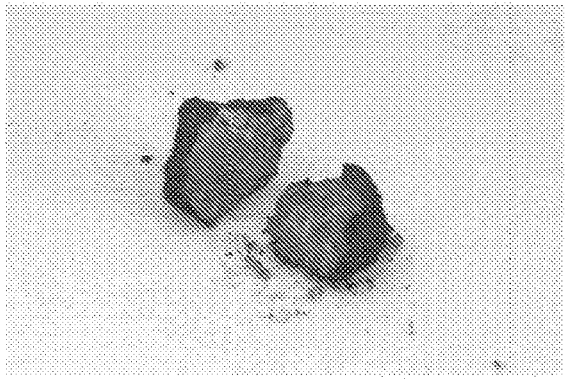
FIGURE 22
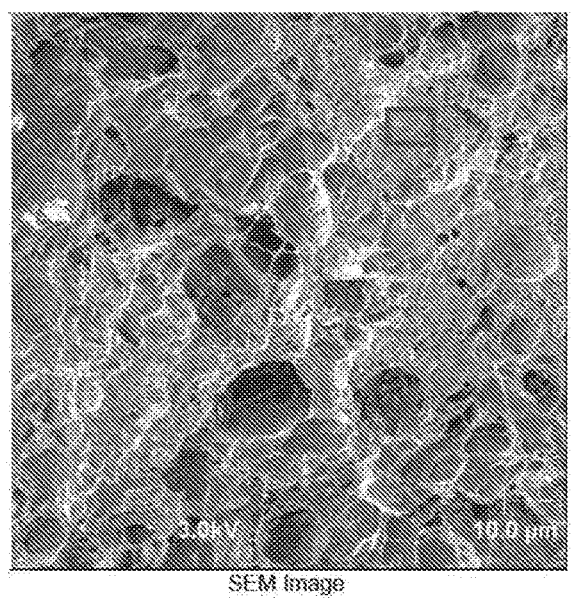
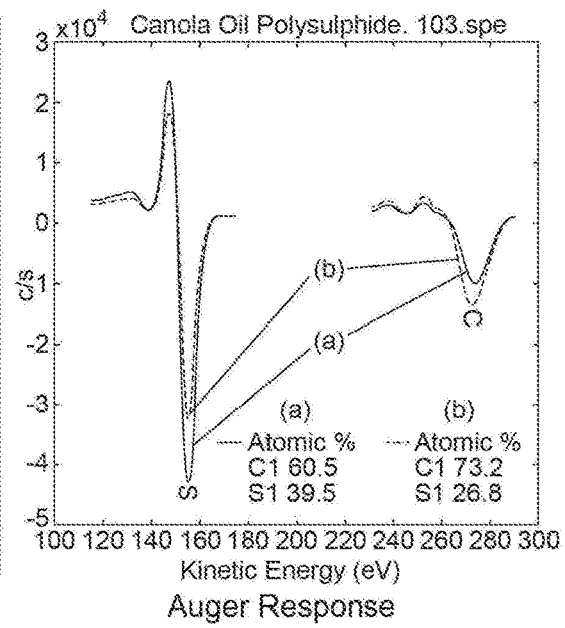
FIGURE 23

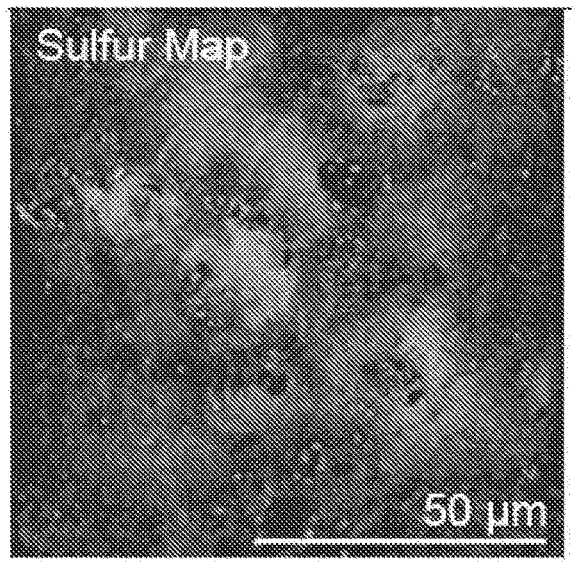
*FIGURE 24*
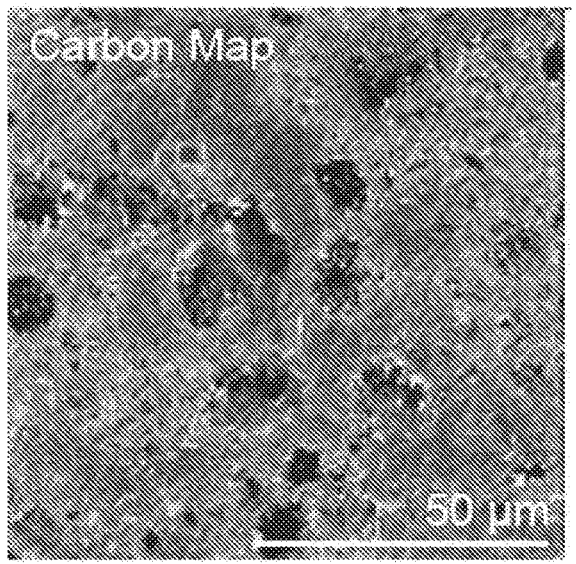
*FIGURE 25*
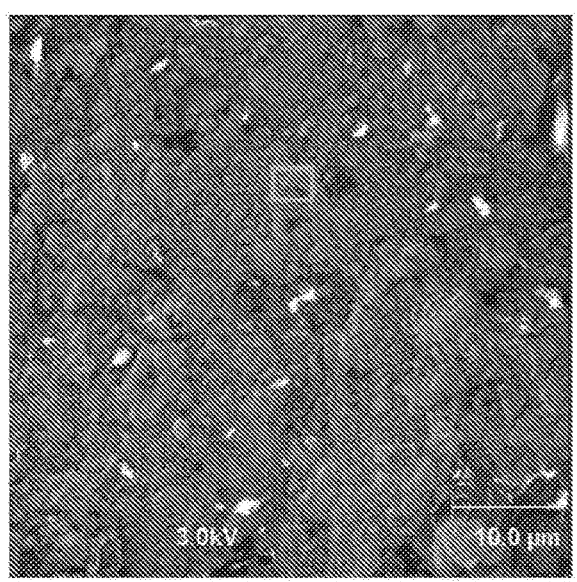
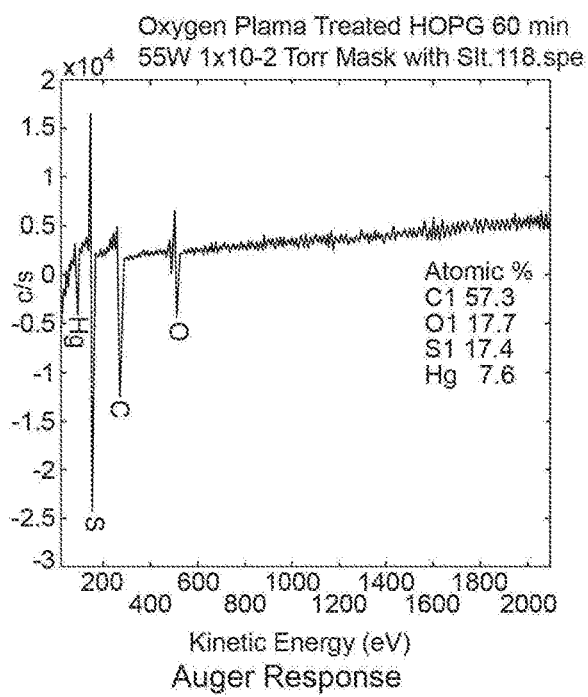
*FIGURE 26*

METAL ADSORBENT MATERIAL AND USES THEREOF

CROSS REFERENCE TO RELATED APPLICATIONS

This application is the U.S. national stage entry of PCT/AU2017/000094, filed Apr. 20, 2017, which claims priority from Australian Provisional Patent Application No. 2016901470 titled "MERCURY ADSORBENT MATERIAL AND USES THEREOF" and filed on 20 Apr. 2016, the contents of which are hereby incorporated by reference in its entirety.

FIELD

The present disclosure relates to compositions and methods for adsorbing metals. In certain embodiments, the present disclosure relates to polymeric polysulfides for removing metals or metal ions from metal or metal ion containing compositions, such as one or more of soil, air or water.

BACKGROUND

Heavy metals, such as mercury, can pose an environmental threat due to their toxicity to living systems.[1,2] Unlike organic pollutants, toxic heavy minerals once introduced into the environment cannot be biodegraded. They persist indefinitely and cause pollution of air, water and soils. Mercury is particularly problematic as it can take many forms such as a vapour, liquid metal, as inorganic salts and as organomercury compounds. Some forms of mercury are particularly toxic, such as methyl mercury, which accumulates in food webs. About 30% of the mercury emissions entering the atmosphere each year come from anthropogenic sources.[3] Accordingly, opportunities exist to improve upon existing mercury capture and remediation techniques.

There are numerous techniques used for remediation of environmental mercury contamination.[4,5,6] However, some of these techniques may suffer from drawbacks. One such technique for mercury remediation from soil includes excavating the contaminated material and taking this to a disposal site. This method of remediation however potentially requires the transport of large volumes of material only a small portion of which comprises the heavy mineral. Thus, large volumes of material are extracted in an effort to remove a small amount of heavy mineral. In addition, the material removed may need to be replaced. Alternatively, excavated contaminated material can be entombed, where the excavated contaminated material is encapsulated in a thick solid barrier such as cement. Another technique is aeration, however this creates air pollution and can further disperse the mercury. A further technique is leaching, this however requires the use of large volumes of water which may not be available near sites where environmental remediation is required.

A further technique involves removing mercury from a mercury laden gas by contacting the gas with activated carbon which has been impregnated with sulphur or some other absorption means such as copper sulphide.[7] However, this process is expensive.

A further technique involves using a polysulfide synthesised from sulphur and d-limonene to produce a wax, which can then be used to adsorb mercury.[8] However, a wax may melt at elevated temperatures and therefore not be suitable for certain industrial applications. A further technique involves using supercritical carbon dioxide to generate macroporosity in an inverse vulcanised polymer, which can then be used for mercury capture.[9] However, holding carbon dioxide in a supercritical state is expensive and unsuitable for treating large samples of inverse vulcanised polymer.

Accordingly, there is a need for products and methods for mercury remediation or adsorption that are more cost-effective and suitable for industrial application.

SUMMARY

The present disclosure arises from research into metal adsorbing compositions.

In a first aspect of the present disclosure, there is provided a polymeric polysulfide formed by reacting a fatty acid composition comprising at least one unsaturated fatty acid or derivative thereof with sulfur, at a weight ratio between 9:1 and 1:9, under inverse vulcanisation conditions to produce a polymeric polysulfide wherein at least 50% of the fatty acids or derivatives thereof in the fatty acid composition are unsaturated.

In a second aspect of the present disclosure, there is provided a metal adsorbent composition comprising the polymeric polysulfide of the present disclosure, and wherein the metal adsorbent composition is suitable for removing metals or metal ions from a metal or metal ion containing composition or surface.

In certain embodiments of the first and second aspects, the weight ratio of the fatty acid composition to sulfur is between 4:1 and 1:9. In certain specific embodiments of the first and second aspects, the weight ratio of the fatty acid composition to sulfur is between 2:1 and 1:2.

In certain embodiments of the first and second aspects, the polymeric polysulfide is a solid. The polymeric polysulfide may be a rubber or elastomer. The polymeric polysulfide may comprise particles having an average diameter between 0.1 mm and 100 mm. The average diameter may be altered to suit the intended application.

In other embodiments of the first and second aspects, the polymeric polysulfide is a liquid.

The polymeric polysulfide may be produced from a variety of starting materials. In certain embodiments, the fatty acid composition is a glyceride composition. The glyceride composition may comprise at least one oil of acai palm, avocado, brazil nut, canola, castor, corn, cottonseed, grape seed, hazelnut, linseed, mustard, peanut, olive, rice bran, safflower, soybean or sunflower. Under typical reaction conditions, polymeric polysulfides formed from glycerides tend to be solids. In certain other embodiments, the fatty acid composition is a fatty acid ester composition. Under typical reaction conditions, polymeric polysulfides formed from fatty acid esters tend to be liquids.

Solid polymeric polysulfides can find uses in a range of applications where solid metal adsorbents are required. For example, solid polymeric polysulfides may be contacted with metal containing liquids or gases and then separated therefrom.

Liquid polymeric sulfides can find uses in a range of applications where liquid solid metal adsorbents are required. For example, liquid polymeric sulfides may be used on oil and gas industries for removal of metal contamination from surfaces.

The polymeric polysulfide may be produced from a variety of forms of sulphur. In certain embodiments the sulfur comprises elemental sulfur. In certain embodiments, the sulfur comprises any poly-S reagent, intermediate, or product generated from sulphide.

The polymeric polysulfide is produced by reacting the fatty acid composition with sulphur under inverse vulcanisation conditions. In certain embodiments, the conditions comprise reacting the fatty acid composition with molten sulfur at a temperature greater than 119 degrees Celsius.

In certain embodiments of the first and second aspects, the conditions comprise reacting the fatty acid composition with sulfur for a time greater than 10 minutes.

Thus, in a third aspect of the present disclosure, there is provided a method for producing a polymeric polysulfide, the method comprising: providing a fatty acid composition comprising at least one unsaturated fatty acid or derivative thereof and wherein at least 50% of the fatty acids or derivatives thereof in the fatty acid composition are unsaturated; reacting the fatty acid composition with molten sulfur at a weight ratio between 9:1 and 1:9 under conditions to produce the polymeric polysulfide.

In a fourth aspect of the present disclosure, there is provided a polymeric polysulfide produced by the method of the third aspect.

In a fifth aspect of the present disclosure, there is provided a method for removing one or more metals from a metal containing composition or surface, the method comprising contacting the metal containing composition or surface with the polymeric polysulfide of the present disclosure under conditions to remove at least some of the metal from the metal ion containing composition or surface.

In certain embodiments of the fifth aspect, the metal containing composition comprises a metal containing liquid or gas and the method comprises passing the metal containing liquid or gas over a bed of solid polymeric polysulfide particles. The polymeric polysulfide particles may be fixed to a solid substrate.

In certain other embodiments of the fifth aspect, the metal containing composition comprises a metal containing solid and the method comprises contacting the metal containing solid with a solid or liquid polymeric polysulfide.

In certain other embodiments of the fifth aspect, the metal containing surface comprises surface contaminated with one or more metals and the method comprises contacting the metal containing surface with a liquid polymeric polysulfide.

In a sixth aspect of the present disclosure, there is provided a use of the polymeric polysulfide of the present disclosure for removing at least one metal from a metal containing composition or surface, comprising contacting the metal containing composition or surface with the polymeric polysulfide under conditions to remove at least some of the metal from the metal containing composition or surface.

In a seventh aspect of the present disclosure, there is provided a solid substrate comprising the polymeric polysulfide of the present disclosure on a surface thereof.

In an eighth aspect of the present disclosure, there is provided a column for removing a metal from a metal containing composition, the column comprising particles of the polymeric polysulfide of the present disclosure.

In a ninth aspect of the present disclosure, there is provided a method for removing a metal from a metal containing solid substrate, comprising contacting the metal containing solid substrate with the polymeric polysulfide of the present disclosure, wherein the metal containing solid substrate is soil.

In a tenth aspect of the present disclosure, there is provided a treated composition, which has been produced by contacting a metal containing composition with the polymeric polysulfide of the present disclosure under conditions to provide a metal-bound polymeric polysulfide and the treated composition, wherein the treated composition comprises less metal than the untreated metal containing composition.

In an eleventh aspect of the present disclosure, there is provided a method for stripping a metal from a metal-bound polymeric polysulfide, comprising contacting a metal-bound polymeric polysulfide with a metal stripping composition under conditions to strip at least some of the metal from the metal-bound polymeric polysulfide to provide a resultant mixture comprising a metal-stripped polymeric polysulfide.

In certain embodiments, the metal-stripped polymeric polysulfide is suitable for reuse in removing at least one metal from a metal containing composition.

In certain embodiments of the first to eleventh aspects, the metal is selected from one or more of the group consisting of a base metal, a noble metal, a precious metal, and a heavy metal. In certain specific embodiments, the metal is selected from one or more of the group consisting of mercury, cadmium, silver, gold, lead, arsenic, nickel, zinc, and iron. The metal may be in the form of an inorganic metal, salt or complex, an organic metal salt or complex or an elemental metal.

In certain embodiments, the metal is mercury.
In certain embodiments, the metal is iron.

BRIEF DESCRIPTION OF FIGURES

Embodiments of the present disclosure will be discussed with reference to the accompanying figures wherein:

FIG. 1 is a diagram showing the chemical reaction according to embodiments of the disclosure;

FIG. 2 shows a polymeric polysulfide of embodiments of the disclosure synthesised before treatment with mercury chloride;

FIG. 3 shows the polymeric polysulfide of FIG. 2 after treatment with mercury chloride (20 mg/mL, 24 hours), where the polymeric polysulfide changed colour (from brown to grey) after binding the mercury;

FIG. 4 shows a polymeric polysulfide of embodiments of the disclosure before treatment with elemental mercury;

FIG. 5 shows the polymeric polysulfide of FIG. 4 after treatment with elemental mercury, where the polymeric polysulfide changed colour (from brown to black) after binding the mercury;

FIG. 6 is a photo of a particle of the polymeric polysulfide of FIG. 5;

FIG. 7 is a photo showing the particle of FIG. 6 cleaved in two and reveals that mercury is bound only to surface of particle;

FIG. 8 is a scanning electron microscope (SEM) image showing the surface of the polymeric polysulfide according to embodiments of the disclosure before exposure to mercury, where polymeric polysulfide particles of 0.5 mm to 1 mm were mounted on an aluminium SEM pin mount using carbon tape before sputter coating with platinum and then imaged using a SEM; the scale bar is 100 μm in length;

FIG. 9 is a SEM image showing the surface of the polymeric polysulfide of FIG. 8; the scale bar is 30 μm in length;

FIG. 10 is a SEM image showing the surface of the polymeric polysulfide of FIG. 8; the scale bar is 10 μm in length;

FIG. 14 is a SEM image showing the surface of the polymeric polysulfide of FIG. 13 and the spots analysed by EDS;

FIG. 15 shows an EDS analysis of Spot 1 shown in FIG. 14; Spot 1 is centred on a nanoparticle containing mercury; Mercury and chlorine were detected by EDS, indicating the nanoparticles are the product of mercury capture;

FIG. 16 shows an EDS analysis of Spot 2 shown in FIG. 14; Spot 2 is centred on the smooth surface of the polymeric polysulfide, which is an unmodified domain not containing mercury;

FIG. 19 is a SEM image showing a portion of FIG. 18 to provide a frame of reference for FIGS. 20 and 2321

FIG. 20 is an EDS map of sulfur in FIG. 19;

FIG. 21 is an EDS map of mercury in FIG. 19;

FIG. 22 is a photo of the cleaved polymeric polysulfide used to provide the cross-section SEM and EDS images of FIGS. 18 to 21;

FIG. 23 shows the results of auger spectroscopy of a canola oil polymeric polysulfide (50% sulfur). The results revealed strong signals for carbon and sulfur, consistent with the proposed structure;

FIG. 24 shows the results of auger imaging of representative sections of the canola oil polymeric polysulfide (50% sulfur), with atomic mapping of sulfur;

FIG. 25 shows the results of auger imaging of representative sections of the canola oil polymeric polysulfide (50% sulfur), with atomic mapping of carbon;

FIG. 26 shows the results of auger analysis of canola oil polymeric polysulfide after treatment with mercury metal;

DETAILED DESCRIPTION

Figure 11:
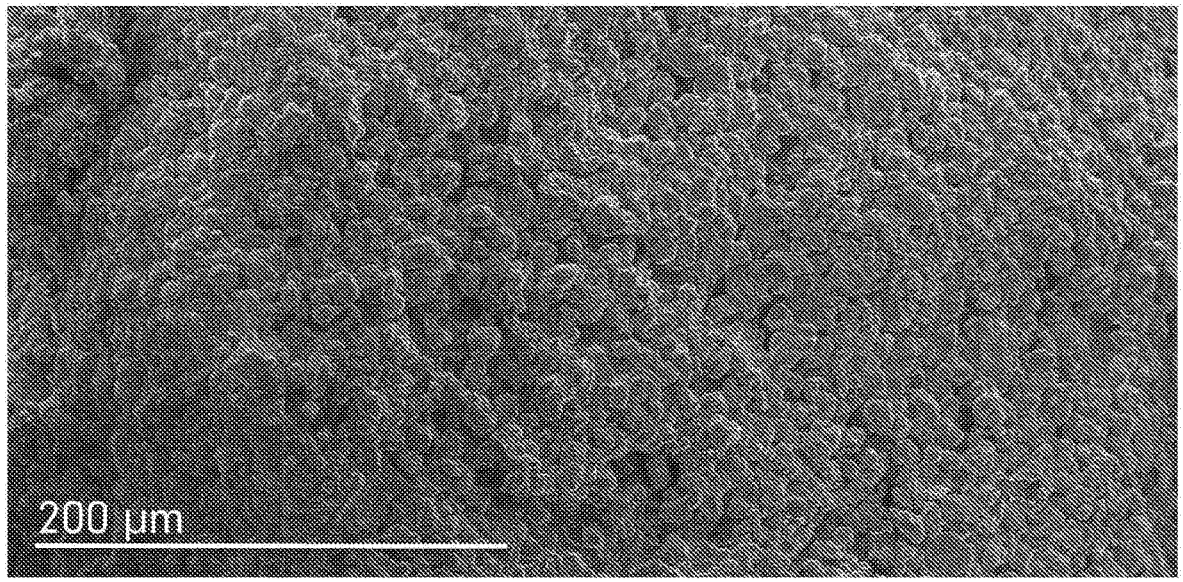
FIG. 11 is a SEM image showing the surface of the polymeric polysulfide according to embodiments of the disclosure after exposure to mercury, where a 12.0 g sample of the polymeric polysulfide (0.5 to 1.0 mm particles) was incubated in an aqueous solution of mercury chloride (30 mL of 20 mg/mL $HgCl_2$) for 24 hours and then imaged using a SEM as per FIG. 8; the scale bar is 200 µm in length.

As discussed, the present inventors have surprisingly found that certain polymeric polysulfides are suitable for removing metals, such as mercury and iron, from a variety of compositions, such as gases, liquids and solids, thereby finding applications in metal removal from water, soil, natural gas, crude oil, produced water in oil and gas production and flue stacks in coal-fired power plants, as well as applications as a soil additive to capture and stabilise metals, for metal recovery in mine tailings and in metal vapour capture in air filtrations systems.

Accordingly, in a first aspect, there is provided a polymeric polysulfide formed by reacting a fatty acid composition comprising at least one unsaturated fatty acid or derivative thereof with sulfur, at a weight ratio between 9:1 and 1:9, under inverse vulcanisation conditions to produce a polymeric polysulfide wherein at least 50% of the fatty acids or derivatives thereof in the fatty acid composition are unsaturated.

The composition of the fatty acid composition is important as it affects the form of the polymeric polysulfide. For example, at least 50% of the fatty acids in the fatty acid composition should be unsaturated. In certain embodiments, at least 50, 55, 60, 65, 70, 75, 80, 85, 90, 95 or 100% of the fatty acids are unsaturated. The exact percentage of unsaturated fatty acids will depend upon the source of the fatty acids. For example, if the fatty acid composition is an oil or is derived from an oil, such as canola oil, then the percentage of unsaturated fatty acids will be approximately 87%. The remaining 13% of the fatty acids will be saturated. As used herein, the term "unsaturated" when used in relation to fatty acids means the fatty acid contains at least one carbon-carbon double bond or triple bond.

While not wishing to be bound by specific theory, it is believed that the polymeric polysulfide is formed by the fatty acid composition reacting with sulfur to cross-link the unsaturated fatty acids by forming carbon-sulfur bonds between them. The carbon-sulphur bonds are formed following S—S bond scission, thereby generating thiyl radicals that can add to the unsaturated fatty acids. An example of the anticipated reaction is shown in FIG. 1. Using a glyceride composition comprising triglycerides as an example, intramolecular carbon-sulphur bonds are formed between the fatty acids of a single triglyceride molecule, and intermolecular carbon-sulphur bonds are formed between the fatty acids of different triglyceride molecules. The intramolecular and intermolecular crosslinking hardens and stiffens the fatty acids and forms a solid rubber composition. Using a fatty acid composition comprising fatty acid esters as another example, intermolecular carbon-sulphur bonds are formed between the fatty acids and the polymeric polysulfide formed has a lower cross-link density relative to the polymeric polysulfide formed from a glyceride composition and, as a result, polymeric polysulfides formed from fatty acid esters tend to be liquids. The percentage of unsaturated fatty acids also affects the cross-link density of the polymeric polysulfide. If the percentage of unsaturated fatty acids is below 50% the cross-link density may be low and the polymeric polysulfide may be, for example, a liquid, a dense oil or gel. The weight ratio of the glyceride composition to sulphur is also an important contributor to the cross-link density. If the amount of sulphur present in the polymeric polysulfide is low, the cross-link density will be low and the polymeric polysulfide will be a liquid, a dense oil or gel. The cross-linking density also influences the thermal stability and glass transition. The thermal stability will be less with less cross-linking.

In certain embodiments, the fatty acid composition is a glyceride composition. The glyceride composition may comprise either one or both of a triglyceride and a diglyceride in a substantially pure form. In certain embodiments, the glyceride composition comprises a mixture of either one or both of triglycerides and diglycerides. In certain embodiments either one or both of the triglyceride and the diglyceride comprise at least one fatty acid having 8 to 24 carbon atoms in the chain inclusive, including, but not limited to, α-linolenic acid, stearidonic acid, stearic acid, ricinoleic acid, dihydroxystearic acid, eicosapentaenoic acid, docosahexaenoic acid, linoleic acid, γ-linolenic acid, dihomo-γ-linolenic acid, arachidonic acid, docosatetraenoic acid, palmitoleic acid, vaccenic acid, paullinic acid, oleic acid, elaidic acid, gondoic acid, erucic acid, nervonic acid or mead acid.

In certain embodiments, the glyceride composition comprises at least one naturally derived oil or synthetic oil. In certain embodiments, the glyceride composition comprises or is derived from at least one oil of acai palm, avocado, brazil nut, canola, castor, corn, cottonseed, grape seed, hazelnut, linseed, mustard, peanut, olive, rice bran, safflower, soybean or sunflower.

Advantageously, the glyceride composition may be a used natural or synthetic oil composition, such as an oil that has previously been used for the production of foodstuffs. This then provides a relatively cheap and/or environmentally useful glyceride composition.

In certain other embodiments, the fatty acid composition is a fatty acid ester composition. The fatty acid ester composition may comprise esters of any one or more unsaturated fatty acids. The ester may be an alkyl ester, such as a methyl ester, an ethyl ester or a propyl ester. The fatty acid esters may be formed from by esterification of fatty acids or by transesterification of a glyceride composition or a fatty acid derivative, such as a fatty acid amide. In certain embodiments the fatty acid has 8 to 24 carbon atoms in the chain inclusive. The fatty acid may be selected from one or more of the group, including, but not limited to, α-linolenic acid, stearidonic acid, stearic acid, ricinoleic acid, dihydroxystearic acid, eicosapentaenoic acid, docosahexaenoic acid, linoleic acid, γ-linolenic acid, dihomo-γ-linolenic acid, arachidonic acid, docosatetraenoic acid, palmitoleic acid, vaccenic acid, paullinic acid, oleic acid, elaidic acid, gondoic acid, erucic acid, nervonic acid or mead acid.

The fatty acid ester may be derived from a natural oil or a synthetic oil. In certain embodiments, the fatty acid ester is derived from at least one oil of acai palm, avocado, brazil nut, canola, castor, corn, cottonseed, grape seed, hazelnut, linseed, mustard, peanut, olive, rice bran, safflower, soybean or sunflower.

The fatty acid ester can be formed by esterification or transesterification using an alcohol and a base or acid catalyst. Suitable base catalysts include organic amine bases such as triethanolamine, isopropyl amine, morpholine, etc., or inorganic bases such as alkali metal or alkaline earth hydroxides, bicarbonates and oxides as for example sodium hydroxide, potassium hydroxide, calcium hydroxide, sodium carbonate, potassium carbonate, sodium bicarbonate, potassium bicarbonate, calcium oxide, etc. Suitable acid catalysts include, for example, alkyl, aryl, or alkylaryl sulfonic acids which include methane sulfonic acid, benzene sulfonic acid, p-toluene sulfonic acid, dodecyl benzene sulfonic acid, etc. Inorganic acids such as sulfuric acid and phosphoric acid can also be effectively used as well as sulfonic acid-type ion-exchange resins.

It will be clear from the use of glycerides and fatty acid esters to form the polymeric polysulfide that a range of carboxylic acid derivatives could be used as the fatty acid starting material. For example, the fatty acid composition could also be a fatty acid amide, a fatty acid thioester, a fatty acid acyl phosphate or a fatty acid anhydride. Methods for making these carboxylic acid derivatives from fatty acids, fatty acid carboxylates, glycerides, fatty acid halides or other fatty acid derivatives are known and any known method can be used to form the starting fatty acid composition.

In certain embodiments, the weight ratio of the fatty acid composition and the sulfur is between 9:1 and 1:9. For example, 8:1, 7:1, 6:1, 5:1, 5:2, 2:1, 3:2, 1:1, 2:3, 1:2, 2:5, 1:5, 1:6, 1:7 or 1:8. Accordingly, in certain embodiments where the fatty acid composition is an oil, such as canola oil, the ratio of canola oil to sulfur could be 1:1. In certain embodiments, the weight ratio of the glyceride composition and the sulphur may be modified as appropriate. It will be appreciated that if the weight ratio of fatty acid composition to sulphur is too high, the capacity for the polymeric polysulfide to absorb or bind a metal of interest may be too low. Conversely, if the weight ratio of fatty acid composition to sulphur is too low, the polymeric polysulfide formed may be too solid. Generally, the lower the weight ratio of fatty acid composition to sulphur, the more likely it is that the polymeric polysulfide will be a solid.

In certain embodiments, the sulfur comprises elemental sulfur. In certain embodiments, the sulphur comprises at least one allotrope of sulphur such as S5, S6, S7 or S8. In certain embodiments, S8 is at least one of alpha-sulfur (commonly called sulfur flowers), beta-sulfur (or crystalline sulfur) or gamma-sulfur (also called mother of pearl sulfur). In certain embodiments, the sulfur comprises any poly-S reagent, intermediate, or product generated from sulphide (such as sodium sulphide), sodium chloride or hydrogen sulphide.

As described above, the polymeric polysulfide may be a solid. In certain embodiments, the polymeric polysulfide is a rubber and therefore has elastomeric properties. For example, at temperatures above approximately −9° C., the polymeric polysulfide is elastic and malleable, whereas below approximately −9° C., the polymeric polysulfide is glassy and brittle (i.e. Tan Delta (Loss/Storage) Peak of −9° C.). In certain embodiments, the polymeric polysulfide is elastic and malleable at temperatures greater than or equal to 0, −1, −2, −3, −4, −5, −6, −7, −8, −9, −10, −11, −12, −13, −14, −15, −15, −16, −17, −18, −19 or −20° C. The temperature at which the polymeric polysulfide becomes glassy and brittle may be reduced by, for example, reducing the sulfur content.

In certain embodiments, the polymeric polysulfide is elastic and malleable at temperatures up to approximately 150° C., whereupon the polymeric polysulfide starts to decompose. In certain embodiments, the polymeric polysulfide starts to decompose at temperatures above approximately 150, 155, 160, 165, 170, 175, 180, 185, 190, 195, 200, 205, 210, 220, 225, 230, 235, 240, 245 or 250° C. The temperature at which the polymeric polysulfide starts to decompose may be increased by, for example, increasing the sulfur content.

In alternative embodiments, the polymeric polysulfide is a liquid. Liquid polymeric polysulfides can be formed by reacting fatty acid esters with sulfur at weight ratios between 9:1 and 1:9.

The polymeric polysulfide is formed by reacting the fatty acid composition with sulfur under inverse vulcanisation conditions. Inverse vulcanisation involves adding the fatty acid composition to relatively high weight percentages of liquid sulfur. This is in contrast to classic vulcanisation which involves adding relatively low weight percentages of sulfur to a hot fatty acid composition. Thus, in certain embodiments, the conditions comprise reacting the fatty acid composition with sulfur at a temperature above the melting point of sulfur, being 119° C., at atmospheric pressure. Accordingly, in certain embodiments the conditions comprise reacting the fatty acid composition with sulphur at temperatures above 120, 125, 130, 135, 140, 145, 150, 155, 160, 165, 170, 175, 180, 185, 190, 195 or 200° C. In certain embodiments, the conditions comprise reacting the fatty acid composition with sulphur at approximately 160, 170, 180, 190 or 200° C. In certain embodiments, the conditions comprise reacting the fatty acid composition with sulphur at temperatures outside the above defined temperatures, according to changes in pressure or time, or the presence of accelerators, retardants or antidegradants.

Thus, there is provided a method for producing a polymeric polysulfide, the method comprising: providing a fatty acid composition comprising at least one unsaturated fatty acid or derivative thereof and wherein at least 50% of the fatty acids or derivatives thereof in the fatty acid composition are unsaturated; reacting the fatty acid composition with molten sulfur at a weight ratio between 9:1 and 1:9 under conditions to produce the polymeric polysulfide. There is also provided a polymeric polysulfide produced by this method.

In certain embodiments, the conditions comprise reacting the fatty acid composition with sulphur at atmospheric pressure. In certain embodiments, the conditions comprise reacting the fatty acid composition with sulphur at a pressure above atmospheric pressure (i.e. at a pressure greater than 1.01325 bar), for example, 2, 3, 4, 5, 6, 7, 8, 9, 10, 11, 12, 13, 14, 15, 16, 17, 18, 19, 20 bar or more. In certain embodiments, the conditions comprise reacting the fatty acid composition with sulphur at a pressure below atmospheric pressure, for example, 0.9, 0.8, 0.7, 0.6, 0.5, 0.4, 0.3, 0.2, 0.1 or 0 bar. Reacting the fatty acid composition with sulphur at a pressure above atmospheric pressure may reduce the reaction time. In certain embodiments, the conditions comprise reacting the fatty acid composition with sulphur at pressures outside the above defined pressures, according to changes in temperature or time, or the presence of accelerators, retardants or antidegradants.

In certain embodiments, the conditions comprise reacting the fatty acid composition with sulphur for a period of time sufficient to cross-link the unsaturated fatty acids. In certain embodiments, the conditions comprise reacting the fatty acid composition with sulfur for a period time greater than 1 minute. In certain embodiments, the conditions comprise reacting the fatty acid composition with sulphur for a period of time between five and 10 minutes, five and 15 minutes, five and 20 minutes, five and 25 minutes, five and 30 minutes, five and 40 minutes, five and 50 minutes, five and 60 minutes, greater than 60 minutes or for any period of time within these defined periods. In certain embodiments, the conditions comprise reacting the fatty acid composition with sulphur for times outside the above defined times, according to changes in temperature or pressure, or the presence of accelerators, retardants or antidegradants.

In certain embodiments, the conditions comprise reacting the fatty acid composition with sulfur in the presence of at least one accelerator, retardant or antidegradant. The inclusion of at least one accelerator, retardant or antidegradant, may require changes to the temperature, time, or pressure of the reaction.

Accelerants may be used to accelerate the reactions between the fatty acid composition and sulfur, and are broadly classified as slow accelerators, medium accelerators, semi ultra-accelerators, and ultra-accelerators. Examples of suitable accelerators include as UV light, zinc oxide, stearic acid, benzothiazoles such as 2-mercaptobenzothiazoles, 2,2'-dithiobis(benzothiazole), N-cyclohexyl-benzothiazole-2-sulfenamide, N-t-butylbenzothiazole-2-sulfenamide, 2-(morpholinothio) benzothiazole, N-dicyclohexylbenzothiazole-2-sulfenamide, tetramethylthiuram monosulfide, tetramethylthiuram disulfide, zinc dimethyldithiocarbamate, zinc diethyldithiocarbamate, or the like.

An additional level of control is achieved by retarding agents that inhibit the reaction between the fatty acid composition and sulfur until an optimal time or temperature. Examples of suitable retardants include oxygen, air, any thiol (R—SH), phthalic anhydride or N-nitroso diphenylamine.

Antidegradants are used to prevent degradation of the polymerised polysulfide by heat, oxygen and ozone. Examples of suitable antidegradants include p-phenylenediamines, dihydroquinolines, ethylene diurea or paraffin waxes.

Following and/or during formation, the polymeric polysulfide may undergo additional processing steps. For example, additional processing steps may be carried out to change the physical form of the polymeric sulphide or to produce the polymeric polysulfide in a desired physical form. As described herein, solid polymeric polysulfides may be contacted with solid, liquid or gaseous metal containing compositions in order to remove one or metals from the composition. In these applications, a high surface area polymeric polysulfide is desirable. In one example, the polymeric polysulfide can be comminuted to produce particles of a desired size. In another example, the polymeric polysulfide may be foamed during production by introducing a gas or liquid into the composition as it forms. Other ways of increasing the surface area of the polymeric polysulfide that can be used include, but are not limited to, the use of porogens, electrospinning, high surface-area coating, high surface-area casting, and the like.

In certain embodiments, a porous polymeric polysulfide can be formed by including a porogen in the fatty acid composition/sulfur reaction mixture. The porogen may be any inert, crystalline water-soluble material. For example, sodium chloride crystals can be used as a porogen.

Thus, a porous polymeric polysulfide can be formed by dispersing a porogen in a reaction mixture comprising molten sulphur and a fatty acid composition comprising at least one unsaturated fatty acid or derivative thereof and wherein at least 50% of the fatty acids or derivatives thereof in the fatty acid composition are unsaturated at a weight ratio between 9:1 and 1:9 under conditions to produce the polymeric polysulfide, and removing the porogen from the porous polymeric polysulfide. When the porogen is water soluble, it may be removed from the porous polymeric polysulfide by washing with water.

The surface area of liquid polymeric polysulfides can be increased by forming an emulsion, such as an oil in water emulsion, by distributing the liquid polymeric polysulfide over a surface, such as a high surface area surface, adsorbing the liquid polymeric polysulfide into the surface of particles, and the like.

In certain embodiments, the polymeric polysulfide is contacted with a liquid or a gas to remove residual hydrogen sulphide. In certain embodiments, the polymeric polysulfide is contacted with either one or both of NaOH and NaOCl to remove residual hydrogen sulphide. In certain embodiments the molarity of the either one or both of NaOH and NaOCl is between 0.01 molar (M) and 2 M. In certain embodiments, the polymeric polysulfide is contacted with either one or both of NaOH and NaOCl for a sufficient period of time to remove residual hydrogen sulphide, for example, greater than five minutes, greater than 10 minutes, greater than 20 minutes, greater than 40 minutes, greater than 60 minutes, greater than 90 minutes, or any range between these defined times. In certain embodiments, the pH is kept higher than 9 by continuously adding NaOH. In alternative embodiments, liquid-phase oxidation may be used to convert hydrogen sulphide into elemental sulfur through redox reactions by electron transfer from sources such as iron reagents. For example, hydrogen sulfide may be absorbed into an aqueous, alkali solution, and then oxidized to elemental sulfur, while the iron reagent is reduced. In certain embodiments, other physical solvents may be used, such as, methanol, propylene carbonate, and ethers of polyethylene glycol. Criteria for selecting a physical solvent are high absorption capacity, low reactivity with equipment and gas constituents and low viscosity.

As outlined above, additional processing steps may include comminuting the polymeric polysulfide into smaller particles. The smaller particles have an increased surface area and may be more suitable for adsorbing metals. Suitable comminuting processes include grinding, chopping, impact or the like. Suitable chopping processes include using a rotating blade, hydraulically agitated knife, granulator, hammer mill, extruder or using discs with either grooves or pins. Suitable grinding processes include high speed grinding or using a ball mill. Comminuting processes may be performed at ambient temperatures or at reduced or increased temperatures. Comminuting at cryogenic temperatures produces fine powder without temperature stress. However, cryogenically ground powder has a smooth surface and a lower relative surface area.

In certain embodiments, the polymeric polysulfide may be prepared for use by comminuting a solid polymeric polysulfide into particles having a size greater than 0.1 mm. In certain embodiments, the polymeric polysulfide particles range in size from 0.1 mm to 100 mm. In certain embodiments, the polymeric polysulfide comprises particles having an average size of about 0.2, 0.3, 0.4, 0.5, 0.6, 0.7, 0.8, 0.9, 1.0, 1.5, 2.0, 2.5, 3.0, 3.5, 4.0, 4.5, 5.0, 5.5, 6.0, 6.5, 7.0, 7.5, 8.0, 8.5, 9.0, 10.0, 10.5, 11.0, 11.5, 12.0, 12.5, 13.0, 13.5, 14.0, 14.5, 15.0, 15.5, 16.0, 16.5, 17.0, 17.5, 18.0, 18.5, 19.0, 19.5, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100 mm or any range within these defined sizes.

In certain embodiments, the polymeric polysulfide has a defined elemental composition, for example, a sulphur to carbon ratio between 1:9 and 9:1. For example, 8:1, 7:1, 6:1, 5:1, 5:2, 2:1, 3:2, 1:1, 2:3, 1:2, 2:5, 1:5, 1:6, 1:7 or 1:8. In certain embodiments, the weight ratio of the fatty acid composition and the sulphur may be modified as appropriate. In certain embodiments, the polymeric polysulfide has an elemental mass ratio of approximately C: 41%, H:6%, O:6%, S:46%, for example, where the ratio of the fatty acid composition to sulphur is approximately 1:1. As would be apparent to the person skilled in the art, the elemental mass ratio of the polymeric polysulfide would be altered according to the ratio of the fatty acid composition to sulphur.

After production, the polymeric polysulfide may undergo additional processing steps in order to change the reactivity of the polysulfide. For example, the polymeric polysulfide may be contacted with a reducing agent to reduce at least some of the sulfide (—S—S—) bonds to produce thiol (—S—H) bonds. The thiols can potentially modulate binding to certain metals such as mercury. Any suitable reducing agent can be used and a range of reducing agents are known for reducing protein disulphide bonds. Sodium borohydride is an example of a suitable reducing agent. In the case of a solid polymeric polysulfide, access of the reducing agent to sulfide bonds that are positioned within the bulk solid may be limited and so reduction may predominately occur in surface sulfide bonds. For liquid polymeric polysulfides, the amount of reducing agent used may be calculated so as not to reduce all sulfide bonds in the polymeric polysulfide.

In a second aspect of the present disclosure, there is provided a metal removal composition comprising the polymeric polysulfide of the present disclosure and wherein the metal removal composition is suitable for removing at least one metal from a metal containing composition or surface. The metal may be a base metal, a noble metal, a precious metal or a heavy metal. In certain specific embodiments, the metal is selected from one or more of the group consisting of mercury, cadmium, silver, gold, lead, arsenic, nickel, zinc, and iron. The metal may be in the form of an inorganic metal, salt or complex, an organic metal salt or complex or an elemental metal. The metal removal composition is particularly suitable for removing any one or more of inorganic mercury, organic mercury or elemental mercury.

In a fifth aspect of the present disclosure, there is provided a method for removing one or more metals from a metal containing composition or surface, the method comprising contacting the metal containing composition or surface with the polymeric polysulfide of the present disclosure under conditions to remove at least some of the metal from the metal ion containing composition or surface. In certain embodiments, the metal is mercury. In certain embodiments, the mercury is inorganic mercury. In certain embodiments, the mercury is organic mercury. In certain embodiments, the mercury is elemental mercury. In other embodiments, the metal is iron. In certain embodiments, the iron is inorganic iron. In certain embodiments, the iron is organic iron. In certain embodiments, the iron is elemental iron.

In certain embodiments, the polymeric polysulfide is used to remove mercury from a mercury containing composition, such as, a gas, liquid or a solid. For example, the mercury containing composition may comprise at least one of water, soil, mine tailings, natural gas, crude oil, produced water in oil and gas production or combustion gases in coal-fired power plants. It will be appreciated that the polymeric polysulfide can also be used to remove mercury from other mercury containing compositions.

In certain embodiments, the metal containing composition may undergo a pre-treatment process. For example, when the metal containing composition is soil, the soil may be broken up into smaller particles to increase the available surface area for contacting the polymeric polysulfide.

The metal containing composition may be contacted with more than one polymeric polysulfide. When more than one polymeric polysulfide contacts the metal containing composition, each polymeric polysulfide may contact the metal containing composition sequentially or non-sequentially. In certain embodiments, the metal containing composition undergoes a different treatment in between contacting the polymeric polysulfides. For example, the metal of interest in the metal containing composition could be oxidised from an elemental metal to an inorganic or organic metal. In another example, a mercury containing composition could be heated to convert mercury to a gaseous form. In a further example, the metal containing composition could be treated with a lixiviant to solubilise the metal in a liquid mixture.

The polymeric polysulfide may be brought into contact with the metal containing composition in any suitable manner. In certain embodiments, the polymeric polysulfide is brought into contact with the metal containing composition in a vessel such as a beaker, tube, pipe, bottle, flask, carboy, bucket, tub, tank, in any other suitable vessel known in the art or in any other means of storing, containing or transferring the metal containing composition. In embodiments the polymeric polysulfide contacts the metal containing composition in a batch or continuous process.

Optionally, the polymeric polysulfide may be agitated when contacting the metal containing composition. Any suitable method of agitation may be used including shaking, staring, vortex mixing, magnetic stirring and sparging.

The time required to contact the metal containing composition with the polymeric polysulfide depends on many factors including: the composition of the polymeric polysulfide, the nature of the metal containing composition, the temperature, agitation and any other relevant factors. In certain embodiments, the metal containing composition is contacted with the polymeric polysulfide for a time period between 0.1 seconds and 10 or more weeks. In certain embodiments, the metal containing composition is contacted with the polymeric polysulfide for a time period of 0.01 minutes to 10 weeks, 1 minute to 4 weeks, 1 minute to 2 weeks, 1 minute to 1 week, 1 minute to 2 hours, 1 minute to 1 hour, 1 minute to 30 minutes, 1 minute to 20 minutes, 1 minute to 10 minutes, 1 minute to 5 minutes, or any time or range within these specified ranges. A short contact time, for example, approximately one second, may be preferred where the metal containing composition is a hot gas comprising mercury. A medium contact time, for example, approximately one second to four hours, may be preferred where the metal containing composition is a liquid comprising mercury. Alternatively, a long contact time, for example, approximately 1 to 10 or more weeks, may be preferred where the metal containing composition is soil. As would be appreciated by the person skilled in the art, the contact time may be altered to optimise removal of the metal from the metal containing composition.

In certain embodiments, the metal containing composition comprises a mercury containing liquid or gas and the method comprises passing the mercury containing liquid or gas over a bed of polymeric polysulfide particles or through a column or tower packed with polymeric polysulfide particles. In certain embodiments, the bed of polymeric polysulfide particles may be impregnated or mixed through a porous medium. The porous medium may be arranged in a bed of the porous medium or packed into a column or tower. The mercury containing liquid or gas may then be passed over the bed of the porous medium or passed through the packed column or tower. In certain embodiments, the polymeric polysulfide particles are fixed to a solid substrate. The solid substrate may comprise the internal surface of a receptacle or pipe used to transfer or store the mercury containing liquid or gas, a flue stack, one or more plates or screens, or the like. In certain embodiments, the one or more plates or screens may be arranged parallel to one another. In certain embodiments, the one or more plates or screens may be contained within a housing, for example, as a filtration unit. However, a filtration unit need not be limited to containing plates or screens and therefore, in certain embodiments, a filtration unit may comprise an inlet and an outlet with polymeric polysulfide therebetween, so that a mercury containing liquid or gas passing from the inlet to the outlet will contact the polymeric polysulfide.

In certain embodiments, the polymeric polysulfide may be used for metal removal from flue stacks of coal-fired power plants. Particles of the polymeric polysulfide can be placed in an exhaust column, tower or flue. The particles may be packed into the column and retained therein by blocking off either one or both ends of the column using a support, such as a filter, ceramic beads or a grating, that allows the flue gas to pass through the column whilst retaining the particles therein. Alternatively, the particles could be placed in a bed or series of beds over which the flue gas passes.

In certain embodiments, the polymeric polysulfide may be used for metal removal from water. Particles of the polysulfide can be placed in a pipe, column or filter, over which contaminated water passes. The particles can also be placed in a bed or series of beds. When using a column, additional hydraulic lubricants (silica or sand) may be added to ensure regulated back pressures and even fluid flow.

In certain embodiments, the metal containing composition comprises a metal containing solid and the method comprises contacting the metal containing solid with at least one polymeric polysulfide particle. In certain embodiments, the metal containing solid is a soil, such as, clay, silt, peat, loam, gravel, sand or rock. In certain embodiments, the metal containing solid is contacted with the at least one polymeric polysulfide particle in situ or ex situ. For example, in certain embodiments, where the metal containing solid is a soil such as loam, the soil may be excavated and mixed with an appropriate amount of polymeric polysulfide particles or liquid. In alternative embodiments, polymeric polysulfide particles or liquid may be ploughed into the soil. In certain embodiments, the polymeric polysulfide can be milled with the soil mechanically to ensure contact with the metal and the polymeric polysulfide. The particles of the polymeric polysulfide may be larger than the particles of soil, so that the particles of the polymeric polysulfide can be separated mechanically through a sieve. In other embodiments, the polymeric polysulfide particles may be inserted into cavities or boreholes created by drilling techniques, such as, horizontal directional drilling or other drilling techniques. The polymeric polysulfide can then be left in the environment where any captured metal does not leach from the polymeric polysulfide. In certain embodiments, the polymeric polysulfide can be added to the soil and mixed (by milling, for example), and, similarly to above, the mixture can be left in the environment as a metal stabilised mixture where the metal does not leach from the polymeric polysulfide.

In certain embodiments, the polymeric polysulfide may bind up to 1, 2, 3, 4, 5, 6, 7, 8, 9 or 10% of its mass in inorganic metal. In certain embodiments, the polymeric polysulfide may bind up to up to 1, 2, 3, 4, 5, 6, 7, 8, 9, 10, 1, 12, 13, 14, 15, 16, 17, 18, 19 or 20% of its mass in elemental metal. The amount of polymeric polysulfide required to remove the metal of interest from the metal containing composition may be determined by the person skilled in the art and according to, for example, the mass of the metal containing composition, the type of metal present in the metal containing composition and the level of metal contamination of the metal containing composition.

In certain embodiments, contacting the metal containing composition with the polymeric polysulfide provides a resultant mixture including a metal-bound polymeric polysulfide and a treated composition. In certain embodiments, the resultant mixture may be processed further to separate or extract the metal-bound polymeric polysulfide from the treated composition. Suitable processing steps may include mechanical separation based on size, for example, passing through a sieve, where the metal containing composition is a solid. Suitable processing steps may also include filtration or centrifugation, where the metal containing composition is a liquid, such as water.

In certain embodiments, when the polymeric polysulfide has bound metal, substantially no metal is released from the polymeric polysulfide. In certain embodiments, when the polymeric polysulfide has bound metal, substantially no metal is released over a period of 1 week, 1, 2, 3, 4, 5, 6, 7, 8, 9, 10 or 11 months, 1, 2, 3, 4, 5, 6, 7, 8, 9 or 10 years or more, or any range within these defined periods of time. In certain embodiments, when the polymeric polysulfide has bound metal, substantially no metal is released until the polymeric polysulfide begins to degrade, for example, due to environmental exposure or microbial degradation.

In certain embodiments, the metal-bound polymeric polysulfide may be processed further to separate or extract the metal from the polymeric polysulfide. Suitable processing steps may include thermal desorption, combustion or treatment with a lixiviant, such as cyanide.

In a sixth aspect of the present disclosure, there is provided a use of the polymeric polysulfide of the present disclosure for removing at least one metal from a metal containing composition or surface, comprising contacting the metal containing composition or surface with the polymeric polysulfide under conditions to remove at least some of the metal from the metal containing composition or surface.

In a seventh aspect of the present disclosure, there is provided a solid substrate comprising the polymeric polysulfide of the present disclosure on a surface thereof. In certain embodiments, the substrate comprises the internal surface of a receptacle or pipe used to transfer or store a metal containing liquid or gas. In certain embodiments, the substrate comprises one or more plates or screens, which may be arranged so as to maximise the available surface area for contact with a metal containing composition, for example, in a parallel arrangement. In certain embodiments, the one or more plates or screens may be contained within a housing, for example, as a filtration unit. In certain embodiments, the substrate comprises a porous medium and a bed of polymeric polysulfide particles are impregnated through the porous medium. The porous medium may be arranged as a bed of the porous medium or packed into a column or tower. In use, a metal containing liquid or gas may then be passed over the substrate.

In an eighth aspect of the present disclosure, there is provided a column for removing a metal from a metal containing composition, the column comprising particles of the polymeric polysulfide of the present disclosure.

In a ninth aspect of the present disclosure, there is provided a method for removing a metal from a metal containing solid substrate, comprising contacting the metal containing solid substrate with the polymeric polysulfide of the present disclosure, wherein the metal containing solid substrate is soil.

In a tenth aspect of the present disclosure, there is provided a treated composition, which has been produced by contacting a metal containing composition with the polymeric polysulfide of the present disclosure under conditions to provide a metal-bound polymeric polysulfide and the treated composition, wherein the treated composition comprises less metal than the untreated metal containing composition.

In an eleventh aspect of the present disclosure, there is provided a method for stripping a metal from a metal-bound polymeric polysulfide, comprising contacting a metal-bound polymeric polysulfide with a metal stripping composition under conditions to strip at least some of the metal from the metal-bound polymeric polysulfide to provide a resultant mixture comprising a metal-stripped polymeric polysulfide. In certain embodiments, the metal stripping composition comprises a lixiviant, such as such as cyanide. In certain embodiments, the metal stripping composition comprises a metal precipitating agent or thiol surfactant, such as a dialkyldithiocarbamate (e.g. potassium dimethyldithiocarbamate), to form stable metal-carbamate complexes. A molar ratio of dialkyldithiocarbamate to metal of approximately 2:1 should precipitate most of the metal present. The metal-carbamate complexes can be separated from the resultant mixture (including the metal-stripped polymeric polysulfide) by, for example, filtration, flotation or settling. In certain embodiments, the conditions comprise contacting the metal-bound polymeric polysulfide with the metal stripping composition at a pH greater than 4, at an alkaline pH, at a pH between about 8 and about 11 or at a pH of about 10.

The method of the eleventh aspect may be used for various purposes, such as stripping the metal for metal capture, to render the metal-bound polymeric polysulfide safe or to regenerate the polymeric polysulfide for reuse. Accordingly, in certain embodiments, the metal-stripped polymeric polysulfide (i.e. regenerated polymeric polysulfide) is suitable for reuse in removing metal from a metal containing composition. The method of the eleventh aspect may also be combined with any other aspect, for example, aspects two through ten may result in metal-bound polymeric polysulfide being produced, and this metal-bound polymeric polysulfide may be subjected to the method of the eleventh aspect.

As would be appreciated by the person skilled in the art, the above aspects of the present disclosure need not be limited to the description of each individual aspect, but may import features from other aspects, for example, importing features of the method of the third aspect into the use of the fourth aspect.

EXAMPLES

Example 1—Solid Polymeric Polysulfide Synthesis

Sulfur (technical grade, 20.0 g) was added to a 100 mL round bottom flask and then melted with stirring to 180° C. Canola oil (20.0 g) was then added dropwise over 3-5 minutes, resulting in a two-phase mixture. The mixture was stirred vigorously to ensure efficient mixing of the two phases. The mixture appeared to form one phase after approximately 10 minutes. Heating was continued for an additional 10 minutes at 180° C. Over this time, the product formed a rubbery solid. The material was then removed from the flask and then blended for 3 minutes (8.5 cm rotating blade) to provide rubber particles ranging in size from 0.2 to 12 mm in diameter with an average diameter of 2 mm. The particles were then transferred to a 250 mL round bottom flask and treated with enough 0.1 M NaOH to cover the particles entirely (~60 mL). This mixture was stirred for 90 minutes at room temperature to remove residual hydrogen sulfide. After this time, the particles were isolated by filtration and then washed on the filter with deionised water (3×~50 mL). The particles were then collected from the filter and air dried at room temperature and pressure for 24 hours. Typically, this procedure provided a final mass of between 38-40 g of the washed and dried polymeric polysulfide particles (95-99% yield).

Example 2—Polymeric Polysulfide Capture of Mercury Chloride from Water

The polymeric polysulfide (2.0 g) of Example 1 was added to a 20 mL glass vial, followed by 5 mL of a 20 mg/mL aqueous $HgCl_2$ solution (100 mg total $HgCl_2$). The mixture was incubated without stirring for 24 hours. A control sample containing just water and the polymeric polysulfide (and no $HgCl_2$) was also run in parallel. After 24 hours, the polysulfide was isolated by filtration and washed with 3 aliquots of 5 mL deionised water. The aqueous solution was then transferred to a pre-weighed 50 mL round bottom flask and the water removed by rotary evaporation to provide unsequestered $HgCl_2$. The experiment was run in triplicate resulting in an average of 46 mg of $HgCl_2$ remaining in solution and 54 mg bound to the polysulfide. Notably, the polysulfide underwent a change in colour during the incubation, from brown to grey. No colour change was observed if mercury was not present. See FIGS. 2 and 3.

A similar experiment was carried out at lower concentrations of $HgCl_2$. A solution of aqueous mercury chloride was made up to 3.5 ppm mercury (as measured by ICP-MS). 5 mL of this mercury chloride solution was incubated with 2.00 g of the canola oil polysulfide (50% sulfur) for 24 hours. After this time, a 1 mL aliquot of the liquid was filtered through a 0.2 μm syringe filter and the concentration of mercury was measured by ICP-MS. An average concentration of 0.35 ppm of mercury remained (average of triplicate experiments), indicating that 90% of the mercury was captured under these conditions.

Example 3—Effect of the Amount of Polymeric Polysulfide on the Capture of Mercury Chloride from Water The procedure above was repeated with different quantities of the polymeric polysulfide of Example 1, namely 250 mg, 500 mg, 1.00 g, 2.00 g, 4.00 g and 8.00 g. The volume and concentration of aqueous $HgCl_2$ remained the same for each sample (5 mL of a 20 mg/mL aqueous solution of $HgCl_2$), as did the incubation time (24 hours). As the mass of polysulfide increased, the mass of $HgCl_2$ remaining in solution after the 24 hour incubation decreased. This is likely because of the increased surface area available to bind to mercury. This experiment also indicates that the maximum amount of mercury bound by weight for this particle size is 4%. The results are in Table 1.

TABLE 1

EFFECT OF POLYMERIC POLYSULFIDE MASS ON AQUEOUS MERCURY CHLORIDE CAPTURE

| Mass Polysulfide (g) | $HgCl_2$ remaining (mg) | $HgCl_2$ sequestered (mg) | % $HgCl_2$ sequestered |
|---|---|---|---|
| 0.25 | 91 | 9 | 9 |
| 0.50 | 82 | 18 | 18 |
| 1.00 | 60 | 40 | 40 |
| 2.00 | 42 | 58 | 58 |
| 4.00 | 23 | 78 | 78 |
| 8.00 | 9 | 91 | 91 |

Example 4—Effect of Mercury(II) Concentration on Mercury(II) Capture

The general procedure (as per Example 3) was repeated with different concentrations of mercury chloride: 20, 10 and 5 mg mL$^{-1}$. The volume of water (5.0 mL) and mass of polymeric polysulfide (2.00 g) remained the same for each sample, as did the incubation time (24 hours). As shown in Table 2, there was not a substantial difference in mercury capture efficiency over this concentration range.

TABLE 2

EFFECT OF MERCURY CHLORIDE CONCENTRATION ON AQUEOUS MERCURY CHLORIDE CAPTURE

| Concentration $HgCl_2$ (mg mL$^{-1}$) | Total $HgCl_2$ (mg) | $HgCl_2$ remaining (mg) | $HgCl_2$ sequestered (mg) | % $HgCl_2$ sequestered |
|---|---|---|---|---|
| 5 | 25 | 6 | 19 | 76 |
| 10 | 50 | 18 | 32 | 63 |
| 20 | 100 | 38 | 62 | 62 |

Example 5—Mercury(II) Chloride Capture at Low Concentrations (Measured by ICP-MS)

A solution of aqueous mercury chloride was made up to 3.5 ppm mercury (as measured by ICP-MS). 5 mL of this mercury chloride solution was incubated with 2 g of the polysulfide for 24 hours. After this time 1 mL of treated liquid was filtered through a 0.2 μm syringe filter and the concentration of mercury remaining measured by ICP-MS. An average concentration of 0.35 ppm of mercury remained (average of triplicate experiments), indicating that 90% of the mercury was captured.

Example 6—Mercury Leaching Study 1.0 g samples of mercury chloride-treated polymeric polysulfides were incubated in 10 mL milliQ water for 24 hours (2.2 mg total $HgCl_2$). The water was then tested by ICP-MS against an ICP standard of Hg in 2% $HNO_3$ (1% $HNO_3$ and 1% HCl in water used as a diluent) to determine the concentration of mercury that had leached from the polymer over this time. Tests were run in duplicate. Both samples were diluted 1/10 in a 1% $HNO_3$ and 1% HCl in water matrix. Samples were run in He mode to ensure ions flew monatomically. The results are shown in Table 3.

TABLE 3

LEACHING STUDY OF MERCURY CHLORIDE, BOUND TO THE CANOLA OIL POLYSULFIDE (50% SULFUR)

| Sample | Conc. Hg (ppb) leached into water | Description |
|---|---|---|
| $HgCl_2$ (1) | 0.51 | $HgCl_2$-treated canola oil polymeric polysulfides (50% sulfur), 24 hour incubation in milliQ water - first replicate |
| $HgCl_2$ (2) | 0.64 | Replicate |
| Average | 0.57 | |
| Water | 0.24 | milliQ water (control) |
| Polysulfide | 0.30 | Untreated canola oil polysulfide (50% sulfur) 24 hr incubation water (control) |

The results indicate that leaching into water is negligible. If all mercury chloride were leached from the polymeric polysulfide, a concentration of 0.22 mg/mL or 220,000 ppb would be measured. An average of only 0.57 ppb $Hg^{2+}$ was detected in the leachate.

Example 7—Polymeric Polysulfide Reactive Capture of Elemental Mercury [$Hg^{(0)}$]

The polymeric polysulfide of Example 1 (2.0 g) and 170 mg elemental mercury were added to a glass vial containing 7 mL deionised water. The mixture was stirred vigorously for 24 hours at room temperature. After this time, no elemental mercury was visible and the polymeric polysulfide had changed colour from brown to black. The colour change occurred after approximately four hours of vigorous stirring at room temperature. The colour change correlates with mercury capture and occurs on the surface of the particle. See FIGS. 4, 5 6 and 7. This experiment was also repeated at 10% w/w polymeric polysulfide, i.e. 100 mg mercury and 1.0 g polymeric polysulfide, where substantially all mercury was removed leaving a black powder with a mass equal to both the mercury and the polymeric polysulfide (99.3% yield measured). Accordingly, it is anticipated that >95% elemental mercury (typically) reacts with the polymeric polysulfide.

Example 8—Polymeric Polysulfide Capture of Mercury from Soil

The canola oil polysulfide (50% sulfur) was prepared as particles ranging from 1.0-2.5 mm (this particle distribution was obtained using a sieve). These particles (5.0 g) were added to a 50 mL centrifuge tube containing 5.0 g of powdered loam (<0.5 mm particle size) containing 200 mg of floured mercury (~50 μm mercury beads covered by soil particles and dispersed in the soil). The solid mixture was milled on an end-over-end mixer at 30 rpm at room temperature for 24 hours (no water or solvent was added). After this time, the polysulfide particles turned black. The particles were isolated using a sieve and analysed by SEM and EDS to verify that mercury was captured and could be removed from soil.

Example 9—Capturing Mercury Flour Using the Canola Oil Polysulfide

Loam was obtained from Glenalta, South Australia and ground with a mortar and pestle before passing through a sieve to obtain a soil with particle size less than 0.50 mm. 5.00 g of this powdered soil was sealed in a 50 mL centrifuge tube with 200 mg elemental mercury and rotated (30 rpm) on an end-over-end mixer for 24 hours. After this time the mercury was no longer visible to the naked eye, having been dispersed throughout the soil. There was no visible difference between the soil before or after treatment with mercury.

5.0 g canola oil polymeric polysulfide (50% sulfur) of a particle range of 1.0-2.5 mm was isolated using a sieve. These particles were added to 5.0 g of the simulated mercury flour and mixed in a 50 mL centrifuge tube on an endover-end mixer for 24 hours. A control sample treated identically but without the addition of mercury was also prepared for comparison. Over this time, the polymer in the presence of mercury turned black, indicating reaction with the mercury flour. The polymer in the soil in which no mercury was added remained brown. The polymer particles were then separated from the bulk of the soil using a sieve. EDS analysis clearly indicated that mercury was bound to the polymer. This experiment demonstrates that the canola oil polysulfide, prepared as a particle, can capture mercury from soil and then be isolated using a sieve.

Example 10—SEM Analysis of Solid Polymeric Polysulfide

The polymeric polysulfide was prepared according to the procedure outlined in Example 1, providing a distribution of particles from 0.2 to 12 mm. These particles were then passed through two polyethylene sieves to obtain particles in the range of 0.5 to 1 mm. A sample of these particles were then mounted on an aluminium SEM pin mount using carbon tape before sputter coating with platinum. Subsequent SEM analysis revealed the surface of the polymeric polysulfide to be microtextured—an important property that increases surface area. See FIGS. 8, 9 and 10.

Figure 12:
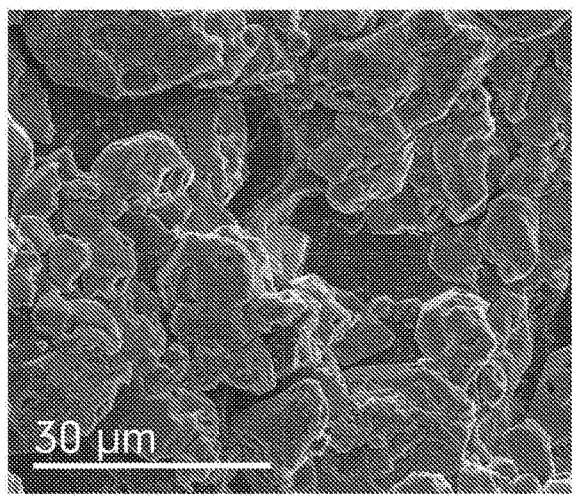
FIG. 12 is a SEM image showing the surface of the polymeric polysulfide of FIG. 11; the scale bar is 30 µm in length.
Figure 13:
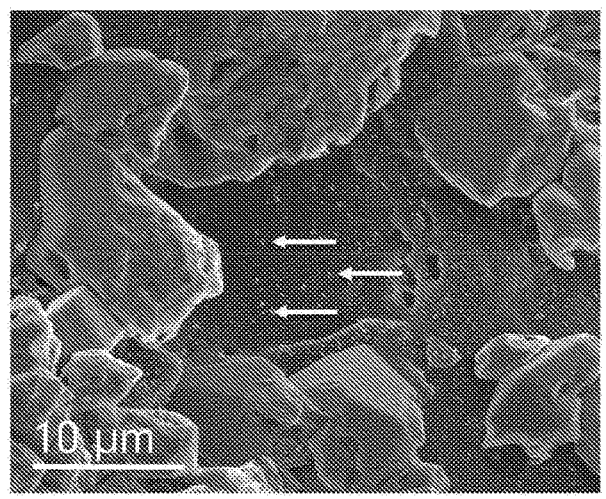
FIG. 13 is a SEM image showing the surface of the polymeric polysulfide of FIG. 11; the scale bar is 10 µm in length; mercury rich nanoparticles were detected on the surface of the polymer (see arrows for representative examples); the presence of mercury in mercury rich nanoparticles was verified by energy-dispersive X-ray spectroscopy (EDS) shown in FIGS. 14 to 17.
Figure 17:
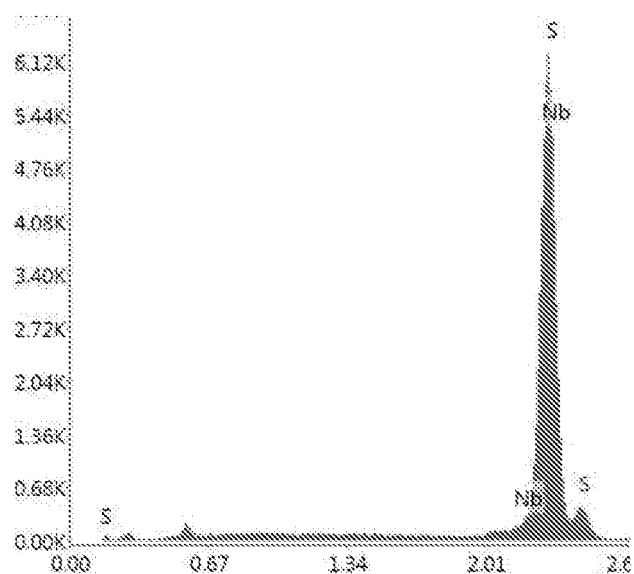
FIG. 17 shows an EDS analysis of Spot 3 shown in FIG. 14 Spot 3 is centred on a microparticle domain of the polymeric polysulfide which is shown to be a sulfur rich domain of the polymeric polysulfide.
Figure 18:
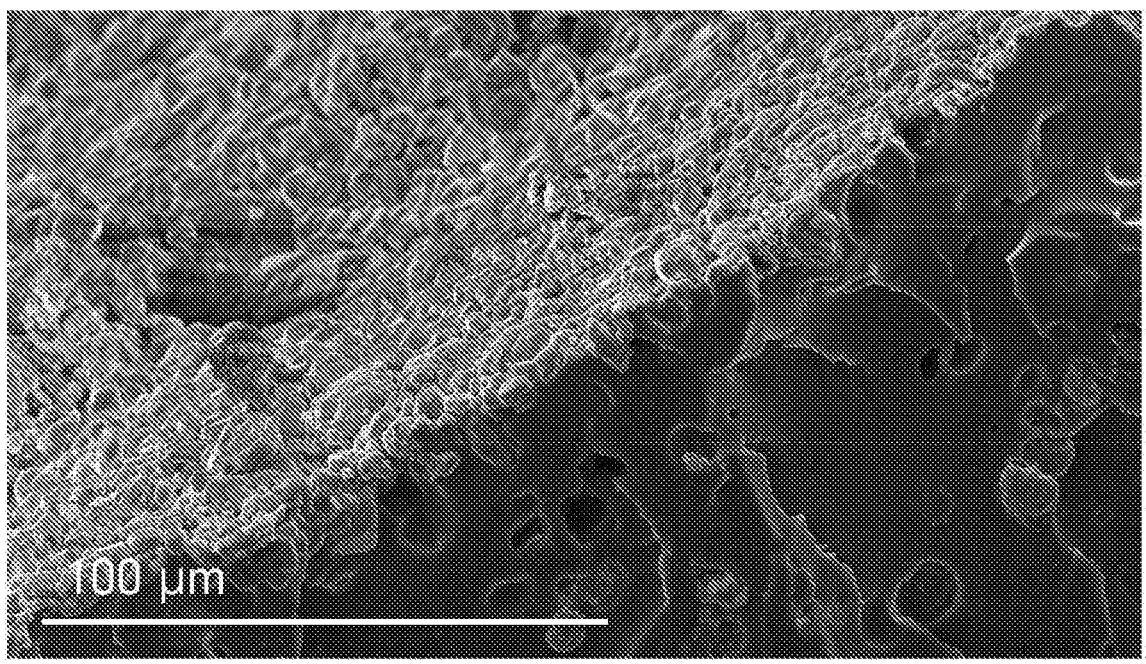
FIG. 18 is a SEM image showing a cross-section of the polymeric polysulfide of embodiments of the disclosure after exposure to elemental mercury, where polymeric polysulfide (2.0 g) and 170 mg elemental mercury were added to a glass vial containing 7 mL deionised (DI) water, the mixture was stirred vigorously for 24 hours at room temperature, the polymeric polysulfide was isolated by filtration, a 10 mm particle was cut in half and the cross-section was profiled by SEM; the scale bar is 100 µm in length.

Example 11—SEM Analysis of Solid Polymeric Polysulfide after Treatment with Mercury Chloride A 12.0 g sample of the polymeric polysulfide (0.5 to 1.0 mm particles, as prepared above using sieves) was incubated in an aqueous solution of mercury chloride (30 mL of 20 mg/mL $HgCl_2$) for 24 hours. After this time, the polymeric polysulfide turned from brown to grey. The polymeric polysulfide was then filtered and washed with deionised water (3×~30 mL). The filtrate was concentrated under reduced pressure to provide 186 mg of unbound mercury chloride. Therefore, the polymeric polysulfide had captured 414 mg (or 70%) of the mercury. A sample of the mercury-treated polymeric polysulfide was then prepared for SEM and analysed as described above. The SEM of the mercury-treated polymer is shown in FIGS. 11, 12 and 13. Notably, mercury rich nanoparticles were detected on the surface of the polymer (see arrows in FIG. 13 for representative examples). The presence of mercury in these nanoparticles was verified by EDS (see Example 12, below).

Example 12—EDS Analysis of Mercury Chloride-Treated Polysulfide Surface

EDS analysis was carried out on the mercury chloride-treated polymeric polysulfide at three locations: spot 1 (nanoparticle), spot 2 (smooth polymeric polysulfide surface) and spot 3 (microtextured polymeric polysulfide surface). Spots shown in FIG. 14. EDS analysis shown in FIGS. 15 (spot 1), 16 (spot 2) and 17 (spot 3). The nanoparticle adhered to the surface was mercury rich.

Example 13—EDS Analysis of Elemental Mercury-Treated Polysulfide Surface

The polymeric polysulfide (2.0 g) and 170 mg elemental mercury were added with to a glass vial containing 7 mL DI water. The mixture was stirred vigorously for 24 hours at room temperature. After this time, no elemental mercury was visible and the polymeric polysulfide had changed colour from brown to black. The polymeric polysulfide was isolated by filtration and then a 10 mm particle was cut in half. The cross-section was profiled by SEM and EDS, revealing the mercury was bound only to the surface, where the material appeared black. See FIGS. 18, 19, 20, 21 and 22.

Example 14—Scanning Auger Electron Spectromicroscopy of Polymeric Polysulfide from Canola Oil and 50 wt % Sulfur The non-conductive nature of the samples meant that for a useful Auger Electron Spectrum to be obtained, a 2 nm layer of Platinum was needed to provide conductivity to the surface of the sample. The elemental maps of carbon and sulfur show that the carbon-sulphur ratio varies spatially. See FIGS. 23, 24 and 25.

Example 15—Scanning Auger Electron Spectromicroscopy of Polymeric Polysulfide from Canola Oil and 50 wt % Sulfur after Treatment with Mercury Metal The surface of the canola oil polysulfide (50% sulfur) reacted with mercury metal from Example 13 was analysed by Auger analysis which verified that mercury is found on the surface of the material (FIG. 26).

Figure 27:
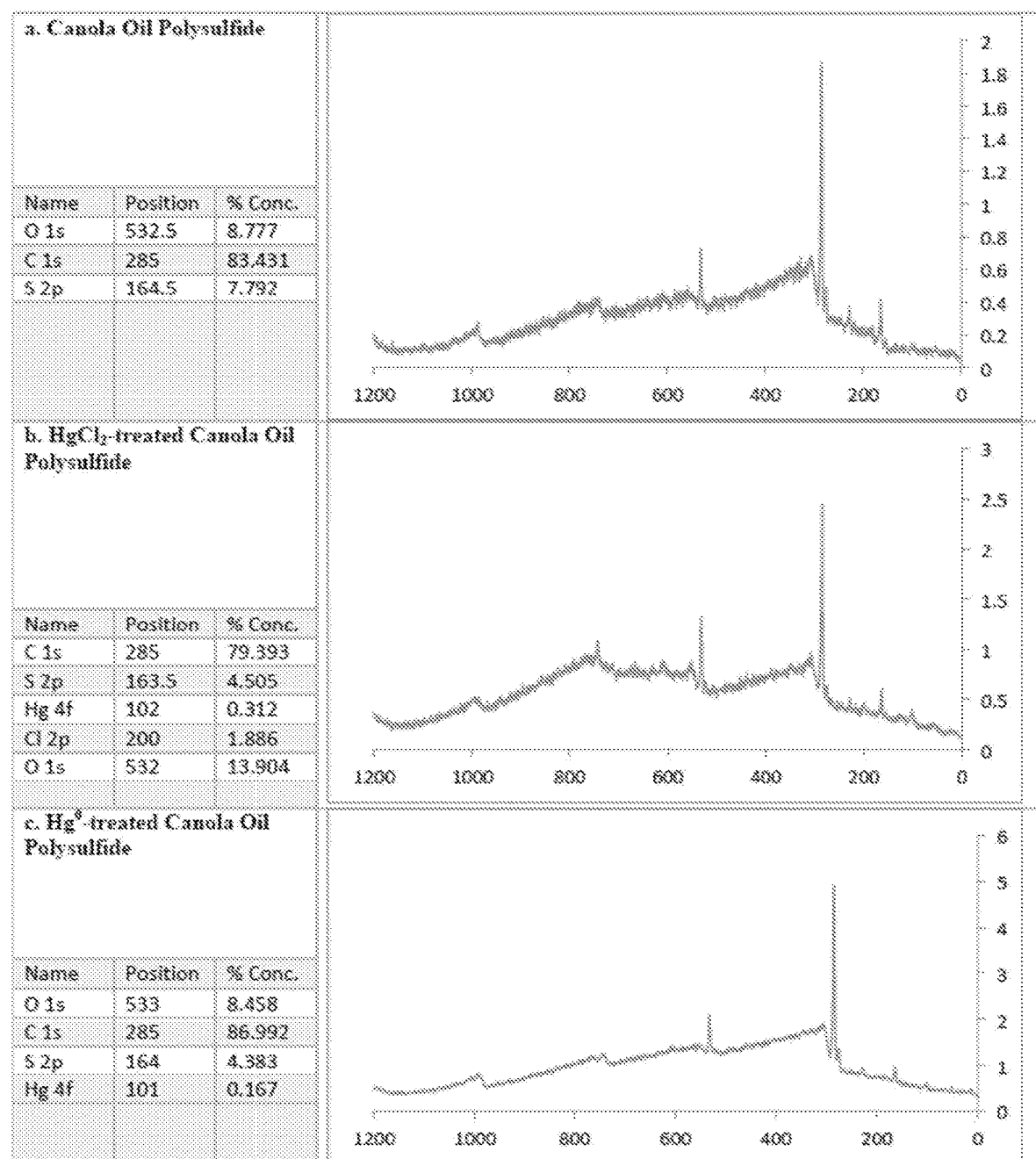
FIG. 27 shows the results of XPS analysis of the canola oil polymeric polysulfide (a) before treatment with mercury; (b) after mercury chloride capture; and (c) after mercury metal capture.

Example 16—XPS Analysis of Mercury-Treated Canola Oil Polysulfide Before and after Mercury Capture XPS analysis of the canola oil polysulfide revealed the mercury '4f' photoelectron peak for both the mercury chloride capture (b) and mercury metal capture (c). The observed binding energy is associated with mercury bound to sulphur (~101 eV for HgS) for both samples. In the case of Hg(0) capture, this is consistent with oxidation of mercury to metacinnabar (FIG. 27).

Figure 28:
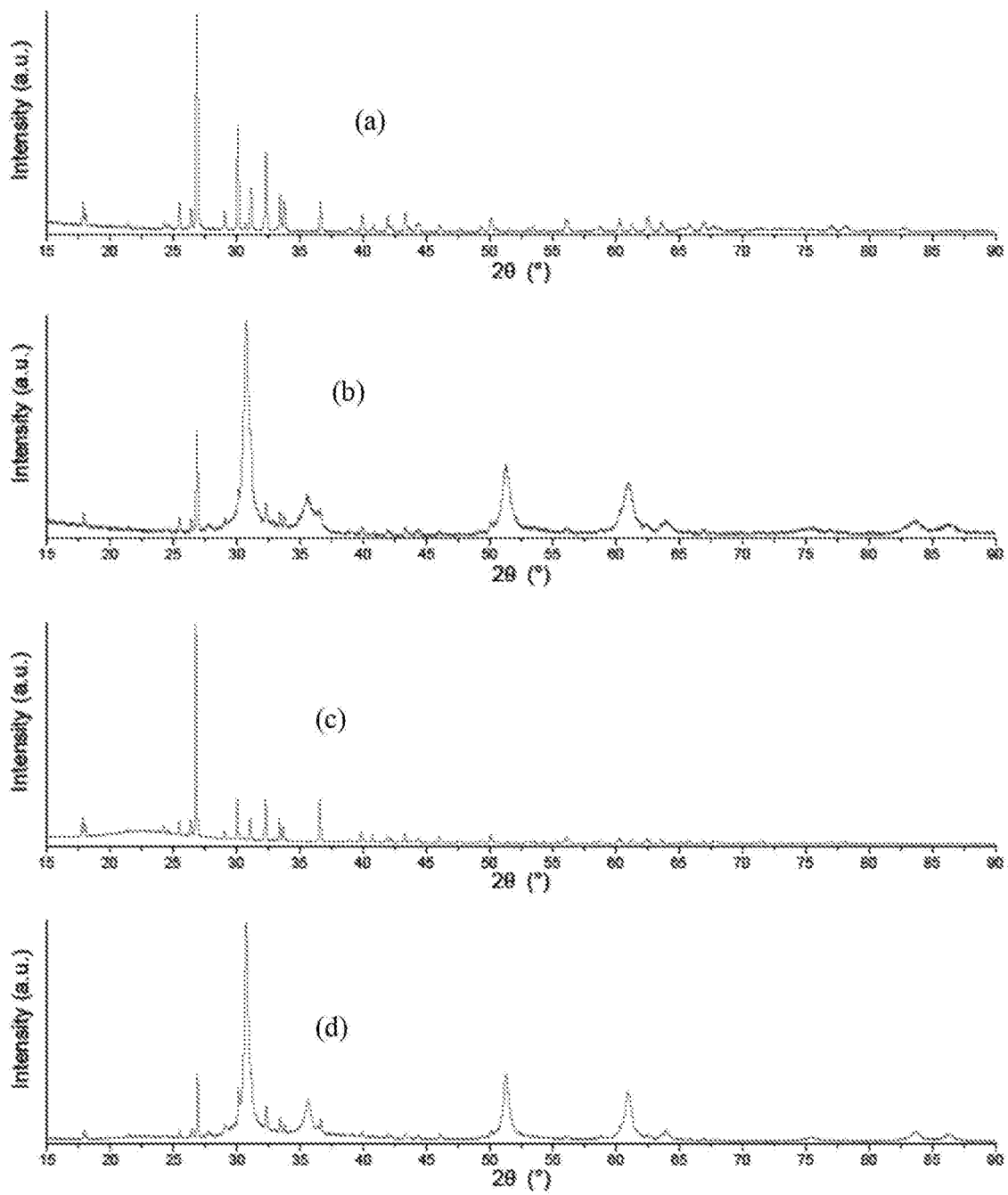
FIG. 28 shows XRD scans of a) elemental sulfur, b) metacinnabar prepared by the reaction of sulfur and mercury metal c) canola oil polysulfide (50% sulfur) and d) metacinnabar formed by reaction of polysulfide and mercury metal.

Example 17—XRD Analysis of Mercury-Treated Canola Oil Polysulfide 1.24 g elemental mercury was added to a 50 mL centrifuge tube containing 2.47 g sulfur and mixed for 24 hours using an end-over-end mixer. Similarly, 2.47 g of canola oil polymeric polysulfide (50% sulfur, <0.5 mm particle size) was mixed with 1.52 g elemental mercury in an end-over-end mixer for 24 hours. Unreacted sulfur, unreacted polymeric polysulfide, as well as those samples reacted with elemental mercury, were all ground to a fine powder using a mortar and pestle in preparation for loading on an XRD sample stage. The XRD spectra obtained for both reactions was metacinnabar, as it was identical to previously published XRD spectra (FIG. 28). It can therefore be concluded that the black material that results from the reaction of mercury metal and the S—S bonds of the canola oil polysulfide is metacinnabar.

Figure 29:
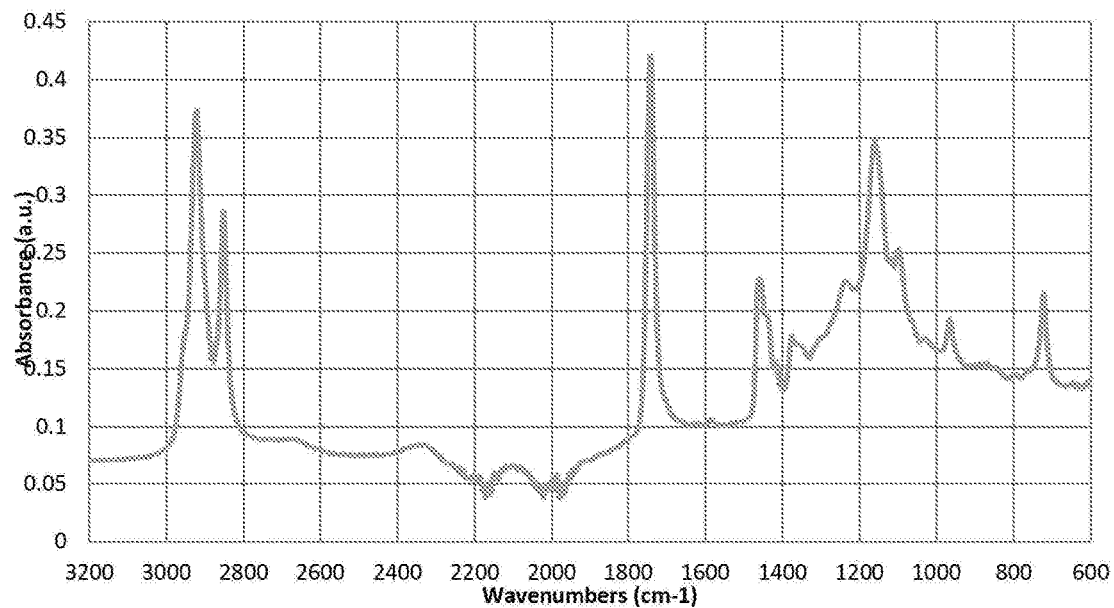
FIG. 29 shows the Fourier transform infrared (FT-IR) spectra of the polymeric polysulfide of embodiments of the disclosure; key signals include the C=O stretch from the canola oil; the absence of alkene C—H and C=C stretches are consistent with the reaction of sulfur with the alkene.
Figure 30:
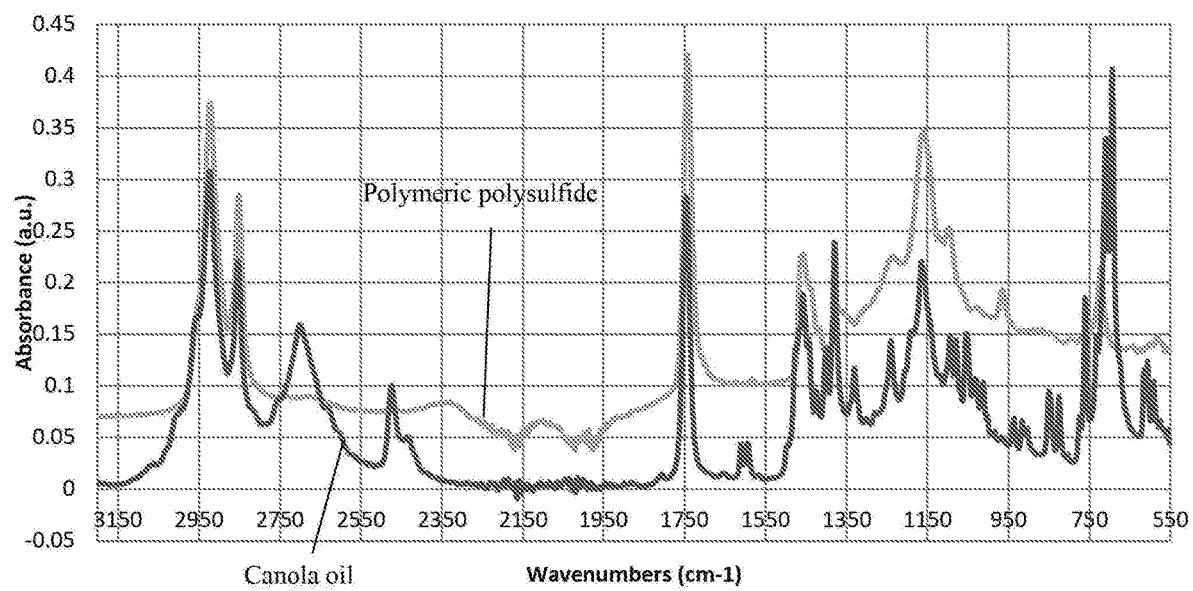
FIG. 30 shows the FT-IR spectra overlay of the polymeric polysulfide (upper trace) of FIG. 29 and canola oil (lower trace)
Figure 31:
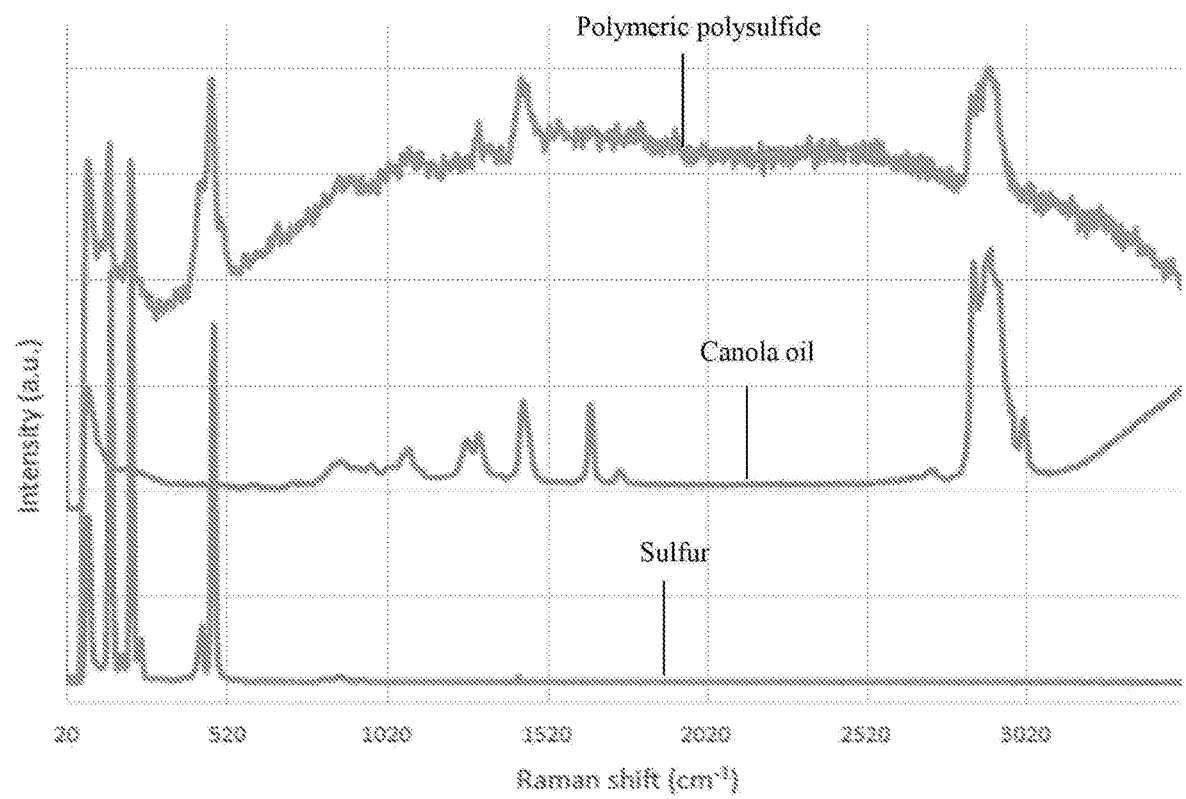
FIG. 31 shows the Raman spectra of canola oil (middle trace), sulfur (lower trace), and the polymeric polysulfide of embodiments of the disclosure (upper trace)

Example 18—Fourier Transform Infrared Spectroscopy of the Polymeric Polysulfide FT-IR was used to analyse the polymeric polysulfide (FIGS. 29 and 30) and canola oil (FIG. 31). The spectra in FIGS. 30 and 31 show the C═O stretch from the canola oil. The absence of alkene C—H and C═C stretches are consistent with the reaction of sulfur with the alkene.

Example 19—Raman Spectra of the Polymeric Polysulfide

Figure 32:
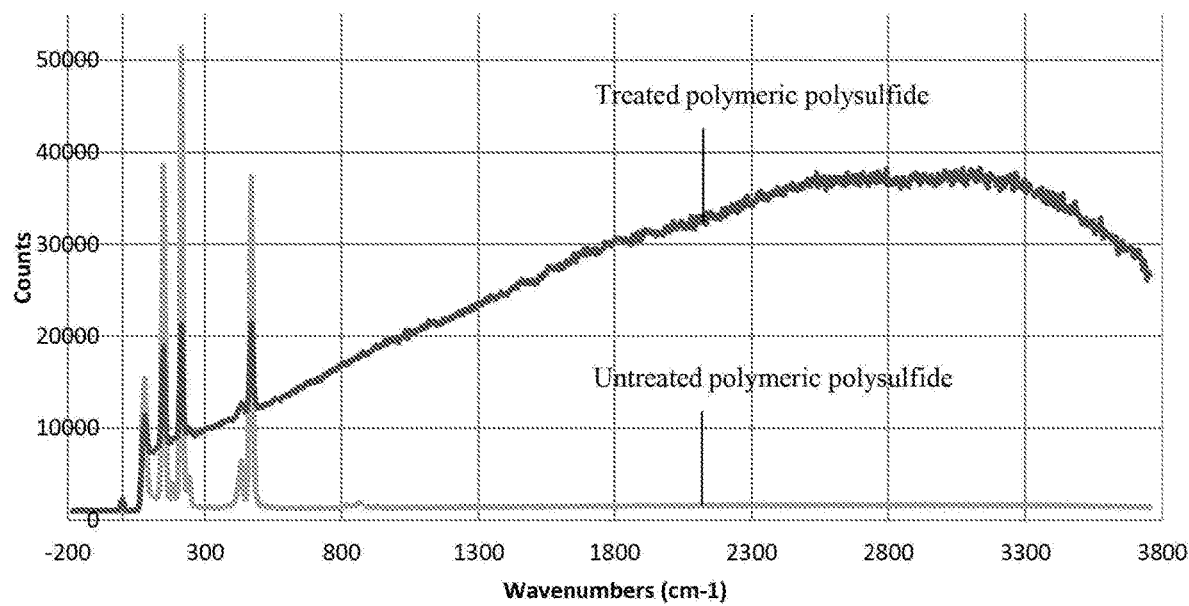
FIG. 32 shows the Raman spectra of mercury chloride-treated polymeric polysulfide of embodiments of the disclosure (upper trace) overlayed on spectra of untreated polymeric polysulfide (lower trace); background fluorescence was typically observed when mercury(II) bound to the polysulfide.

Raman analysis was used to analyse the polymeric polysulfide and the canola oil and sulfur starting materials (FIG. 31) and mercury chloride bound (ie treated) polymeric polysulfide (FIG. 32). The Raman analysis shows stretches at 434 cm$^{-1}$ and 471 cm$^{-1}$, consistent with S—S vibrational modes of a polysulfide material. Peaks at 1437 cm$^{-1}$ and 2900 cm$^{-1}$ are attributed to the canola oil domain of the polymer.

Example 20—Confocal Raman Images of the Polymeric Polysulfide

Figure 33:
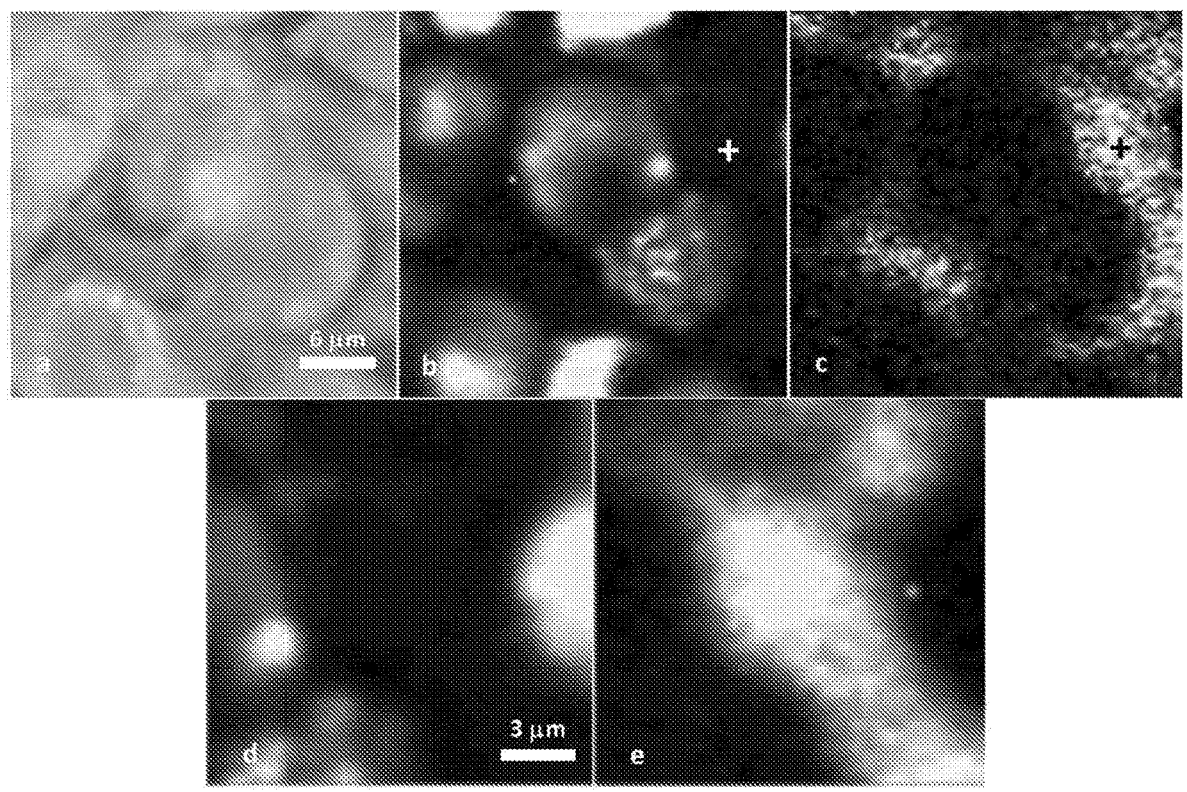
FIG. 33 shows optical images (a) of a section of the canola polysulfide with corresponding confocal Raman images of the same region (b and c). The number of pixels in b and c is 70×70 (4900) with the integration time per pixel equal to 1 second. The confocal Raman images in d and e are zoomed in areas of b and c and correspond to exactly the same area of the sample. The centre of each image in d and e is denoted by the white and black crosses displayed in b and c. The number of pixels in d and e is 35×35 (1225) with the integration time per pixel equal to 6 seconds.

Confocal Raman images were acquired for the canola oil polymeric polysulfide and are displayed in FIG. 33. FIG. 33a is an optical image of the sample with FIGS. 33b and c representing confocal Raman images (30×30 μm) of exactly the same area of the sample. FIGS. 33d and e are zoomed in Raman images (15×15 μm) of the same area with the centre of each image corresponding to the white and black crosses in FIGS. 33 b and c. The data in FIGS. 33b and d were generated by plotting the intensity of the 470 cm$^{-1}$ region of each Raman spectrum while the data in FIGS. 33c and e were generated by plotting the intensity of the 2900 cm$^{-1}$ region of each Raman spectrum. The Raman spectra that are present in the brighter regions of FIGS. 33b and d typically have the appearance of the sulfur starting material displayed in FIG. 31 (orange curve) and the Raman spectra that are present in the brighter regions of FIGS. 35b and e typically have the appearance of the canola oil polysulfide copolymer (50% sulfur) also displayed in FIG. 33 (lower trace). It is apparent from FIG. 33b that there are regions of free sulphur embedded in the polysulfide matrix that form what appear to be small microparticles (5 to 15 μm in size). This data supports the SEM/EDS analysis.

Example 21—Simultaneous Thermal Analysis (STA) of the Polymeric Polysulfide

Figure 34:
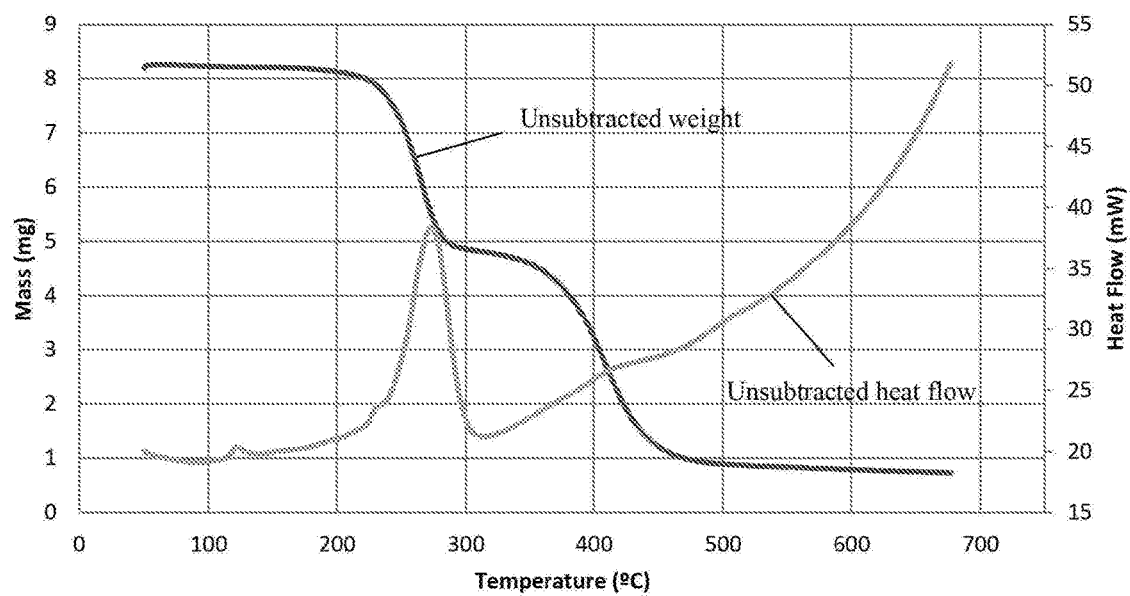
FIG. 34 shows an overlay of Differential Scanning Calorimetry (DSC) and Thermal Gravimetric Analysis (TGA) of the polymeric polysulfide of embodiments of the disclosure showing that the polymeric polysulfide decomposes in two stages, first, above 230° C. approximately 50% of the mass is lost, and second, this is followed by the onset of complete combustion over 340° C.; these stages likely represent the decomposition of the sulfur (e.g. S—S—S—S—S—S) and canola oil (i.e. carbon chain) domains of the polymeric polysulfide; the small peak at 120° C. in the DSC curve likely represents the melting point of the trace amount of unreacted $S_8$ in the sample (less than 5 wt %)
Figure 35:
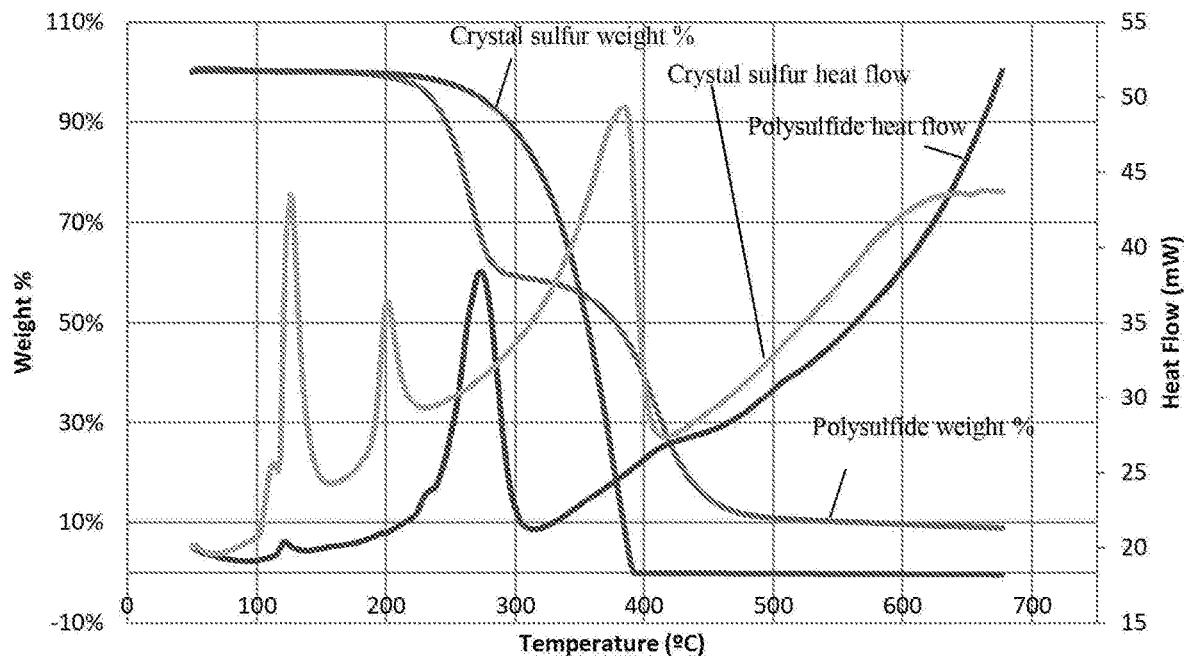
FIG. 35 shows an overlay of DSC and TGA of the polymeric polysulfide of FIG. 34 compared to crystalline sulfur.

Differential Scanning Calorimetry (DSC) and Thermal Gravimetric Analysis (TGA) were carried out on the polymeric polysulfide. As shown in FIGS. 34 and 35, the polymeric polysulfide decomposes in two stages. First, above 230° C. approximately 50% of the mass is lost followed by the onset of complete combustion over 340° C. These stages likely represent the decomposition of the sulfur and canola oil domains of the polymer. The "sulfur domain" is the part of the polymeric polysulfide that is made from sulfur. These are very likely long stretches of S—S—S—S where no canola oil is found (as seen by Raman). Basically, all of the sulfur that is part of the polysulfide (the S—S—S—S—S regions) break down at 230° C. and form a gaseous product (likely SO$_2$). The S—S bond is the weakest, so it will break and combust first. Combusting the canola oil component (i.e. carbon chain) of the polymer required higher temperatures. The small peak at 120° C. in the DSC curve likely represents the melting point of the trace amount of unreacted S$_8$ in the sample (less than 5 wt %).

Figure 36:
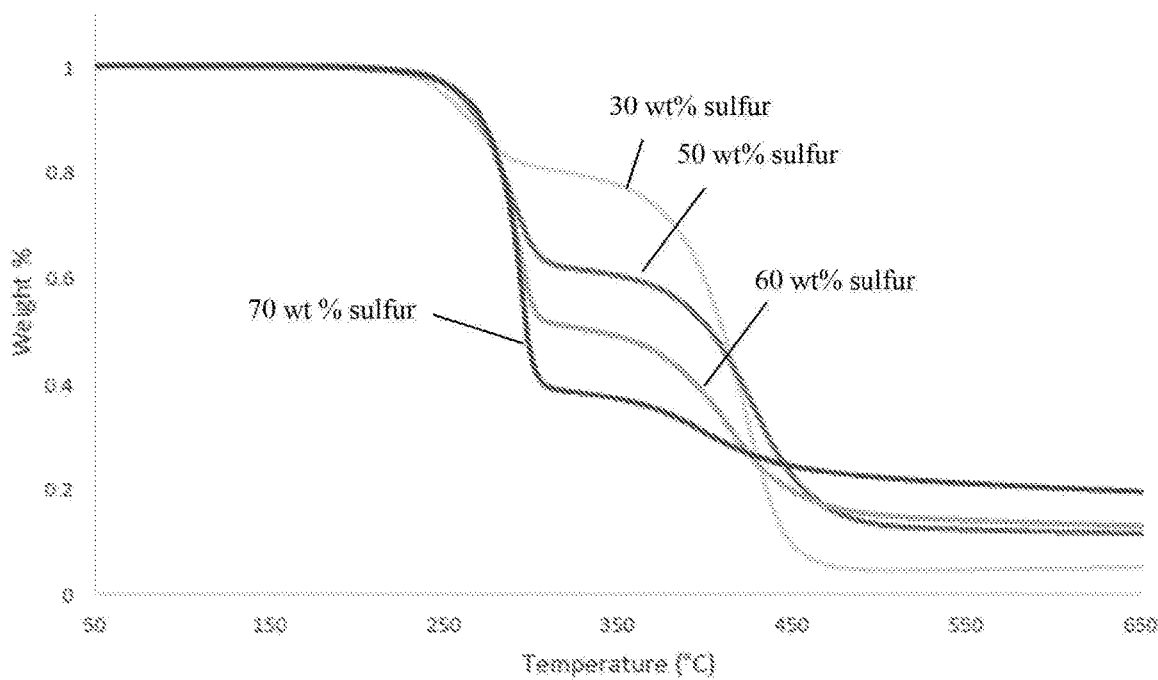
FIG. 36 shows thermogravimetric analysis of the canola oil polymeric polysulfide at different sulfur ratios.

TGA of the canola oil polymeric polysulfide was also carried out for the canola oil the polymeric polysulfide prepared at 30, 50, 60 and 70% sulfur by weight. As shown in FIG. 36, the first major mass loss at ~250° C. increased in proportion to the amount of sulfur in the polymeric polysulfide. We therefore attribute the first mass loss to thermal degradation of the polysulfide domain of the polymeric polysulfide. Consistent with this interpretation, the end of the first mass loss of each polymer (400° C.) corresponds well with the mass of sulfur in each the polymeric polysulfide (30% mass loss for the 30% sulfur the polymeric polysulfide, 50% mass loss for the 50% sulfur the polymeric polysulfide, 60% mass loss for the 60% sulfur the polymeric polysulfide and 70% mass loss for the 70% sulfur the polymeric polysulfide). The second mass loss occurs upon decomposition of the canola oil domain of the polymeric polysulfide.

Figure 37:
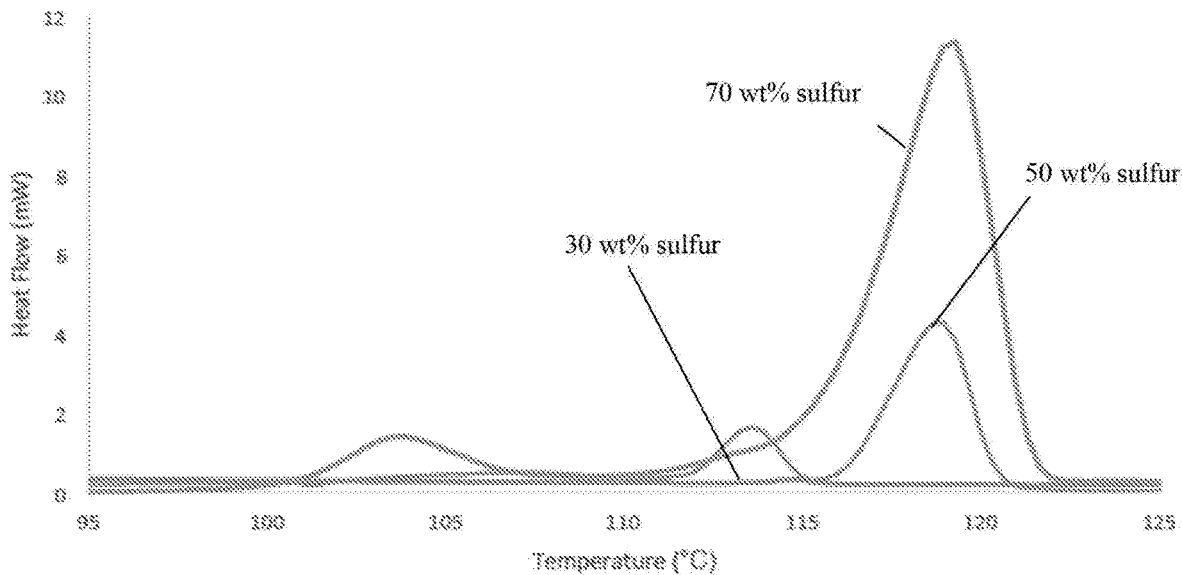
FIG. 37 shows DSC of canola oil polymeric polysulfide prepared at different sulfur compositions to determine free sulfur content.

DSC of canola oil polymeric polysulfide prepared at different sulfur compositions to determine free sulfur content is shown in FIG. 37. While the DSC curve was largely the same from sample to sample, subtle variations in the region between 100 and 125° C. were noted, as shown in the plot. These endotherms correspond to the melting of free sulfur.

Figure 38:
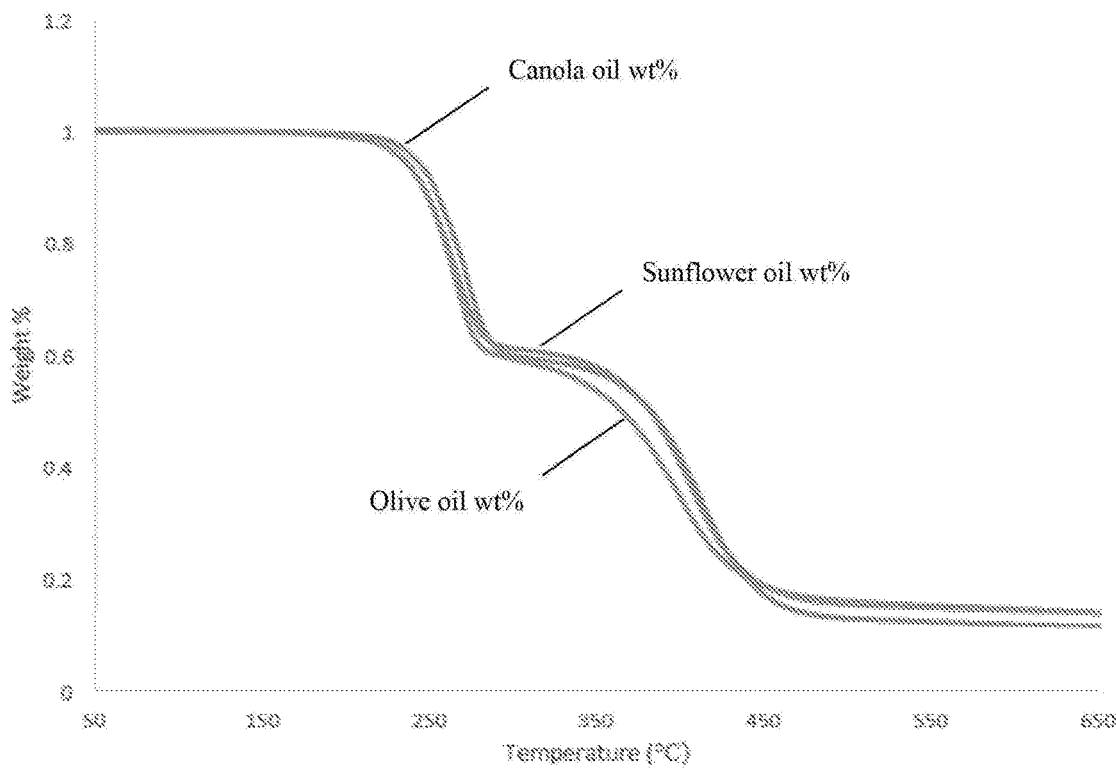
FIG. 38 shows TGA of polymeric polysulfides prepared by the inverse vulcanisation reaction between sulfur and canola oil, sunflower oil, or olive oil. Similar profiles were observed for all of these polymeric polysulfides.
Figure 39:
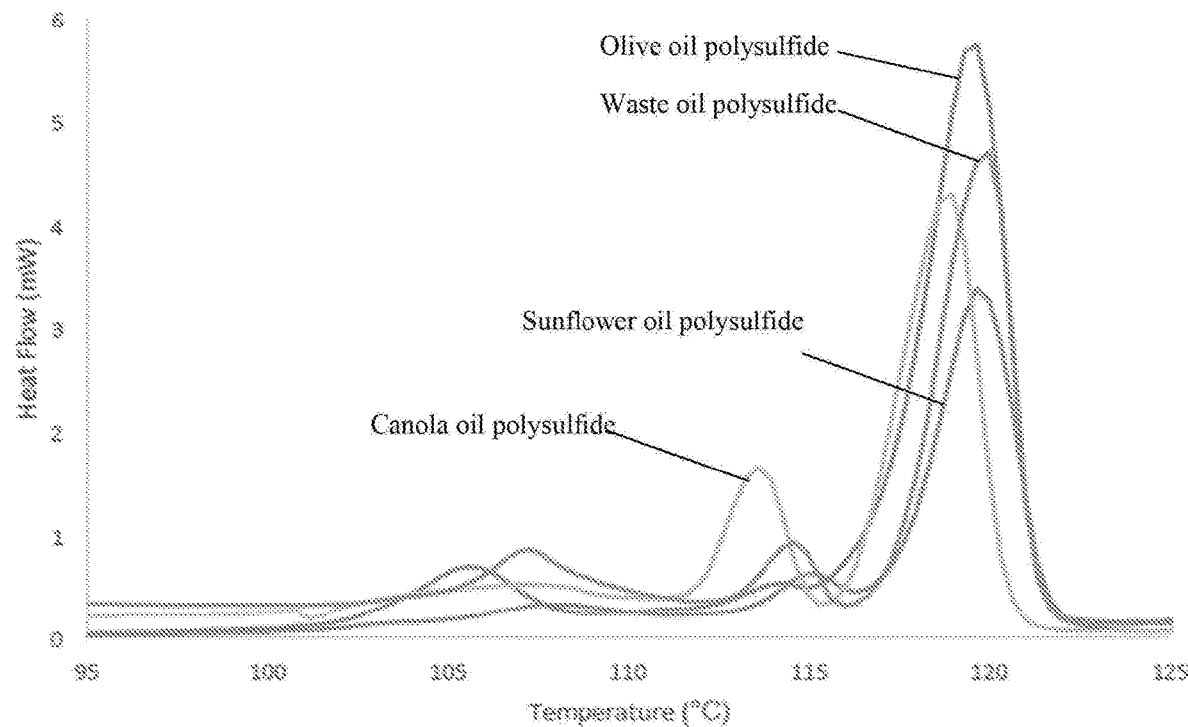
FIG. 39 shows DSC of polymeric polysulfides formed from canola oil (yellow), sunflower oil (blue), olive oil (orange) and recycled cooking oil (green)

The results of TGA and DSC analysis of polymeric polysulfides prepared from canola oil, sunflower oil, and olive oil are shown in FIGS. 38 and 39, respectively. As seen in FIG. 38 similar profiles were observed for all of the polymeric polysulfides. While the TGA and DSC were largely the same, regardless of the oil source, subtle variations in the region between 100 and 125° C. were noted, as shown in FIG. 39. These endotherms correspond to the melting of free sulfur.

Example 22—Free Estimation in Canola Oil Polysulfides

Figure 40:
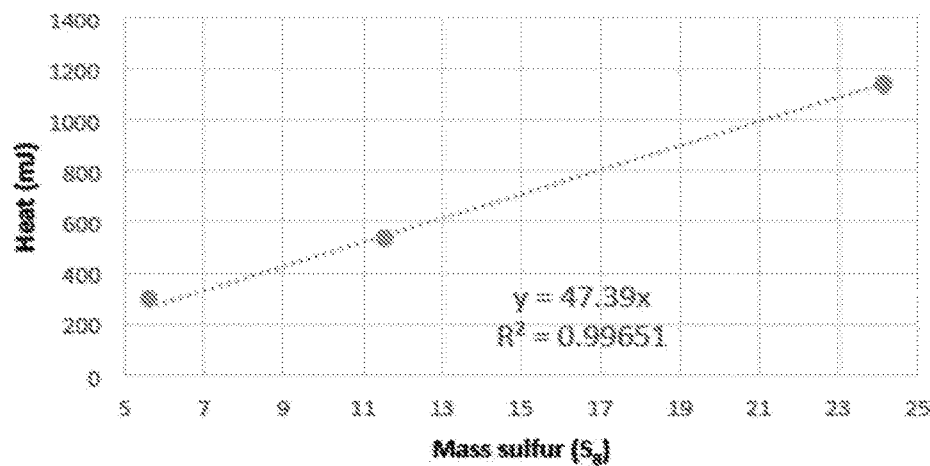
FIG. 40 shows a plot of heat flow vs mass of sulfur by DSC.

Quantitative DSC was used to determine free sulfur content in the canola oil polymeric polysulfides. S8 has a distinctive DSC peak at 125° C. that stretches from 100° C. to 150° C. The area of this peak (from 100° C. to 150° C.)

increases linearly with sulfur mass. On average 1 mg sulfur gave a response of 49.3 J/g within the range tested. This response was used to approximate the free sulfur present in the polymeric polysulfide. Because the free sulfur may be present in forms other than S8, this is only an estimate. The calibration curve is shown in FIG. 40.

Free sulfur was estimated by integration of the DSC endotherm from 100 to 150° C. and the results are shown in Table 4. Above 30% sulfur by mass, the polymeric polysulfides appear to contain significant quantities of free sulfur. For the canola oil polymeric polysulfide used in mercury capture experiments (50% sulfur), it was estimated to contain 9% free sulfur by mass.

TABLE 4

ESTIMATED FREE SULFUR IN POLYMERIC POLYSULFIDES

| Sample | ΔH (J/g) | Free sulfur (% mass) |
|---|---|---|
| Canola Oil Polysulfide (30 wt % Sulfur) | 1.866 | 3.8 |
| Canola Oil Polysulfide (50 wt % Sulfur) | 4.408 | 9.0 |
| Canola Oil Polysulfide (60 wt % Sulfur) | 11.467 | 23.3 |
| Canola Oil Polysulfide (70 wt % Sulfur) | 18.721 | 38.1 |
| Olive Oil Polysulfide (50 wt % Sulfur) | 8.429 | 17.1 |
| Sunflower Oil Polysulfide (50 wt % Sulfur) | 7.453 | 15.2 |
| Waste Oil Polysulfide (50 wt % Sulfur) | 7.667 | 15.6 |
| Classically Vulcanised "Factice" (50 wt % Sulfur) | 4.317 | 8.8 |

Example 23—Tension-Mode DMA of Polymeric Polysulfide—$T_g$ Measurements

Figure 41:
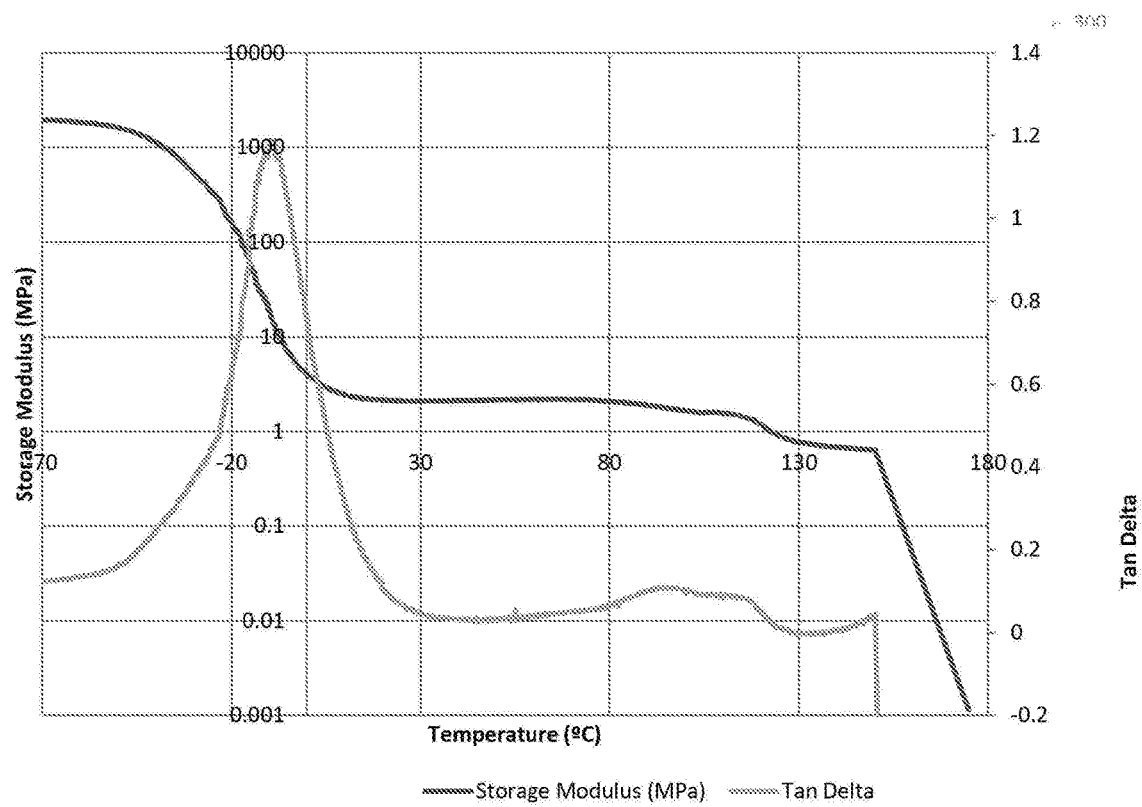
FIG. 41 shows the results of a Dynamic Mechanical Analysis (DMA) of the polymeric polysulfide of embodiments of the disclosure, showing the Storage Modulus (upper trace) and the Tan Delta (lower trace) and that the polymeric polysulfide is rubbery between approximately 0° C. and 150° C.

Dynamic Mechanical Analysis was performed on polymeric polysulfide produced according to Example 1. The results are shown in FIG. 41 and Table 5.

TABLE 5

TENSION-MODE DMA OF POLYMERIC POLYSULFIDE - TG MEASUREMENTS:

| Storage Modulus drop onset | Loss Modulus peak | Tan Delta (Loss/Storage) Peak |
|---|---|---|
| −32° C. | −42° C. | −9° C. |

A standard DMA graph will give three potential glass transition (Tg) values based on the storage modulus, loss modulus and the ratio of the two change with temperature. Typically only the latter, the peak of the Tan Delta plot is specified as the material's Tg. By the Tan Delta peak the polymeric polysulfide's Tg is −9° C., below this temperature the material will be in the glassy region and brittle, above this (and at room temperature) the material will be in the rubbery plateau: elastic and malleable.

Example 24—Polymeric Polysulfide Solubility 500 mg of the polymeric polysulfide was suspended in 5 mL of solvent and then incubated without stirring for 24 hours at room temperature. After this time, the solid polysulfide was isolated by filtration and then washed with 3×5 mL of the same solvent. The filtrate was then evaporated under reduced pressure and the mass of any dissolved material was then weighed. The polysulfide was largely insoluble in all solvents tested, as shown in Table.

TABLE 6

POLYMERIC POLYSULFIDE SOLUBILITY

| Solvent | Solubility (mg polysulfide dissolved per mL solvent) | wt % (percentage of 500 mg starting material that dissolved in 5 mL solvent) | w/w % (mass dissolved polymer per mass solvent) (%) | Comment |
|---|---|---|---|---|
| Water | — | — | — | Insoluble |
| Acetonitrile | 0.2 | 0.04 | 0.02 | Very sparingly soluble |
| Methanol | 0.6 | 0.16 | 0.08 | Very sparingly soluble |
| Ethanol | 1.5 | 0.37 | 0.19 | Very sparingly soluble |
| Acetone | 4.4 | 1.10 | 0.55 | Sparingly Soluble |
| Ethyl Acetate | 5.8 | 1.44 | 0.64 | Sparingly Soluble |
| Hexane | 7.9 | 1.98 | 1.21 | Sparingly Soluble |
| THF | 18.3 | 4.58 | 2.06 | Slightly soluble |
| Dichloromethane | 18.4 | 4.60 | 1.39 | Slightly soluble |

Example 25—Analysis of Thiol-Content on the Canola Oil Polysulfide Surface Using Ellman's Test A sample of canola oil polymeric polysulfide (1.00 g, 50% sulfur) was placed into each of three 50 mL centrifuge tubes along with 8 mL phosphate buffer (100 mM, pH 8) and Ellman's reagent (8 mg, 0.020 mmol). As a control, Ellman's reagent was also added to three separate samples of buffer in the same way, except in the absence of polymeric polysulfide. All samples were mixed on a lab rotisserie for 1 hour at room temperature before filtering. The filtrates were then diluted 7-fold and analysed by UV-Vis spectroscopy. Absorbances at 412 nm are listed in Table 7 below. No reaction with Ellman's reagent was observed, as no significant increase in absorbance at 412 nm was observed (student t-test). Therefore, thiol content on the polymer is negligible and consistent with the expected polysulfide structure.

TABLE 7

THIOL CONTENT OF POLYMERIC POLYSULFIDE

| | Absorbance of sample prepared using Ellman's reagent and no polymeric polysulfide (negative control showing absorbance of Ellman's reagent alone) | Absorbance of sample prepared using Ellman's reagent and polymeric polysulfide |
|---|---|---|
| Sample 1 | 0.0720 | 0.0753 |
| Sample 2 | 0.0637 | 0.0762 |
| Sample 3 | 0.0822 | 0.0628 |

Example 26—Polymeric Polysulfides of Varying Sulfur Content

Example 26.1—Sulfur and Canola Oil (1:1 Mass Ratio)

With vigorous stirring, sulfur (500 mg) was melted and then heated to 180° C. Canola oil (500 mg) was added dropwise to the molten sulfur. The resulting mixture was stirred at 180° C. Within 15 minutes of the addition of canola oil, the mixture had solidified to form a brown/black rubber material.

Example 26.2—Sulfur and Canola Oil (2:1 Mass Ratio)

With vigorous stirring, sulfur (1.00 g) was melted and then heated to 180° C. Canola oil (500 mg) was added dropwise to the molten sulfur. The resulting mixture was stirred at 180° C. Within 25 minutes of the addition of canola oil, the mixture had solidified to form a brown/black rubber material.

Example 26.3—Sulfur and Canola Oil (1:2 Mass Ratio)

With vigorous stirring, sulfur (500 mg) was melted and then heated to 180° C. Canola oil (1.00 g) was added dropwise to the molten sulfur. The resulting mixture was stirred at 180° C. Within 25 minutes of the addition of canola oil, the mixture had solidified to form a brown/black rubber material.

Example 26.4—Sulfur and Canola Oil (0 to 100 Weight % Sulfur)

Figure 42:
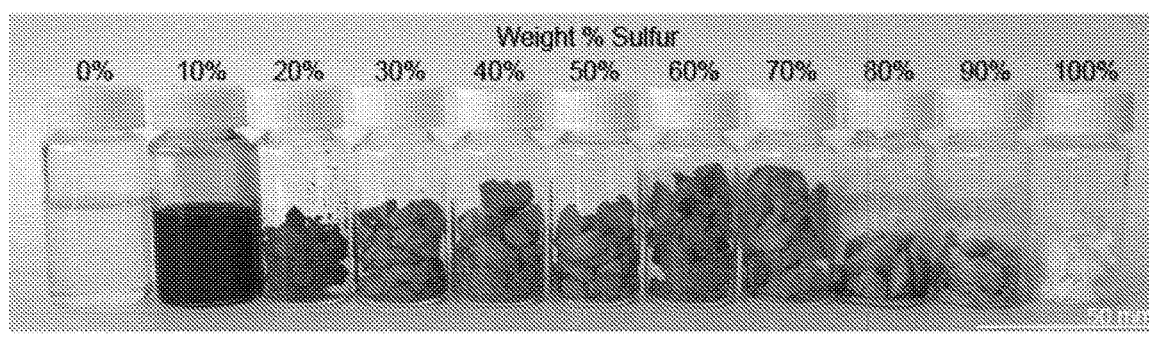
FIG. 42 shows the reaction products of canola oil with sulfur at different mass ratios.

Canola oil polysulfides were prepared with different sulfur content by varying the ratio of canola oil to sulfur used in the synthesis. In a typical synthesis, sulfur was heated to 180° C. and the corresponding mass of sulfur was added slowly to maintain a constant internal temperature. All reactions were carried out on a 40 g scale. The two phase mixture was stirred rapidly to ensure efficient mixing. Typically, all samples reached the gel point within 20 minutes. Even prolonged heating (50 minutes) of the reaction mixture containing 10% sulfur did not result in a rubber. The resultant products are shown in FIG. 42. The results show that at 10% sulfur, a liquid was obtained. Between 20% and 70% sulfur, the product was a rubber. At 80% sulfur and higher, the product was brittle.

Example 27—Polysulfides Made from Alternative Fatty Acids

Example 27.1—Sulfur and Oleic Acid (1:1 Mass Ratio)

With vigorous stirring, sulfur (500 mg) was melted and then heated to 180° C. Oleic acid (500 mg) was added dropwise to the molten sulfur. The resulting mixture was stirred at 180° C. After 2 hours of reaction, the colour of the mixture turned to black, providing a dark, viscous oil. Analysis by NMR suggested complete consumption of the alkene group by reaction with sulfur.

Example 27.2—Sulfur, Oleic Acid and Canola Oil (1:1:1 Mass Ratio)

With vigorous stirring, sulfur (500 mg) was melted and then heated to 180° C. Olceic acid (500 mg) was added dropwise to the molten sulfur. The resulting mixture was stirred at 180° C. After 1 hour of reaction, the colour of the mixture turned to black. At this time, canola oil (500 mg) was added to the mixture. No rubber was formed and no visible change occurred after extending heating at 180° C. The product appeared as a dark, viscous oil.

Example 27.3—Sulfur and Pre-Mixed Oleic Acid and Canola Oil (1:1:1 Mass Ratio)

With vigorous stirring, sulfur (500 mg) was melted and then heated to 180° C. A premixed solution of oleic acid (500 mg) and canola oil (500 mg) was then added dropwise to the molten sulfur. The resulting mixture was stirred at 180° C. After 2 hours of reaction, the colour of the mixture turned to black. No rubber was formed and no visible change occurred after extending heating at 180° C.

Example 27.4—Sulfur and Sunflower Oil (1:1 Mass Ratio)

With vigorous stirring, sulfur (500 mg) was melted and then heated to 180° C. Sunflower oil (500 mg) was added dropwise to the molten sulfur. The resulting mixture was stirred at 180° C. Within 20 minutes of the addition of sunflower oil, the mixture had solidified to a brown rubber material.

Example 27.5—Sulfur and Extra Virgin Olive Oil (1:1 Mass Ratio)

With vigorous stirring, sulfur (500 mg) was melted and then heated to 180° C. Extra virgin olive oil (500 mg) was added dropwise to the molten sulfur. The resulting mixture was stirred at 180° C. After 20 minutes of the addition of the olive oil, the mixture appeared dark brown. After cooling this mixture, sulfur was observed to crystallise from the dark viscous oil, suggesting inefficient cross-linking.

Thus, the methods of examples 26.1, 26.2, 26.3 and 26.4, can be used to provide a polymeric polysulfide in the form of a solid black or brown rubber material. Although the methods of examples 27.1, 27.2 and 27.5 produce a polymeric polysulfide comprising a dark viscous oil that is not a solid rubber, the resulting polymeric polysulfide could be useful in some metal removal applications. For example, the polymeric polysulfide oil could be mixed with a mercury containing composition such as mercury containing water. Following mixing of the polymeric polysulfide oil with the mercury containing water, the mercury-bound polymeric polysulfide oil and treated water would inherently separate.

Example 28—Polysulfides Prepared from Sunflower Oil and from Olive Oil

Figure 43:
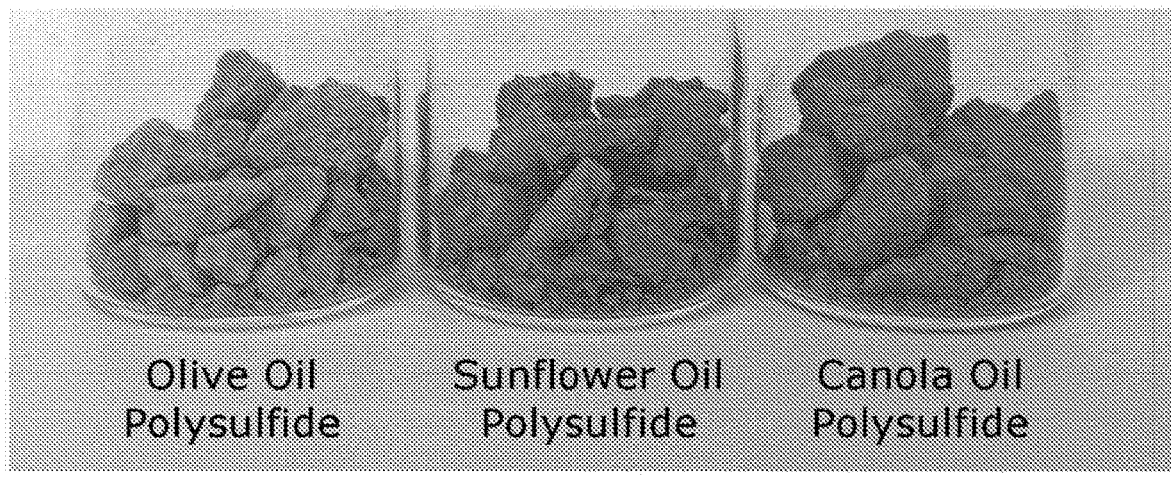
FIG. 43 shows polysulfide rubbers obtained by the reaction of an equal mass of sulfur and olive oil (left), sunflower oil (middle), and canola oil (right)

Sunflower and olive oil polysulfides were prepared using the same procedure as Example 1 to prepare canola oil polysulfide. Sulfur (20.0 g) was added to a 250 mL round bottom flask and heated, with stirring, to 180° C. After 5 minutes of heating at this temperature the sulfur turned from a yellow to an orange liquid. At this point, the sunflower or olive oil (20.0 g) was added dropwise over 5 minutes. After 12 minutes, the reaction with sunflower oil reached its gel point and formed a rubber. The reaction with the olive oil reached its gel point after 21 minutes of reaction time. The time to reach the gel point was shorter for sunflower oil, likely because of its higher polyunsaturated linoleic acid content in the triglyceride. Both samples were left to cool for 15 minutes before removing from their flasks. A third reaction prepared with canola oil was carried out for comparison. All samples were independently washed by submerging in 0.1 M aqueous NaOH for 90 minutes followed by washing with DI water and drying in open air. The samples have the same physical appearance as shown in FIG. 43.

Example 29—Preparation of Polymeric Polysulfides from Fatty Acid Esters

Vegetable oil (1.00 g) was mixed with methanol (100 mL) in a 250 mL round bottom flask and cooled to 0° C. Sodium methoxide (100 mg) was then added to the stirred mixture. The reaction mixture was stoppered and stirred vigorously at room temperature for 24 hours. Vigorous stirring was important to ensure effective mixing of the two phases present at the start of the reaction. After 24 hours, the reaction was cooled to 0° C. and quenched with 0.1 M HCl (10 mL). The mixture was transferred to a separatory funnel and then diluted with ethyl acetate (150 mL) and water (150 mL). The organic layer was isolated and then washed with water (3×50 mL) and brine (3×50 mL) before drying (sodium sulfate), filtering and concentrating under reduced pressure. Analysis by $^1$H NMR and GC-MS revealed clean conversion to the fatty acid methyl esters.

Typical yields for fatty acid methyl esters from 1.00 g vegetable oil were: canola oil: 800 mg; sunflower oil: 800 mg; and olive oil: 780 mg.

Figure 44:
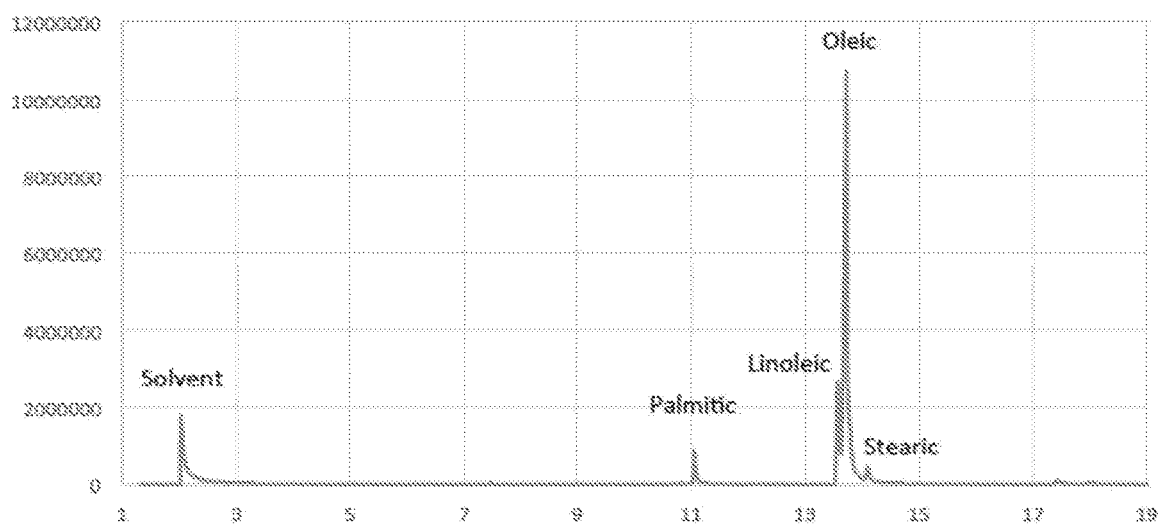
FIG. 44 shows a GC trace of canola oil tranesterification products.
Figure 45:
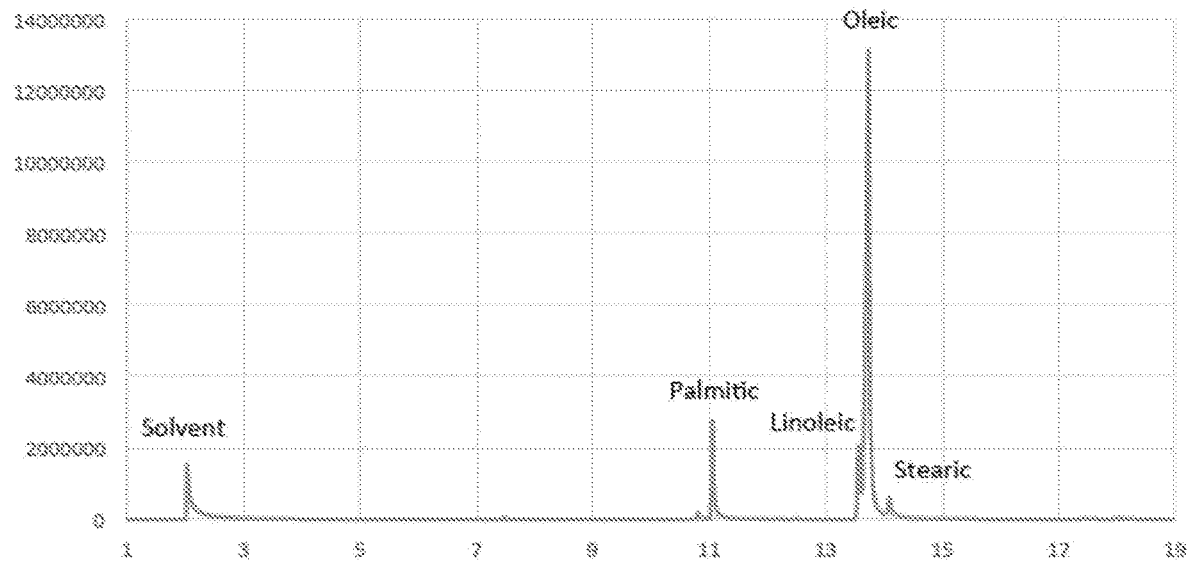
FIG. 45 shows a GC trace of olive oil tranesterification products.
Figure 46:
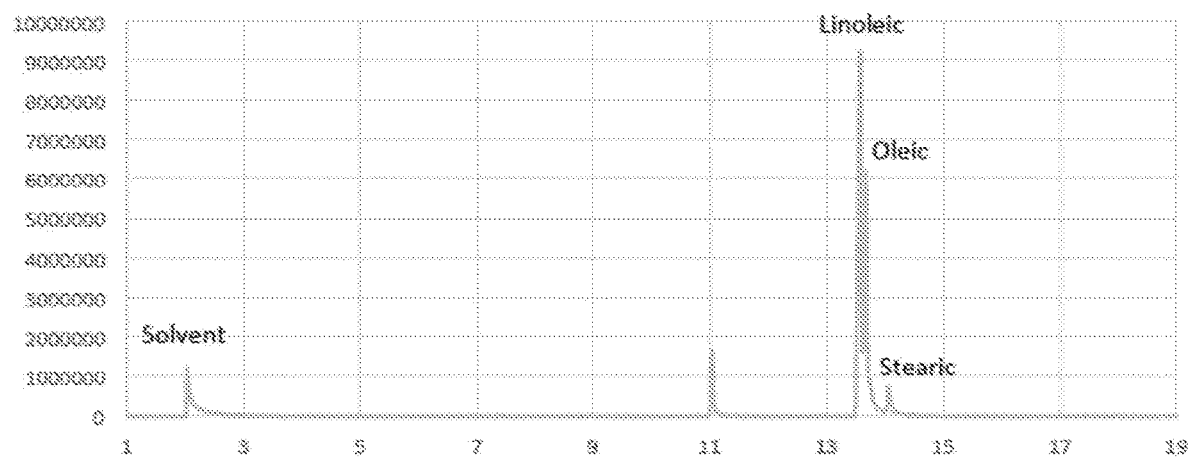
FIG. 46 shows a GC trace of sunflower oil tranesterification products.
Figure 47:
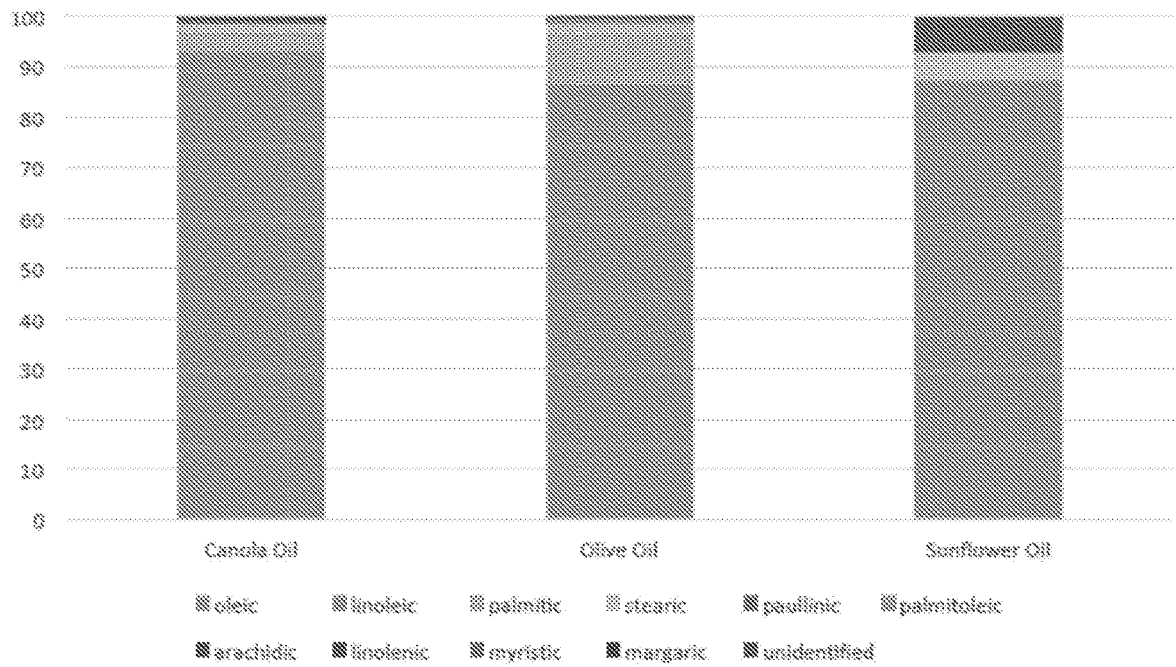
FIG. 47 shows plots of lipid composition of transesterified canola oil, olive oil and sunflower oil.
Figure 48:
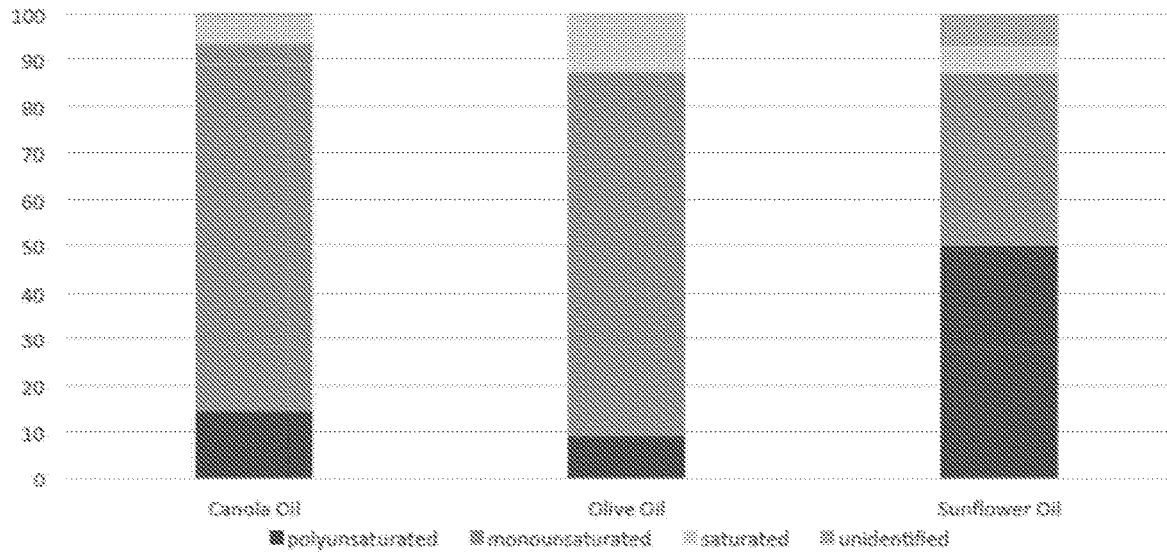
FIG. 48 shows plots of lipid type of transesterified canola oil, olive oil and sunflower oil.

Fatty acid methyl esters prepared from the oils were prepared as a solution in chloroform (~5 mg/mL) and then analysed by GC-MS using the following method on a Varian CP3800: Hold at 50° C. for 1 min, ramp from 50 to 200° C. at a rate of 25° C./min. Slow ramp to 3° C./min rate from 200 to 230° C. and hold at 230° C. for 25 min. Next ramp from 230° C. to 280° C. at 25° C./min and hold at 280° C. for 10 min. The total run time: 54 minutes. Injection temp: 250° C., carrier gas flow rate 1.2 mL/min. Representative GC traces are shown in FIGS. 44 to 46 with the major fatty acid methyl esters labelled. Methyl ester molecular ions were identified by comparison to the major fragmentation product, [M-31]+, due to a loss of the methoxy group. A summary of the lipid analysis is shown in Table 8 and in FIGS. 47 and 48 from which it can be concluded that the polysulfide is predominately formed by reaction with the alkenes from oleate and linoleate esters in the triglyceride.

TABLE 8

LIPID CONTENT OF FATTY ACID METHYL ESTERS FORMED FROM CANOLA OIL, OLIVE OIL AND SUNFLOWER OIL

| Compound (Fatty acid methyl ester) | Canola Oil (% content) | Olive Oil (% content) | Sunflower Oil (% content) |
|---|---|---|---|
| oleic | 78.7 | 77.7 | 37.3 |
| linoleic | 14.2 | 8.91 | 50.0 |
| palmitic | 4.01 | 9.89 | 0.064 |
| stearic | 1.82 | 2.26 | 5.40 |
| paullinic | 0.66 | 0 | 0 |
| palmitoleic | 0 | 0.63 | 0 |
| arachidic | 0 | 0.31 | 0.14 |
| linolenic | 0 | 0.16 | 0 |
| myristic | 0.036 | 0 | 0.040 |
| margaric | 0.028 | 0 | 0 |
| Not identified | 0.546 | 0.14 | 7.056 |
| Total | 100% | 100% | 100% |

Example 29.1—Sulfur and Fatty Acid Methyl Ester Obtained from Canola Oil

Sulfur (87 mg, 0.34 mmol $S_8$) was added to a 100 mL round bottom flask and then heated to 180° C. with stirring. The methyl ester prepared from transesterification of canola oil with sodium methoxide above (100 mg) was then added to the sulfur. The reaction was stirred at 180° C. for 30 minutes and then cooled to room temperature to provide a viscous black oil. The mixture was analysed directly by $^1$H NMR. All alkene peaks (5.0-5.5 ppm) were consumed in the reaction.

Example 29.2—Sulfur and Fatty Acid Methyl Ester Obtained from Sunflower Oil

Sulfur (404 mg, 1.56 mmol $S_8$) was added to a 100 mL round bottom flask and then heated to 180° C. with stirring. The methyl ester prepared from transesterification of sunflower oil with sodium methoxide above (500 mg) was then added to the sulfur. The reaction was stirred at 180° C. for 30 minutes and then cooled to room temperature to provide a viscous black oil. The mixture was analysed directly by $^1$H NMR. All alkene peaks (5.0-5.5 ppm) were consumed in the reaction.

Example 29.3—Sulfur and Fatty Acid Methyl Ester Obtained from Olive Oil

Sulfur (440 mg, 1.72 mmol $S_8$) was added to a 100 mL round bottom flask and then heated to 180° C. with stirring. The methyl ester prepared from transesterification of olive oil with sodium methoxide above (500 mg) was then added to the sulfur. The reaction was stirred at 180° C. for 30 minutes and then cooled to room temperature to provide a viscous black oil. The mixture was analysed directly by $^1$H NMR. All alkene peaks (5.0-5.5 ppm) were consumed in the reaction.

Example 30—Preparation of Polymeric Polysulfides from Recycled Cooking Oil

Figure 49:
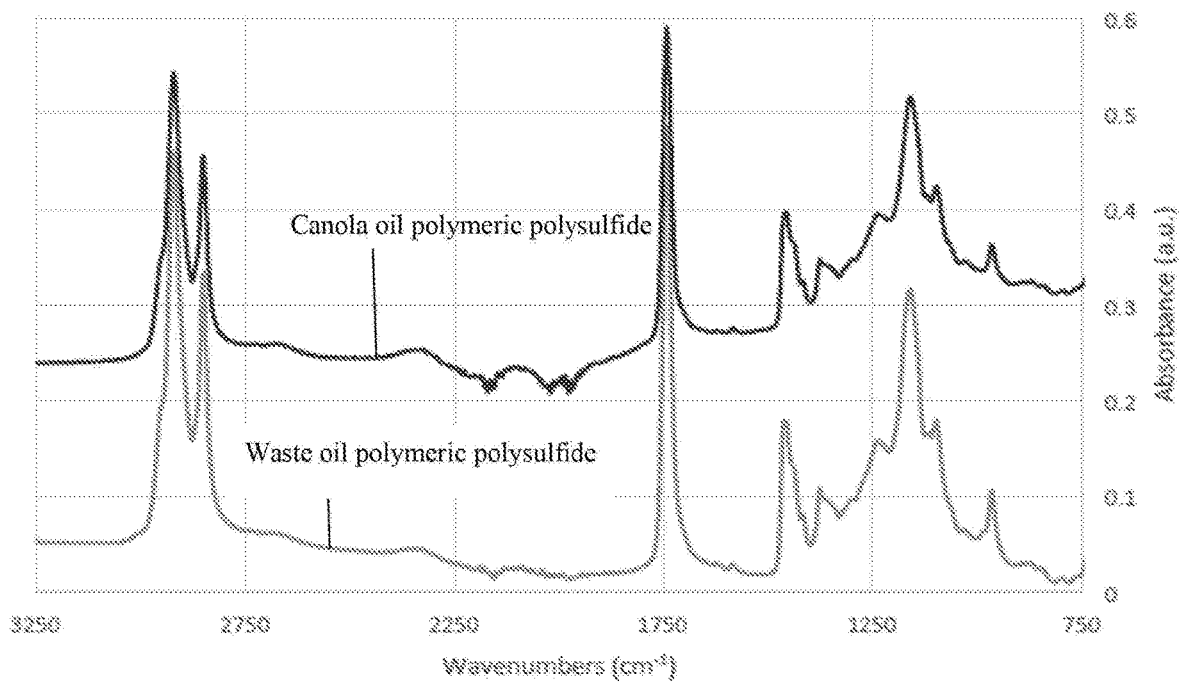
FIG. 49 shows IR spectra of a polymeric polysulfide synthesised from unused canola oil (upper trace) and a polymeric polysulfide prepared from waste cooking oil (lower trace) (both 50% sulfur)

Used cooking oil was obtained from a local café after it had been used to fry various foods for one day. The oil was used as received and was not purified in any way. In the synthesis of the polysulfide, sulfur (10.0 g) was added to a 250 mL round bottom flask and heated, with stirring, to 180° C. 5 minutes after reaching this temperature, the sulfur turned from a yellow to orange liquid. At this point, the crude, recycled cooking oil (10.0 g) was added dropwise to the sulfur over a period of 5 minutes. After 22 minutes of additional reaction time, the mixture reached its gel point and formed a brown rubber. The polymer was removed from the flask with a metal spatula. The product was washed by submerging the polymer chunks in 0.1 M NaOH for 90 minutes, followed by washing with water. Air drying provided the final product. IR spectra of the polysulfide synthesised from unused canola oil and the polysulfide prepared from waste cooking oil are shown in FIG. 49.

Example 31—Mercury Capture Using Polysulfide Prepared from Recycled Cooking Oil or Factice F17 (D.O.G.)

1.0 g of the polymeric polysulfide (50% sulfur) prepared from recycled cooking oil (Example 30) was placed in a 25 mL round bottom flask equipped with a stirrer bar, along with elemental mercury (171 mg) and 10 mL DI water. The flask was sealed and the mixture stirred for 24 hours. During this time the polymeric polysulfide turned black, and some unreacted elemental mercury was still visible. The polymer and mercury were separated by mixing with equal volumes of hexane and water. The polymer remained at the phase boundary and the mercury settled to the bottom of the aqueous phase. The water and mercury were isolated, and separated from the polymer. The mercury was then separated from the water by transferring to a separatory funnel and diluting with dichloromethane. The mercury-dichloromethane mixture was then isolated and the dichloromethane evaporated in a fume hood. The mass of the unreacted mercury was recorded. The results are shown in Table 9.

Factice is a commercially available additive used extensively in the rubber industry. 2.8 g of F17 (i.e. 17% sulfur) grade Factice (D.O.G. Chemie) was placed in a 25 mL round bottom flask equipped with a stirrer bar, along with elemental mercury (217 mg) and 10 mL DI water. The flask was sealed and the mixture stirred for 24 hours. During this time the factice darkened in colour, and some unreacted elemental mercury was still visible. The factice and unreacted mercury were separated by mixing with equal volumes of hexane and water. The polymer remained at the phase boundary and the mercury settled to the bottom of the aqueous phase. The water and mercury were isolated, and separated from the polymer. The mercury was then separated from the water by transferring to a separatory funnel and diluting with dichloromethane. The mercury-dichloromethane mixture was then isolated and the dichloromethane evaporated in a fume hood. The mass of the unreacted mercury was recorded. The results are shown in Table 9.

TABLE 9

COMPARISON OF THE REACTION OF FACTICE F17 (17% SULFUR) AND A POLYMERIC POLYSULFIDE PREPARED FROM RECYCLED COOKING OIL (50% SULFUR) WITH MERCURY METAL

| Sample | Polymer mass (g) | Sulfur mass (g) | Hg mass (mg) | Time (hours) | Hg removed (mg) |
|---|---|---|---|---|---|
| Factice F17 | 2.8 | 0.50 | 217 | 24 | 117 |
| Polysulfide from recycled cooking oil | 1.0 | 0.50 | 171 | 24 | 116 |

Both samples captured virtually the same amount of mercury metal, suggesting that the amount of mercury that can react corresponds to the amount of sulfur in the polysulfide. This result also suggests that the polysulfides in factice can react with mercury metal and that free sulfur is not required.

Example 32—Comparison of Canola Oil Polymeric Polysulfide and Factice

Figure 50:
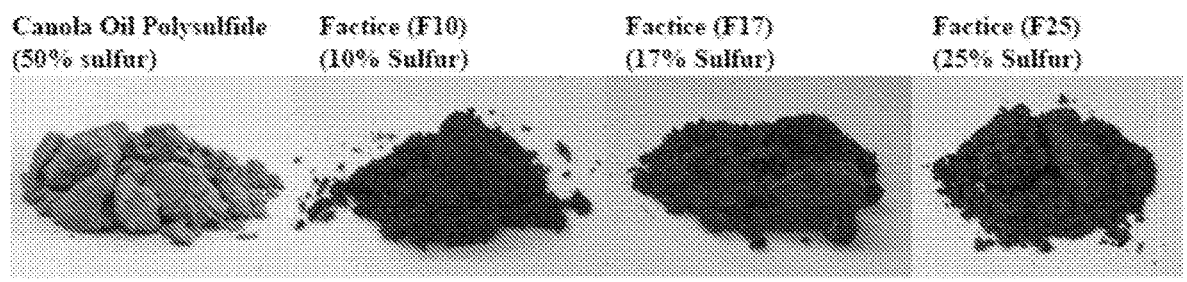
FIG. 50 shows photographs of canola oil polymeric polysulfide, as well as factice samples with 10%, 17% and 25% sulfur.
Figure 51:
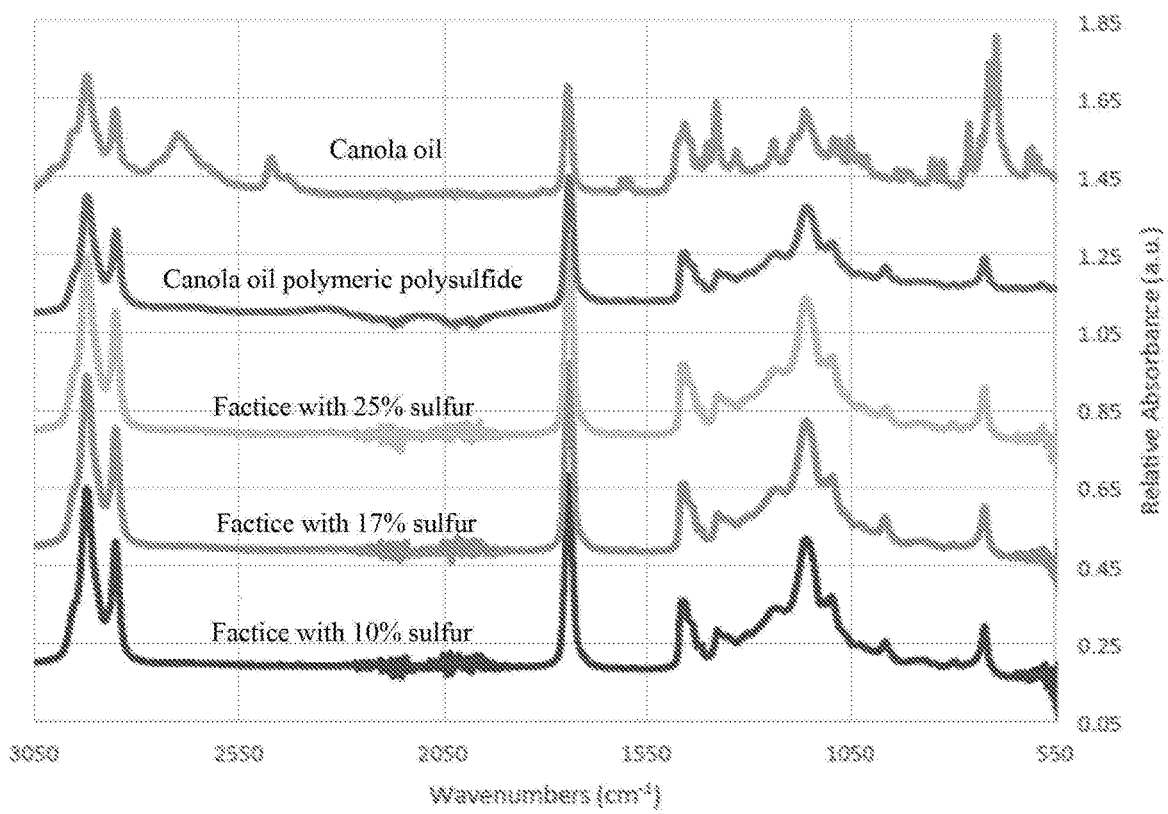
FIG. 51 shows IR spectra for factice samples with 10%, 17% and 25% sulfur, the canola oil polymeric polysulfide (50% sulfur) and canola oil.

Factice is made through classic vulcanisation of vegetable oils, such as canola oil. Typically, this involves adding low percentages of sulfur to hot vegetable oil, resulting in cross-linking of the oil. In contrast, the canola oil polymeric polysulfide reported herein is prepared by inverse vulcanisation where the vegetable oil is added to high mass percentages of liquid sulfur, thereby crosslinking the polysulfide. Because both factice and the canola oil polymeric polysulfide described herein are made with similar starting materials, the two materials were compared directly (spectroscopically, thermally and in its binding to mercury). Shown in FIG. 50, alongside the canola oil polysulfide, are photographs of factice samples with 10%, 17% and 25% sulfur. These samples were generously provided by D.O.G. Chemie. IR spectra for canola oil polymeric polysulfide (50% sulfur) and factice are shown in FIG. 51.

Figure 52:
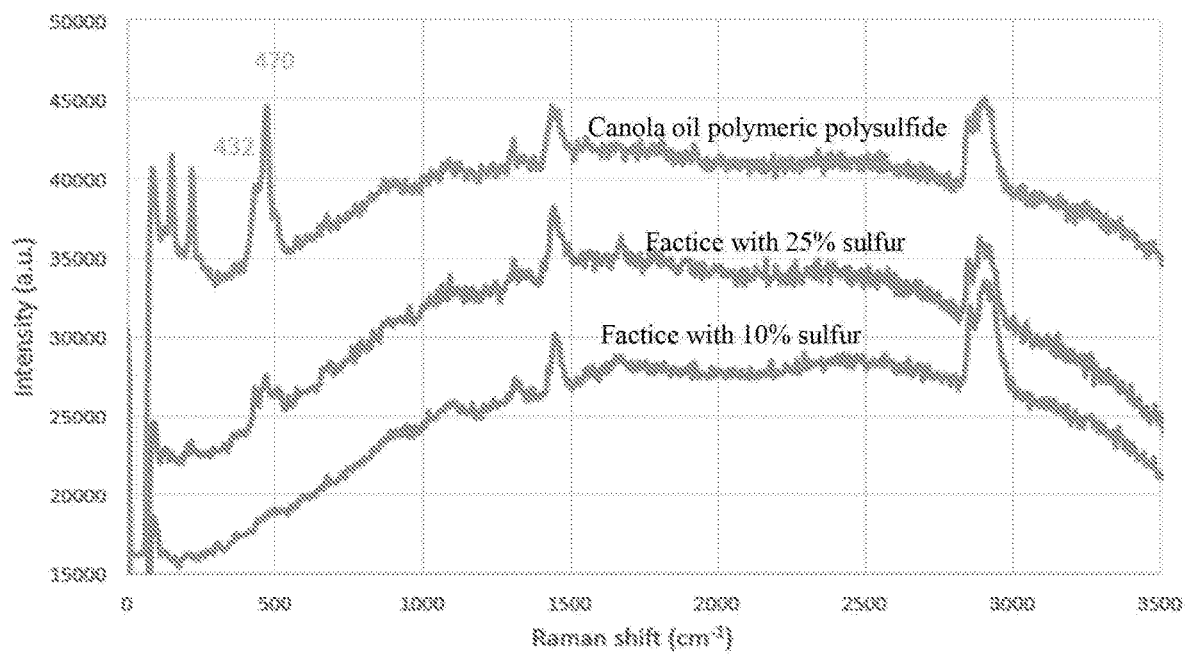
FIG. 52 shows Raman spectra for factice samples with 10% and 25% sulfur and the canola oil polymeric polysulfide (50% sulfur)

Raman spectra were obtained for F10 and F25 Factice and compared to the canola oil polymeric polysulfide (50 wt % sulfur) prepared by inverse vulcanisation. The increased sulfur content results in an increased intensity of peaks at 432 cm$^{-1}$ and 470 cm$^{-1}$ (FIG. 52). This is consistent with greater polysulfide (S—[S]n-S) content in the 50 wt %/o canola oil polymeric polysulfide in comparison to F10 or F25 Factice.

Figure 53:
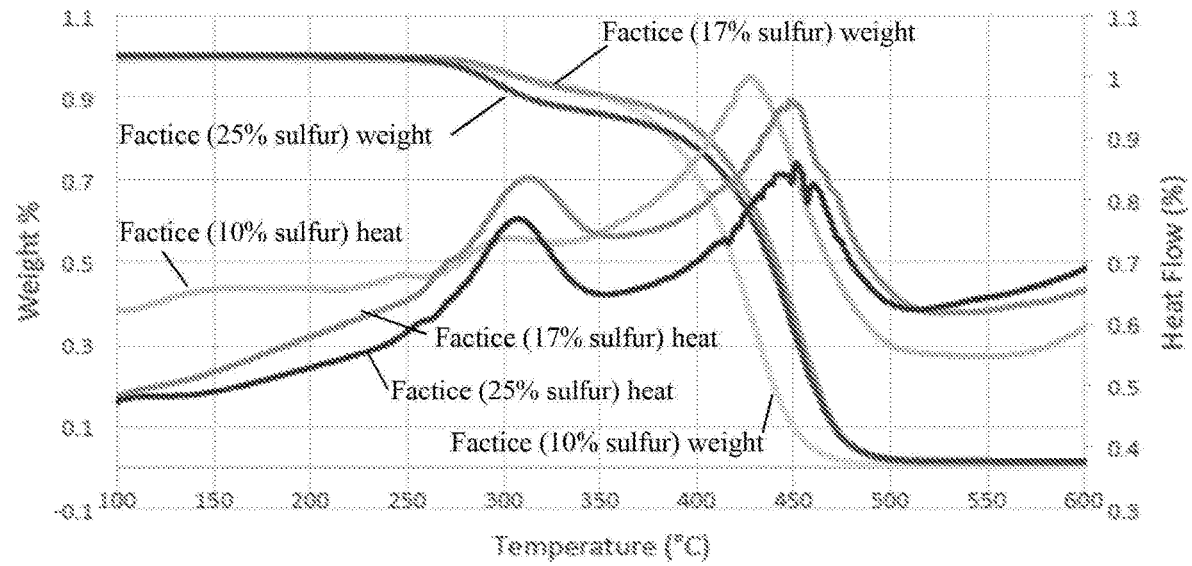
FIG. 53 shows the results of simultaneous thermal analysis (DSC and TGA) for factice samples with 10%, 17% and 25% sulfur.

Simultaneous thermal analysis (DSC and TGA) was also carried out for factice. All factice samples revealed similar DSC and TGA profiles with a minor mass loss at 280° C. and a major mass loss at 400° C. (FIG. 53). In contrast, the canola oil polysulfide (50% sulfur) exhibited a sharp mass loss beginning at <250° C. and then a second mass loss>340° C.

Figure 54:
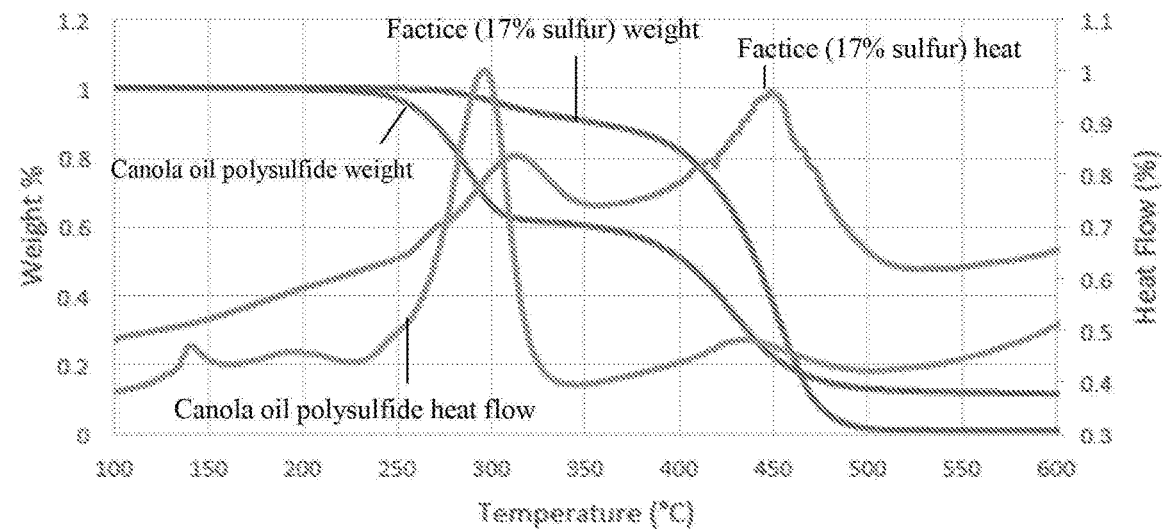
FIG. 54 shows the results of simultaneous thermal analysis of the canola oil polymeric polysulfide (50% sulfur) prepared by inverse vulcanisation plotted with factice samples with 17% sulfur for comparison.

The results of simultaneous thermal analysis of the canola oil polymeric polysulfide (50% sulfur) prepared by inverse vulcanisation plotted with factice F17 are shown in FIG. 54. The first major mass loss of the canola oil polysulfide is attributed to the thermal decomposition of the polysulfide domain.

Example 33—Comparison of Canola Oil Polymeric Polysulfide Prepared by Inverse Vulcanisation and Classic Vulcanisation The canola oil polymeric polysulfide was prepared with 50% sulfur according to the standard inverse vulcanisation procedure (Example 1). For classic vulcanisation, canola oil (10.0 g) was heated to 180° C. in a 250 mL round bottom flask with stirring. Sulfur (10.0 g) was then added in several portions over 5 minutes. The mixture was stirred vigorously for an additional 15 minutes, after which time the mixture reached its gel point and formed a brown rubber very similar in appearance to the product formed from inverse vulcanisation.

Figure 55:
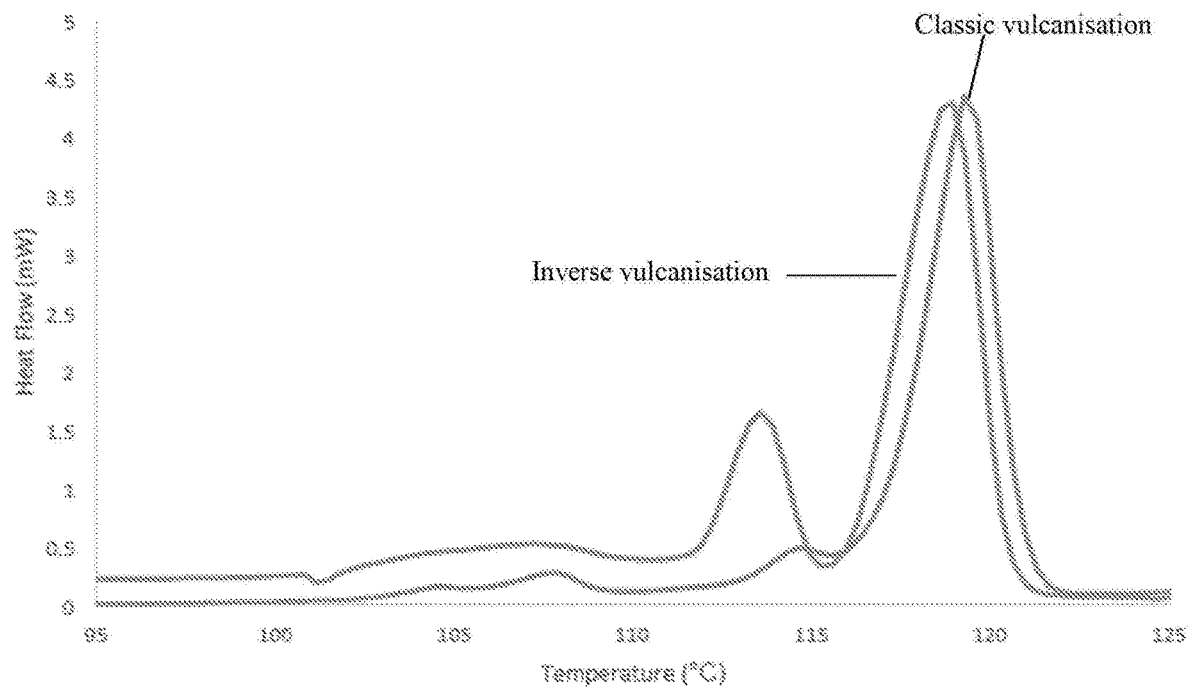
FIG. 55 shows DSC of canola oil polymeric polysulfides prepared at 50% sulfur using inverse vulcanisation and classic vulcanisation.

Dynamic scanning calorimetry was carried out for the canola oil polymeric polysulfides prepared by traditional vulcanisation and inverse vulcanisation at 50% sulfur, with a focus on the region where sulfur melts (FIG. 55). The region of free sulfur is shown in FIG. 55 to illustrate a subtle difference in the materials. Slightly more free sulfur was observed when using inverse vulcanisation (9% free sulfur) compared to traditional vulcanisation (8% free sulfur).

Example 34—Preparation of a Porous Polysulfide Polymer Using a Sodium Chloride Porogen A 50% sulfur polysulfide was prepared using sodium chloride as a porogen. In a round bottom flask powered sulfur (3.00 g) was melted at 180° C. with stirring followed by dropwise addition of canola oil (3.00 g), ensuring that the temperature remained at 180° C. and that the sulfur did not solidify. Ground sodium chloride (14.00 g) was added to the mixture in portions over 5 minutes with stirring adjustments to maintain efficient mixing and homogenise the mixture. After 15-20 minutes at 180° C. the mixture solidified. After cooling, the polymer was removed from the flask and blended to form particles. The product was then stirred in water (150 ml) for 1 hour to remove the sodium chloride and generate channels and pores. The polymer was collected via vacuum filtration, washed with water (3×50 ml) and allowed to dry over 24 hours. The washing and drying procedure was repeated until the mass of the polymer was constant and approximately 14 g of sodium chloride had been removed.

Figure 56:
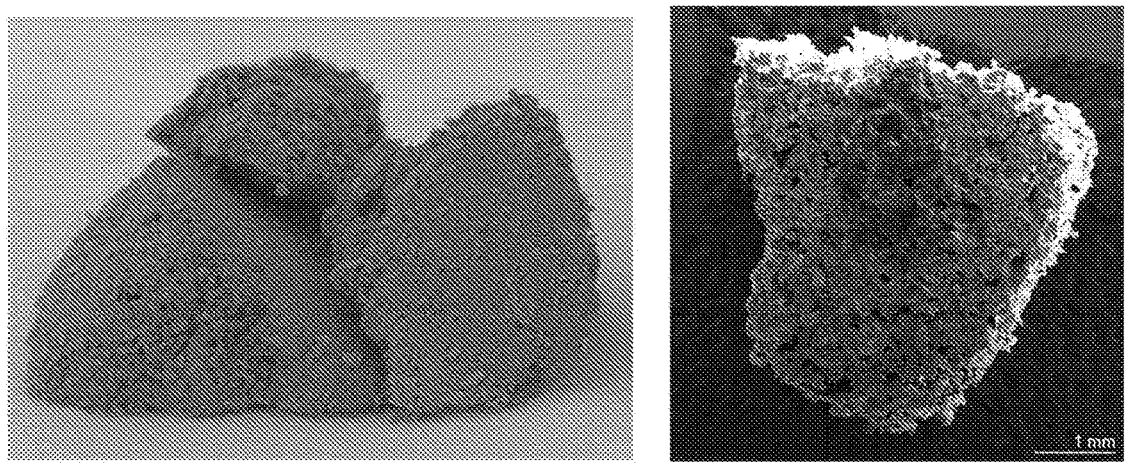
FIG. 56 shows a photograph of a porous canola oil polysulfide formed using sodium chloride as a porogen (left) and a scanning electron micrograph of the same product (right)

The porous canola oil polysulfide produce is shown in FIG. 56 (left) and a scanning electron micrograph is shown in FIG. 56 (right). Micropores are present in the porous material, imparting increased surface area.

Example 35—Installing Thiols on the Surface of the Porous Polysulfide

A reducing agent (sodium borohydride) was used to partially reduce and breakdown the polysulfide S—S structure into thiols.

2.00 g of the porous polysulfide produced in Example 34 (i.e. 50:50 sulfur-canola oil prepared using sodium chloride as a porogen) was added to a 100 mL round bottom flask with 0.034 g sodium borohydride (0.25 molar equivalents $NaBH_4$ to $S_8$ used in the syntheses of the porous polymer). 10 mL methanol was added and the solution stirred for 1 hour. The solution was quenched with 10% HCl and diluted with water (10 mL) before washing under vacuum filtration with 5×20 mL DI water. After leaving the washed polymer to dry overnight in open air, the product was weighed to determine yield and thiol content tested by Ellman's reagent.

Thiol content for the polymer was determined using Ellman's analysis by reacting 504 mg of the partially reduced polymer with 10 mg of Ellman's reagent [5,5'-dithio-bis-(2-nitrobenzoic acid] in 10 mL phosphate buffer (pH 8.0, 100 mM) for 2.5 hours on an end-over-end mixer. The solution was then analysed directly by UV-Vis spectroscopy, with absorbance of 0.85 measured at 412 nm. Based on the extinction coefficient of 14,150 $M^{-1}cm^{-1}$ for the product of Ellman's reagent after reacting with thiols, there are approximately 1.2 mmol thiol per gram of polymer. The thiols can potentially modulate binding to certain metals such as mercury.

Example 36—Removal of Fe(III) from Water Using the Polysulfide Polymer

The iron levels in discharged wastewater are controlled by environmental authorities, with typical limits at less than 5 mg/L. Water containing Fe(III) is discoloured and can stain valuable fixtures and affect taste. Fe(III) can also promote the growth of unwanted bacteria that can clog plumbing. An inexpensive method to remove iron from water is useful for a variety of industries and water authorities.

A stock solution of $FeCl_3$ was prepared at 50 mg/L and was equilibrated at room temperature for 24 hours. This solution had a pH=3.0, as prepared. 200 g of the non-porous polysulfide (50% sulfur) was added to 1 L of $FeCl_3$ solution. The solution was mixed at room temperature for 24 hours. The absorbance was monitored at 306 nm using UV-Vis spectroscopy and also by atomic absorption spectroscopy (AAS) to determine iron concentration for all samples. The final concentration of Fe(III) was 1.3 mg/mL. The polymer and iron bound to the polymer were removed by filtration to provide the purified, colourless water.

TABLE 10

UV/VIS MEASUREMENTS OF Fe(III) SOLUTIONS BEFORE AND AFTER TREATMENT WITH POLYSULFIDE POLYMER

| Sample | Average Concentration (mg/L) | Standard deviation |
|---|---|---|
| Initial (UV/Vis) | 52.19 | 1.38 |
| Final (UV/Vis) | 1.31 | 0.01 |
| Initial (AAS) | 49.47 | 1.03 |
| Final (AAS) | 1.29 | 0.06 |

Figure 57:
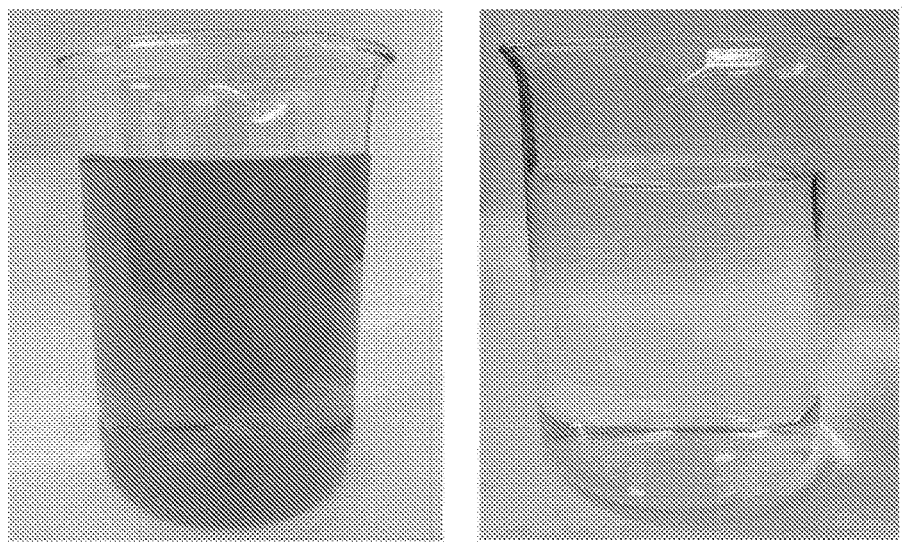
FIG. 57 shows photographs of untreated water containing 50 mg/L Fe(III) (left), and water treated with polysulfide (1.3 mg/mL Fe(III)) (right)

FIG. 57 shows photographs of untreated water containing 50 mg/L Fe(III) (left), and water treated with polysulfide (1.3 mg/mL Fe(III)) (right).

Example 37—Relative Affinity of Metal Ions for the Polysulfide Polymer

The affinity of the polymeric polysulfide for other metals was tested.

0.7 mM metal ion concentration solutions were prepared from metal salts in DI water and incubated with 100 mg of the porous polymeric polysulfide of Example 36 for 1 hour. The metals used were: ferric oxide, zinc chloride, cadmium bromide (tetrahydrate), lead nitrate, copper sulfate (pentahydrate), arsenic pentoxide, and mercuric chloride. Samples were diluted 10,000 fold and ICP-MS used to determine the exact concentrations of metal ions present in solution before and after incubation.

Figure 58:
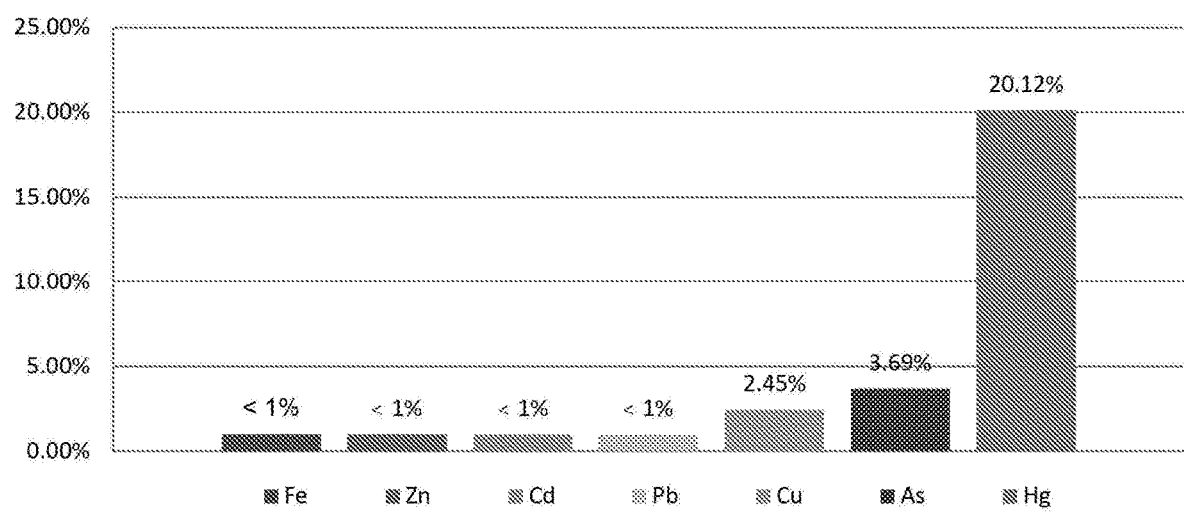
FIG. 58 is a plot showing the percentage of metal ions removed from solution by incubation with the porous polymeric polysulfide.

The percentage metal ions removed from solution by incubation with the porous polymeric polysulfide are shown in FIG. 58. It is clear from this work that mercury has the highest affinity, with arsenic the second highest of the materials tested. It is likely that more polymeric polysulfide could be used to make arsenic removal more viable. Note that the iron in this test is iron oxide and not the same iron used in Example 36 (i.e. iron(III) chloride).

Prophetic Example 1—Use of Polymeric Polysulfide for Mercury Removal from Flue Stacks of Coal-Fired Power Plants The polymeric polysulfide may be used for mercury removal from flue stacks of coal-fired power plants. Particles of the polymeric polysulfide can be placed in an exhaust column, tower or flue. The particles may be packed into the column and retained therein by blocking off either one or both ends of the column using a support, such as a filter, ceramic beads or a grating, that allows the flue gas to pass through the column whilst retaining the particles therein. Alternatively, the particles could be placed in a bed or series of beds over which the flue gas passes.

Prophetic Example 2—Use of Polymeric Polysulfide for Mercury Removal from Water The polymeric polysulfide may be used for mercury removal from water. Particles of the polysulfide can be placed in a pipe, column or filter, over which contaminated water passes. The particles can also be placed in a bed or series of beds. When using a column, additional hydraulic lubricants (silica or sand) may be added to ensure regulated back pressures and even fluid flow.

The polymeric polysulfide, compositions and methods of the present disclosure provide numerous advantages over previously known products or compositions used for extracting or removing mercury from mercury containing compositions. For example, the polymeric polysulfide of the present disclosure is a solid. This means that the polymeric polysulfide will not melt when exposed to high temperatures, for example, when used for mercury removal from flue stacks of coal-fired power plants. Further, the polymeric polysulfide will not adhere to or melt into a mercury containing substrate, which would greatly increase the cost of separating the mercury-bound polymeric polysulfide from the mercury containing substrate following treatment.

A further advantage is that the polymeric polysulfide of the present disclosure can be produced from cheap starting materials. For example, cheap starting materials such as canola oil or corn oil may be used. Further, low grade agricultural sulphur powder may be used.

A further advantage is that the polymeric polysulfide is easy to synthesise and no specialised equipment is required. The glyceride composition and the sulphur must merely be combined in a vessel and heated in order to produce the polymeric polysulfide. Further, the produced polymeric polysulfide does not require further processing steps beyond those disclosed herein (e.g. comminuting) to prepare the polymeric polysulfide for mercury adsorption.

Throughout the specification and the claims that follow, unless the context requires otherwise, the words "comprise" and variations such as "comprises" and "comprising" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the disclosure is not restricted in its use to the particular application described. Neither is the present disclosure restricted in its preferred embodiment with regard to the particular elements and/or features described or depicted herein. It will be appreciated that the disclosure is not limited to the embodiment or embodiments disclosed, but is capable of numerous rearrangements, modifications and substitutions without departing from the scope of the disclosure as set forth and defined by the following claims.

REFERENCES

1. Tchounwou, P. B., Ayensu, W. K., Ninashvili, N. and Sutton, D., 2003, Review: Environmental exposure to mercury and its toxicopathologic implications for public health. *Environmental. Toxicology*, 18: 149-175. doi: 10.1002/tox.10116
2. Boening, D. W., 2000. Ecological effects, transport, and fate of mercury: a general review. *Chemosphere*, 40(12): 1335-1351.
3. United Nations Environment Programme, Global Mercury Assessment 2013, URL <http://www.unep.org/PDF/PressReleases/GlobalMercuryAsses/GlobaMrurAssssment2013.pdf>.
4. Wang, J., Feng, X., Anderson, C. W., Xing, Y. and Shang, L., 2012. Remediation of mercury contaminated sites-A review. *Journal of hazardous materials*, 221: 1-18.
5. United States Environmental Protection Agency, 1997, Capsule Report, Aqueous Mercury Treatment, EPA/625/R-97/004.
6. Boschee, P., 2013, Advances in the removal of mercury from crude oil, *Oil and Gas Facilities*, April, 12-17.
7. Eckersley, N., 2010, Advanced mercury removal technologies, *Hydrocarbon Processing*, Jan. 29-35. URL <http://www.uop.com/wp-content/uploads/2011/01/UOP-Advanced-Mercury-Removal-Technologies-tech-paper.pdf>.
8. Crockett, M. P., Evans, A. M., Worthington, M. J., Albuquerque, I. S., Slattery, A. D., Gibson, C. T., Campbell, J. A., Lewis, D. A., Bernardes, G. J. and Chalker, J. M., 2015. Sulfur-limonene polysulfide: a material synthesized entirely from industrial by-products and its use in removing toxic metals from water and soil. *Angewandte Chemie International Edition.*
9. Hasell, T., Parker, D. J., Jones, H. A., McAllister, T. and Howdle, S. M., 2016. Porous inverse vulcanised polymers for mercury capture. *Chemical Communications*, 52(31): 5383-5386.

The invention claimed is:

1. A polymeric polysulfide formed by reacting a fatty acid composition comprising at least one unsaturated fatty acid or derivative thereof with sulfur, at a weight ratio between 2:1 and 1:2, under inverse vulcanisation conditions to produce a polymeric polysulfide wherein at least 50% of the fatty acids or derivatives thereof in the fatty acid composition are unsaturated.

2. The polymeric polysulfide of claim 1, wherein the weight ratio of the fatty acid composition to sulfur is about 1:1 and wherein the polymeric polysulfide has an elemental mass ratio of about C: 41%, H:6%, 0:6%, S:46%.

3. The polymeric polysulfide of claim 1, wherein the fatty acid composition is a glyceride composition.

4. The polymeric polysulfide of claim 3, wherein the polymeric polysulfide is a solid.

5. The polymeric polysulfide of claim 1, wherein the fatty acid composition is a fatty acid ester composition.

6. A method for producing a polymeric polysulfide, the method comprising:
   providing a fatty acid composition comprising at least one unsaturated fatty acid or derivative thereof and wherein at least 50% of the fatty acids or derivatives thereof in the fatty, acid composition are unsaturated; reacting the fatty acid composition with molten sulfur at a weight ratio between 2:1 and 1:2 under conditions to produce the polymeric polysulfide.

7. The method of claim 6, wherein the weight ratio of the fatty acid composition to sulfur is about 1:1 and wherein the resulting polymeric polysulfide has an elemental mass ratio of about C: 41%, H:6%, 0:6%, S:46%.

8. The method of claim 6, wherein the fatty acid composition is reacted with sulfur at a temperature greater than 119 degrees Celsius.

9. The method of claim 8, wherein the fatty acid composition is reacted with sulfur for a time greater than 10 minutes.

10. A metal removal composition comprising a polymeric polysulfide, wherein the polymeric polysulfide is formed by reacting a fatty acid composition comprising at least one unsaturated fatty acid or derivative thereof with sulfur, at a weight ratio between 2:1 and 1:2, under inverse vulcanisation conditions to produce a polymeric polysulfide wherein at least 50% of the fatty acids or derivatives thereof in the fatty acid composition are unsaturated, and wherein the metal removal composition is suitable for removing one or more metals or metal ions from a metal or metal ion containing composition or surface.

11. The metal removal composition of claim 10, wherein the weight ratio of the fatty acid composition to sulfur is about 1:1 1 and wherein the polymeric polvsulfide has an elemental mass ratio of about C: 41%, 1-1:6%, 0:6%, S:46%.

12. The metal removal composition of claim 10, wherein the fatty acid composition is a glyceride composition.

13. The metal removal composition of claim 10, wherein the fatty acid composition is a fatty acid ester composition.

14. The metal removal composition of claim 10, wherein the metal is selected from one or more of the group consisting of mercury, cadmium, silver, gold, lead, arsenic, nickel, zinc, and iron.

15. The metal removal composition of claim 14, wherein the metal is mercury.

16. The metal removal composition of claim 14, wherein the metal is iron.

17. A method for removing one or more metals from a metal containing composition or surface, the method comprising:
    contacting the metal containing composition or surface with the polymeric polysulfide of claim 1 under conditions to remove at least some of the metal from the metal containing composition or surface.

18. The method of claim 17, wherein the metal is selected from one or more of the group consisting of mercury, cadmium, silver, gold, lead, arsenic, nickel, zinc, and iron.

19. The method of claim 18, wherein the metal containing composition comprises a mercury containing liquid or gas and wherein the method comprises passing the mercury containing liquid or gas over a bed of polymeric polysulfide particles.

* * * * *